(12) United States Patent
Ando et al.

(10) Patent No.: US 11,146,772 B2
(45) Date of Patent: Oct. 12, 2021

(54) ENCODER, DECODER, ENCODING METHOD, DECODING METHOD, AND RECORDING MEDIUM

(71) Applicant: NIKON CORPORATION, Tokyo (JP)

(72) Inventors: Ichiro Ando, Yokosuka (JP); Masaya Takahashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/962,785

(22) PCT Filed: Jan. 16, 2019

(86) PCT No.: PCT/JP2019/001150
§ 371 (c)(1),
(2) Date: Sep. 18, 2020

(87) PCT Pub. No.: WO2019/142836
PCT Pub. Date: Jul. 25, 2019

(65) Prior Publication Data
US 2021/0014464 A1  Jan. 14, 2021

(30) Foreign Application Priority Data

Jan. 16, 2018 (JP) .............................. JP2018-005212

(51) Int. Cl.
*H04N 9/64* (2006.01)
*H04N 5/243* (2006.01)
*H04N 19/85* (2014.01)

(52) U.S. Cl.
CPC ............ *H04N 9/646* (2013.01); *H04N 5/243* (2013.01); *H04N 19/85* (2014.11)

(58) Field of Classification Search
CPC ........ H04N 9/646; H04N 19/85; H04N 19/46; H04N 5/243; H04N 5/202; H04N 5/20; H04N 1/407
See application file for complete search history.

(56) References Cited

U.S. PATENT DOCUMENTS

| 2006/0119712 A1* | 6/2006 | Yamamoto | H04N 5/772 348/229.1 |
| 2014/0313390 A1* | 10/2014 | Uemura | G03B 13/00 348/335 |
| 2015/0319444 A1* | 11/2015 | Ando | H04N 19/176 375/240.12 |

FOREIGN PATENT DOCUMENTS

| JP | S64-037178 A | 2/1989 |
| JP | 2004-129065 A | 4/2004 |
| JP | 2006-270478 A | 10/2006 |
| JP | 4372686 B2 | 11/2009 |
| JP | 2010-124114 A | 6/2010 |

OTHER PUBLICATIONS

Mar. 5, 2019 International Search Report issued in International Patent Application No. PCT/JP2019/001150.

\* cited by examiner

*Primary Examiner* — Nelson D. Hernández Hernández
(74) *Attorney, Agent, or Firm* — Oliff PLC

(57) ABSTRACT

An encoder includes: a correction unit configured to execute gradation correction on RAW image data from an image capture element having optical black on the basis of a gamma coefficient and an optical black value of the optical black; and an encoding unit configured to encode gradation correction RAW image data that has undergone gradation correction by the correction unit.

26 Claims, 38 Drawing Sheets

ENCODER, DECODER, ENCODING METHOD, DECODING METHOD, AND RECORDING MEDIUM

CLAIM OF PRIORITY

The present application claims priority from Japanese patent application JP 2018-5212 filed on Jan. 16, 2018, the content of which is hereby incorporated by reference into this application.

BACKGROUND

The present invention relates to an encoder, a decoder, an encoding method, a decoding method, an encoding program, and a decoding program.

A feature of performing gradation correction on RAW image data has been disclosed (JP 2006-270478 A). However, if the optical black in the output from an image capture element is not zero, then if encoding is performed with gradation correction by the above-mentioned $\sqrt{\gamma}$ or the like being performed in order to mitigate encoding distortion of dark portions, then the degree to which encoding distortion of dark portions is mitigated by the gradation correction is reduced compared to a case in which the optical black is zero.

SUMMARY

An aspect of the disclosure of an encoder in this application is an encoder, comprising: a correction unit configured to execute gradation correction on RAW image data from an image capture element having optical black on the basis of a gamma coefficient and an optical black value of the optical black; and an encoding unit configured to encode gradation correction RAW image data that has undergone gradation correction by the correction unit.

An aspect of the disclosure of a decoder in this application is a decoder, comprising: an acquisition unit configured to acquire encoded RAW image data resulting from encoding gradation correction RAW image data that has undergone gradation correction on the basis of a gamma coefficient and an optical black value; a decoding unit configured to decode the encoded RAW image data acquired by the acquisition unit into the gradation correction RAW image data; and an inverse gradation correction unit configured to execute inverse gradation correction on the gradation correction RAW image data decoded by the decoding unit on the basis of the gamma coefficient and the optical black value, and output the RAW image data prior to gradation correction.

An aspect of the disclosure of an encoding method in this application is an encoding method, comprising: a correction process of executing gradation correction on RAW image data from an image capture element having optical black on the basis of a gamma coefficient and an optical black value of the optical black; and an encoding process of encoding gradation correction RAW image data that has undergone gradation correction by the correction process.

An aspect of the disclosure of a decoding method in this application is a decoding method, comprising: an acquisition process of acquiring encoded RAW image data resulting from encoding gradation correction RAW image data that has undergone gradation correction on the basis of a gamma coefficient and an optical black value; a decoding process of decoding the encoded RAW image data acquired by the acquisition process into the gradation correction RAW image data; and an inverse gradation correction process of executing inverse gradation correction on the gradation correction RAW image data decoded by the decoding process on the basis of the gamma coefficient and the optical black value, and outputting the RAW image data prior to gradation correction.

EMBODIMENT 1

<Hardware Configuration Example of Information Processing Apparatus>

Figure 1:
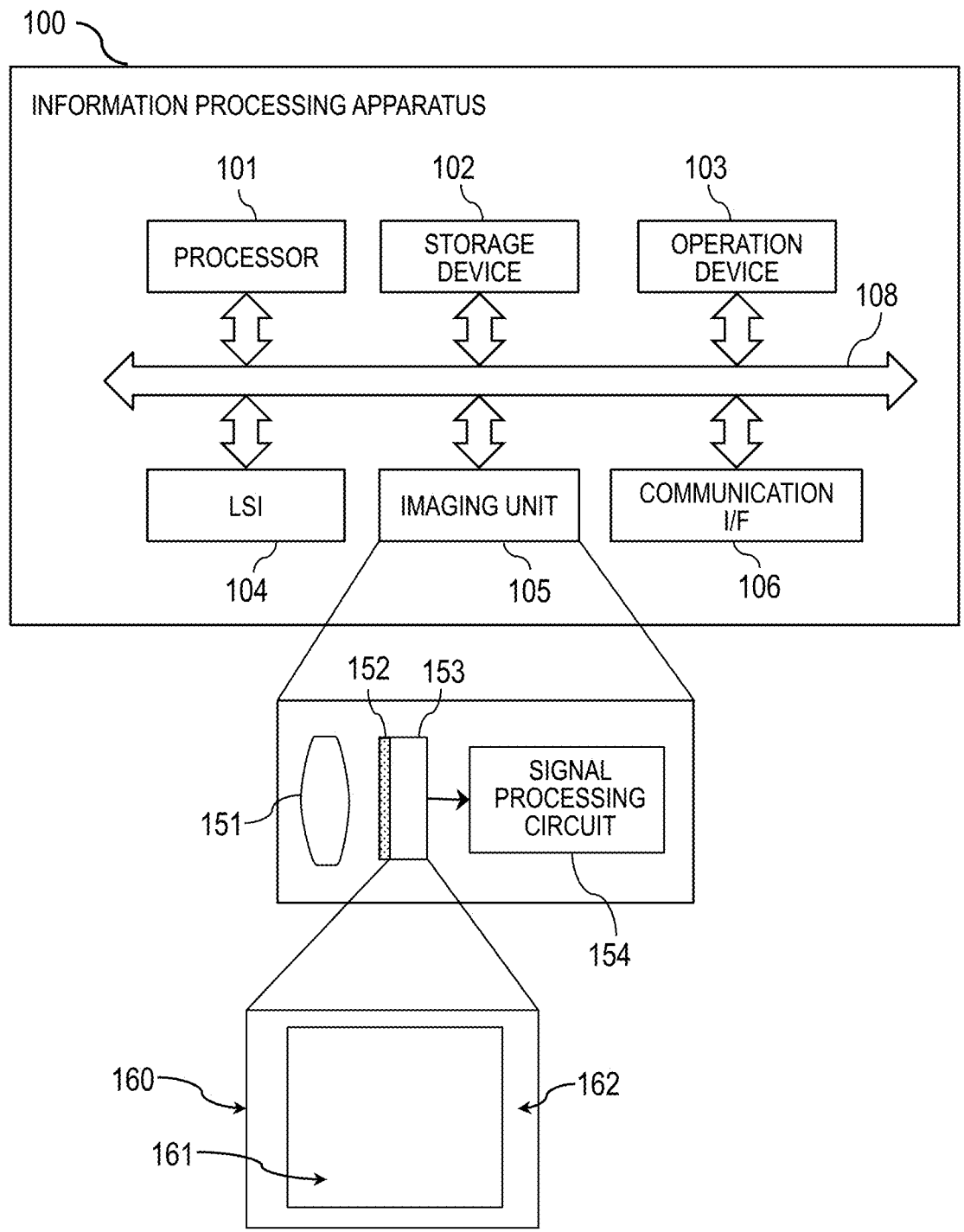
FIG. 1 is a block diagram showing a hardware configuration example of the information processing apparatus.

FIG. 1 is a block diagram showing a hardware configuration example of the information processing apparatus. An information processing apparatus 100 is an apparatus including an encoder and/or a decoder. The information processing apparatus 100 may be an imaging apparatus such as a digital camera or a digital video camera, or a personal computer, a tablet, a smartphone, or a gaming device, for example.

The information processing apparatus 100 includes a processor 101, a storage device 102, an operation device 103, an LSI (Large Scale Integration) 104, an imaging unit 105, and a communication interface (communication IF) 106. These are connected to one another by a bus 108. The processor 101 controls the information processing apparatus 100. The storage device 102 serves as a work area of the processor 101.

The storage device 102 is a non-transitory or temporary recording medium which stores the various programs and data. The storage device 102 can be, for example, a read-only memory (ROM), a random access memory (RAM), a hard disk drive (HDD), or a flash memory. The operation device 103 operates data. The operation device 103 can be, for example, a button, a switch, or a touch panel.

An LSI 104 is an integrated circuit that executes specific processes including image processes such as color interpolation, contour enhancement, and gamma correction; an encoding process; a decoding process; a compression/decompression process; and the like.

An imaging unit 105 captures a subject and generates RAW image data. The imaging unit 105 has an imaging optical system 151, an image capture element 153 having a color filter 152, and a signal processing circuit 154.

The imaging optical system 151 is constituted of a plurality of lenses including a zoom lens and a focus lens, for example. For a simplified view, in FIG. 1, one lens is depicted for the imaging optical system 151.

The image capture element 153 is a device for capturing an image of a subject using light beams passing through the imaging optical system 151. The image capture element 153 may be a sequential scanning type solid-state image sensor (such as a CCD (charge-coupled device) image sensor), or may be an X-Y addressing type solid-state image capture element (such as a CMOS (complementary metal-oxide semiconductor) image sensor).

On the light-receiving surface of the image capture element 153, a pixel group 160 having photoelectric conversion units is arranged in a matrix. For each pixel of the image capture element 153, a plurality of types of color filters 152 that respectively allow through light of differing color components are arranged in a prescribed color array. Thus, each pixel of the image capture element 153 outputs an electrical signal corresponding to each color component as a result of color separation by the color filter 152.

In Embodiment 1, for example, red (R), green (G), and blue (B) color filters 152 are arranged periodically on the light-receiving surface according to a Bayer arrangement of two rows by two columns. As an example, odd-numbered rows of the color array of the image capture element 153 have G and B pixels arranged alternately, whereas even-numbered rows of the color array have R and G pixels arranged alternately. The color array overall has green pixels arranged so as to form a checkered pattern. As a result, the image capture element 153 can acquire RAW image data in color during imaging.

The pixel group 160, in which the pixels are arranged in a 2-dimensional array in the image capture element 153, is constituted of an active pixel area 161 and an optical black pixel area 162. The active pixel area 161 is a pixel area in which a signal charge generated by photoelectric conversion of actually received light is amplified and outputted to the signal processing circuit 154.

The optical black pixel area 162 is a pixel area for outputting optical black that serves as a reference for the black level. The optical black pixel area 162 is provided on the outer periphery of the active pixel area 161, for example. The optical black pixel area 162 is provided in order to perform subtraction correction of heat noise generated by the image capture element 153, for example.

The signal processing circuit 154 sequentially executes, on an image signal inputted from the image capture element 153, an analog signal process (correlated double sampling, black level correction, etc.), an A/D conversion process, and digital signal processing (defective pixel correction). The RAW image data outputted from the signal processing circuit 154 is inputted to the LSI 104 or a storage device 102. A communication I/F 106 connects to an external device via the network and transmits/receives data.

Mechanical Configuration Example of Encoder

Figure 2:
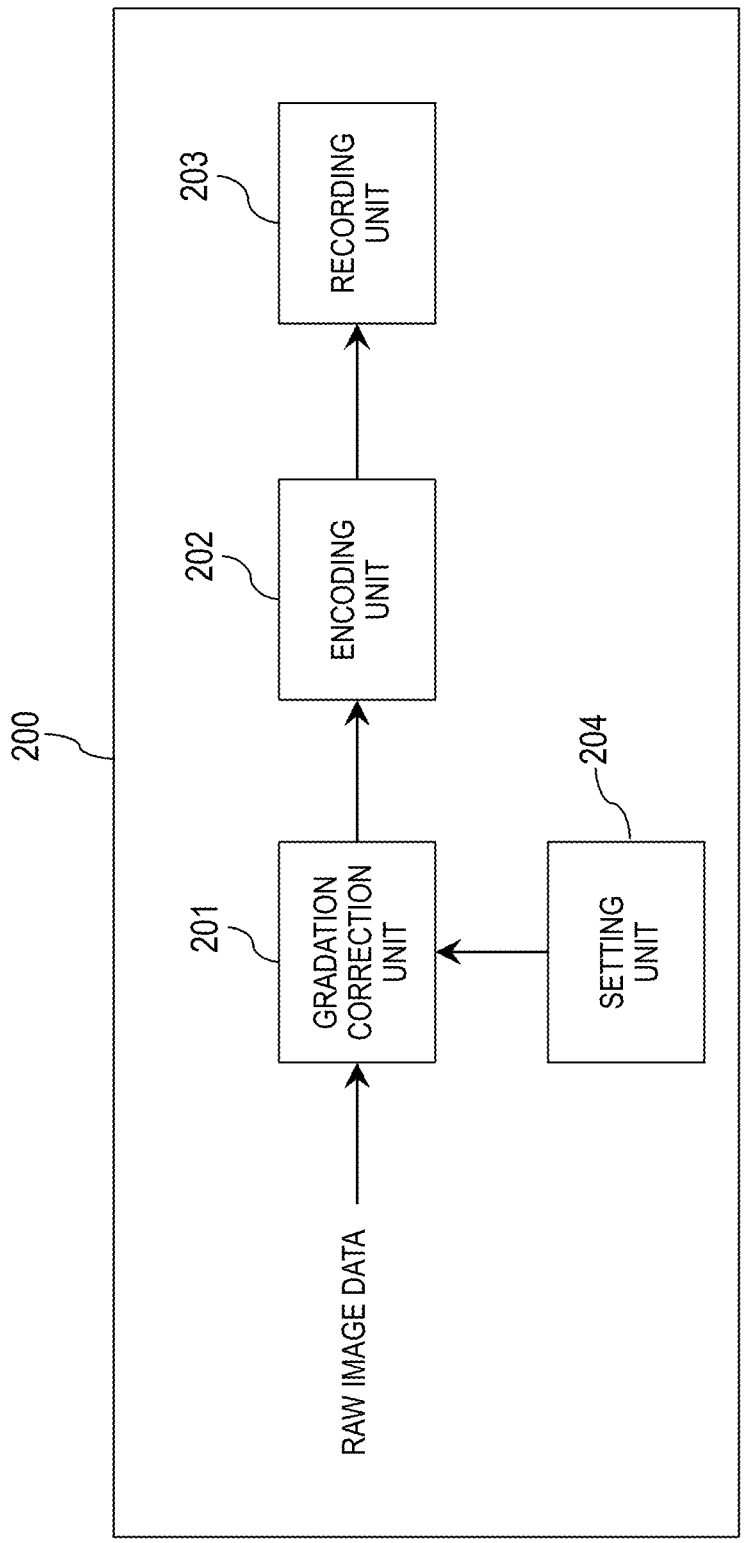
FIG. 2 is a block diagram showing a mechanical configuration example of the encoder according to Embodiment 1.

FIG. 2 is a block diagram showing a mechanical configuration example of the encoder according to Embodiment 1.

The encoder 200 has a gradation correction unit 201, an encoding unit 202, a recording unit 203, and a setting unit 204. The gradation correction unit 201, the encoding unit 202, the recording unit 203, and the setting unit 204 are specifically functions realized by the LSI 104, or by the processor 101 executing programs stored in the storage device 102, for example.

The gradation correction unit 201 performs gradation correction on the RAW image data. The RAW image data is image data of pixel values that are in a linear relationship with the intensity of light from the image capture element 153, which performs photoelectric conversion of light from the subject attained via the color filters 152. In other words, the RAW image data is image data that has not been subjected to image processing such as gamma correction, demosaicing, white balance adjustment, or color conversion. The data volume of the RAW image data is large compared to data on which the above-mentioned image processes and the encoding process (compression process) has been performed. The RAW image data may be a still image or one frame of a video.

The gradation correction unit 201 performs gradation correction on the RAW image data from the image capture element 153 having the optical black pixel area 162 on the basis of the value of the gamma coefficient (gamma value) and the optical black value. For example, the gradation correction unit 201 executes gradation correction by $\sqrt{\gamma}$ or the like on the RAW image data according to the optical black value. The gradation correction unit 201 executes a noise reduction process (NR process) when performing gradation correction. Details regarding the gradation correction by the gradation correction unit 201 will be described later.

The encoding unit 202 encodes the RAW image data that has undergone gradation correction by the gradation correction unit 201 (hereinafter referred to as gradation correction RAW image data) and outputs encoded gradation correction RAW image data. If the gradation correction RAW image data is a still image, the encoding unit 202 performs in-frame encoding to encode the gradation correction RAW image data into an I-picture.

If the gradation correction RAW image data is one frame of a video, the encoding unit 202 employs in-frame predictive encoding to encode the gradation correction RAW image data into an I-picture, or employs inter-frame predictive encoding with reference to other gradation correction RAW image data to encode the gradation correction RAW image data into a P-picture or a B-picture.

If the optical black value in the output from the image capture element 153 is not zero, then if gradation correction by $\sqrt{\gamma}$ or the like were performed as is in order to mitigate encoding distortion of dark portions, then the degree to which encoding distortion of the dark portions is mitigated by gradation correction is small compared to if the optical black value is zero. The encoding unit 202 executes gradation correction by $\sqrt{\gamma}$ or the like based on the optical black value, and adds the γ value used during decoding/playback to the header information of the encoded gradation correction RAW image data and applies the optical black value thereto. As a result, it is possible to eliminate a decrease in the degree to which encoding distortion of black portions by gradation correction is mitigated.

The recording unit 203 records the encoded gradation correction RAW image data in the storage device 102. The setting unit 204 sets the gamma coefficient value, the calculated provisional gain, and the exposure value and outputs these values to the gradation correction unit 201. Details regarding the setting unit 204 will be described in Embodiments 3 and 4.

Data Structure Example of Gradation Correction RAW Image Data

Figure 3:
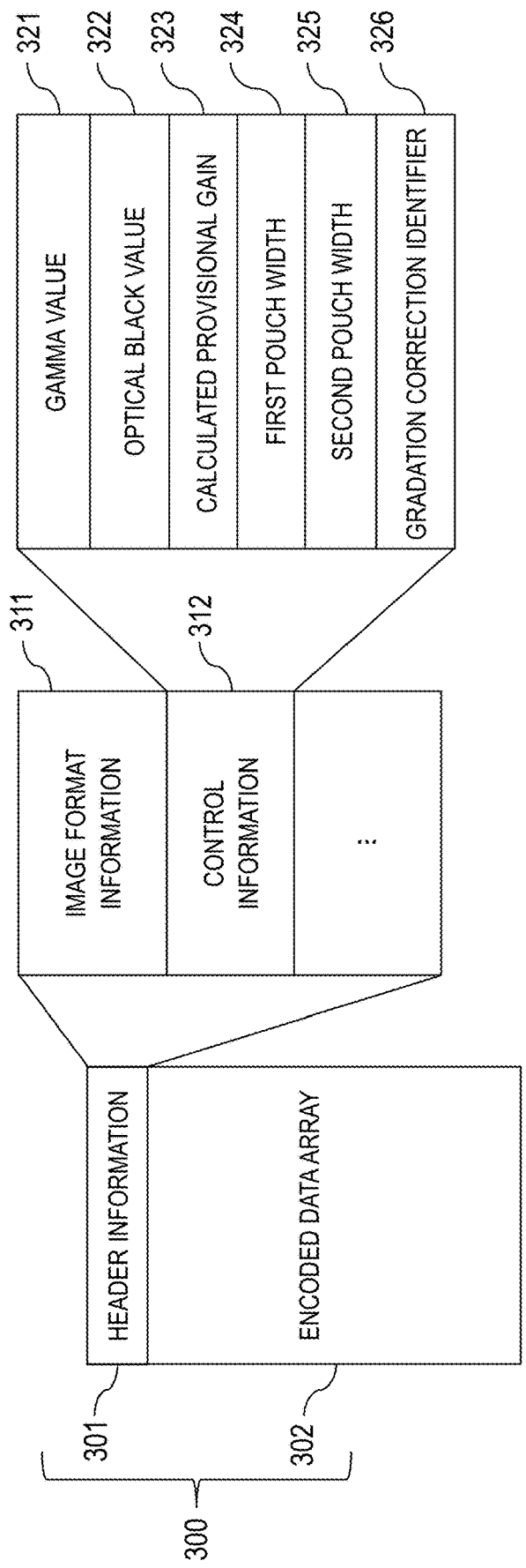
FIG. 3 is a descriptive drawing showing a data structure example for the encoded gradation correction RAW image data.

FIG. 3 is a descriptive drawing showing a data structure example for the encoded gradation correction RAW image data. The encoded gradation correction RAW image data 300 has header information 301 and an encoded data array 302. The header information 301 is information added by the encoding unit 202. The header information 301 includes image format information 311 and control information 312. The encoded data array 302 is a data array in which the gradation correction RAW image data is encoded.

Elements of the header information 301 will be described in detail below. The image format information 311 includes the size of the gradation correction RAW image data prior to encoding, the size of the encoded gradation correction RAW image data, identification information specifying the color array pattern, and the pixel count of the gradation correction RAW image data prior to encoding.

The control information 312 includes a gamma value 321 for when gradation correction is performed, an optical black value 322 that serves as a reference for the black level, a calculated provisional gain 323, a first pouch width 324, a second pouch width 325, and a gradation correction identifier 326, in addition to the type of encoded gradation correction RAW image data (I-picture, P-picture, or B-picture) and identification information of the reference frame.

The calculated provisional gain 323 will be described in Embodiments 3 and 4. The first pouch width 324 and the second pouch width 325 will be described in Embodiment 4. The gradation correction identifier 326 is an identifier for identifying the algorithm that executes gradation correction. With the gradation correction identifier 326, the decoder can identify which algorithm was used to perform gradation correction on the encoded gradation correction RAW image data 300.

Configuration Example of Encoding Unit 202

Figure 4:
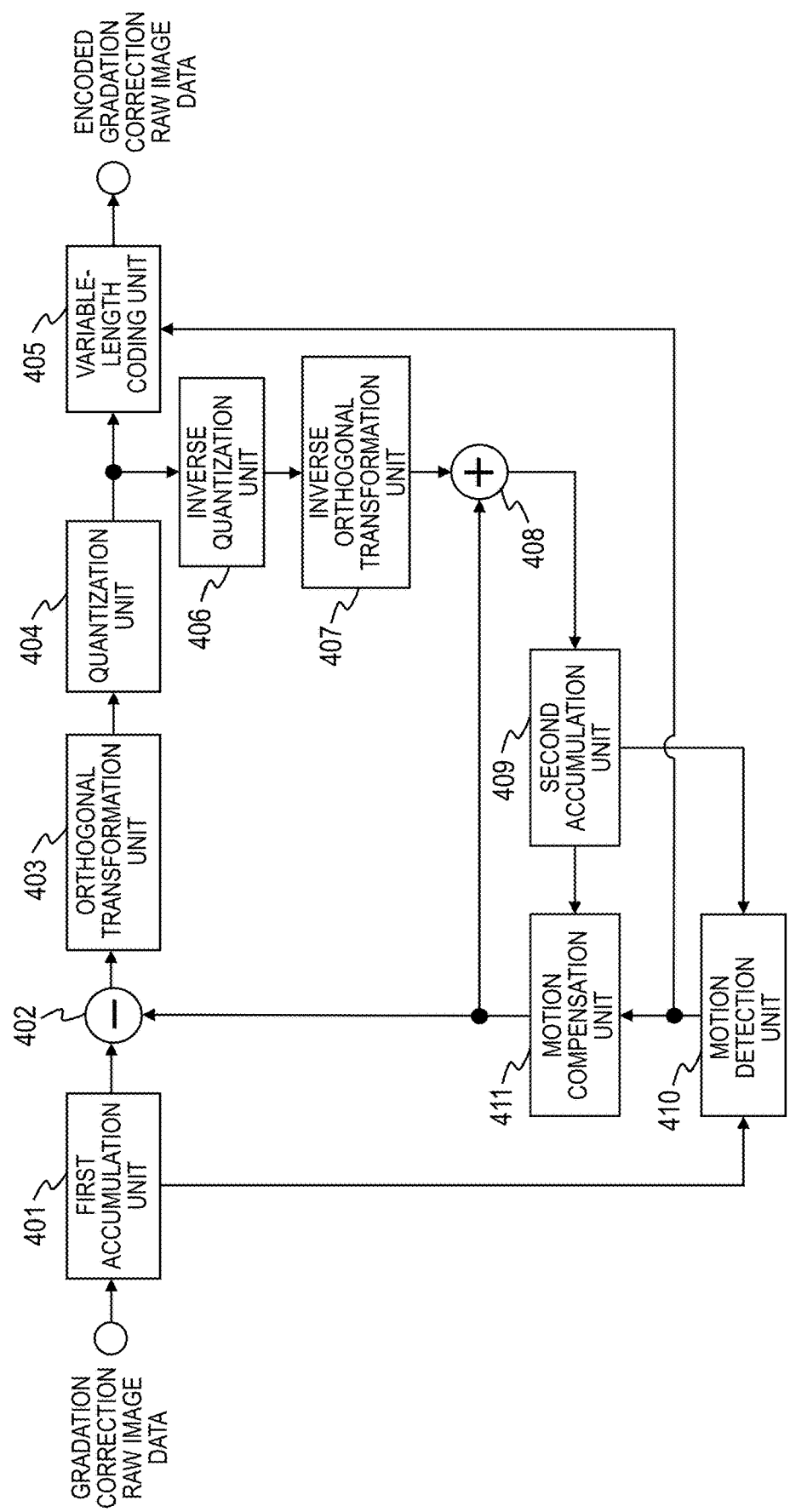
FIG. 4 is a block diagram showing a configuration example of the encoding unit.

FIG. 4 is a block diagram showing a configuration example of the encoding unit 202. The encoding unit 202 has a first accumulation unit 401, a subtraction unit 402, an orthogonal transformation unit 403, a quantization unit 404, a variable-length coding unit 405, an inverse quantization unit 406, an inverse orthogonal transformation unit 407, an addition unit 408, a second accumulation unit 409, a motion detection unit 410, and a motion compensation unit 411.

The first accumulation unit 401 accumulates the gradation correction RAW image data outputted from the gradation correction unit 201. The gradation correction RAW image data accumulated in the first accumulation unit 401 is outputted to the subtraction unit 402 as image data to be encoded in the order that the gradation correction RAW image data was inputted. The gradation correction RAW image data that has been encoded is sequentially deleted from the first accumulation unit 401.

When generating the P-picture or the B-picture, the subtraction unit 402 outputs a difference signal (prediction error value) between a component frame of the inputted original image (gradation correction RAW image data) and a prediction value generated by the motion compensation unit 411 to be described later. Also, when generating the I-picture, the subtraction unit 402 outputs the component frame of the inputted original image as is.

When generating the I-picture, the orthogonal transformation unit 403 performs orthogonal transformation on the original image inputted after passing through the subtraction unit 402 without modification. Also, when generating the P-picture or the B-picture, the orthogonal transformation unit 403 performs orthogonal transformation on the above-mentioned difference signal.

The quantization unit 404 converts the frequency coefficient (orthogonal transformation coefficient) for each block inputted from the orthogonal transformation unit 403 into a quantization coefficient. The output from the quantization unit 404 is inputted to the variable-length coding unit 405 and the inverse quantization unit 406.

The variable-length coding unit 405 performs variable-length coding of a motion vector from the motion detection unit 410 and outputs the encoded gradation correction RAW image data (I-picture, P-picture, B-picture).

The inverse quantization unit 406 performs inverse quantization on a quantized coefficient at the block level, which is the level at which encoding is performed, to decode the frequency coefficient. The inverse orthogonal transformation unit 407 performs inverse orthogonal transformation on the frequency coefficient decoded by the inverse quantization unit 406 to decode the prediction error value (or original image).

The addition unit 408 adds the decoded prediction error value to a prediction value (to be mentioned later) generated by the motion compensation unit 411. Decoded values (reference frames) of the picture outputted from the addition unit 408 are accumulated in the second accumulation unit 409. Reference frames not referred to in motion compensation prediction thereafter are sequentially deleted from the second accumulation unit 409.

The motion detection unit 410 uses the reference frames of the second accumulation unit 409 to detect the motion vector for predicting the gradation correction RAW image data to be encoded. The motion vector is outputted to the motion compensation unit 411 and the variable-length coding unit 405.

The motion compensation unit 411 outputs the prediction values predicted at the block level for the gradation correction RAW image data to be encoded on the basis of the motion vector and the reference frame. The prediction values are outputted to the subtraction unit 402 and the addition unit 408.

If motion compensation prediction is to be performed for a given block, when the gradation correction RAW image data to be encoded completely matches the prediction values, only the motion vector is encoded. If the gradation correction RAW image data to be encoded partially matches the prediction values, the motion vector and a difference image are encoded. If none of the gradation correction RAW image data to be encoded matches the prediction values, the image for the entire block is encoded.

Example of Encoding Process Steps

Figure 5:
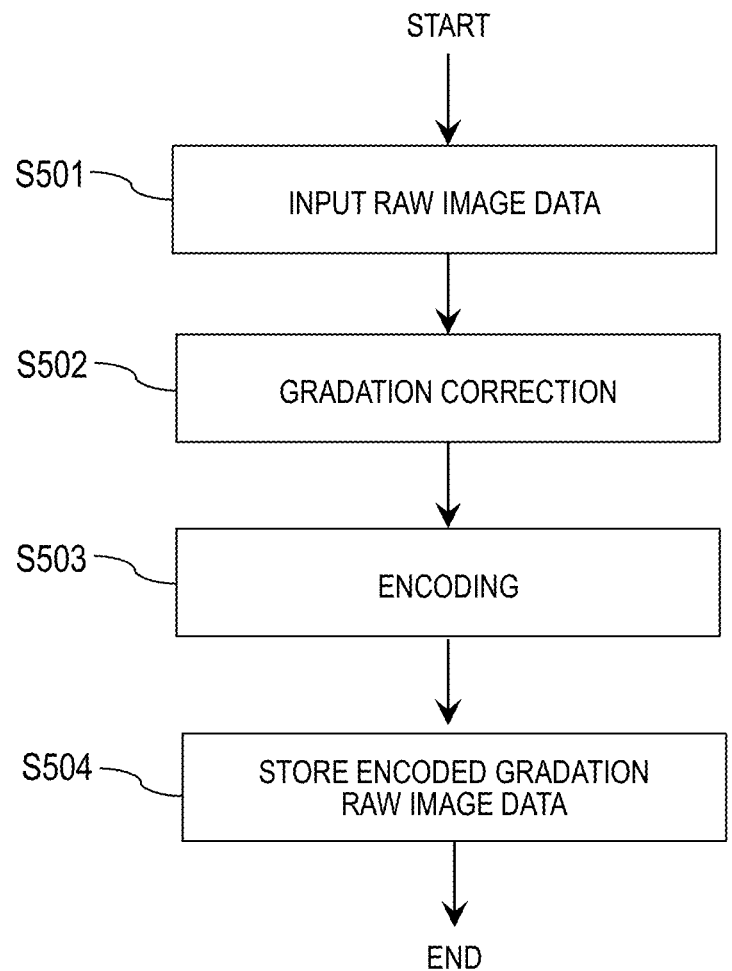
FIG. 5 is a flowchart showing an example of encoding process steps by the encoder.

FIG. 5 is a flowchart showing an example of encoding process steps by the encoder 200. The encoder 200 receives input of the RAW image data outputted from the image capture element 153 having the optical black pixel area 162 (step S501), and the gradation correction unit 201 uses a gradation correction algorithm to perform gradation correction on the RAW image data (step S502).

Next, the encoder 200 uses the encoding unit 202 to encode the gradation correction RAW image data (step S503). Then, the encoder 200 uses the recording unit 203 to store the encoded gradation correction RAW image data 300 in the storage device 102 (step S504).

Mechanical Configuration Example of Decoder

Figure 6:
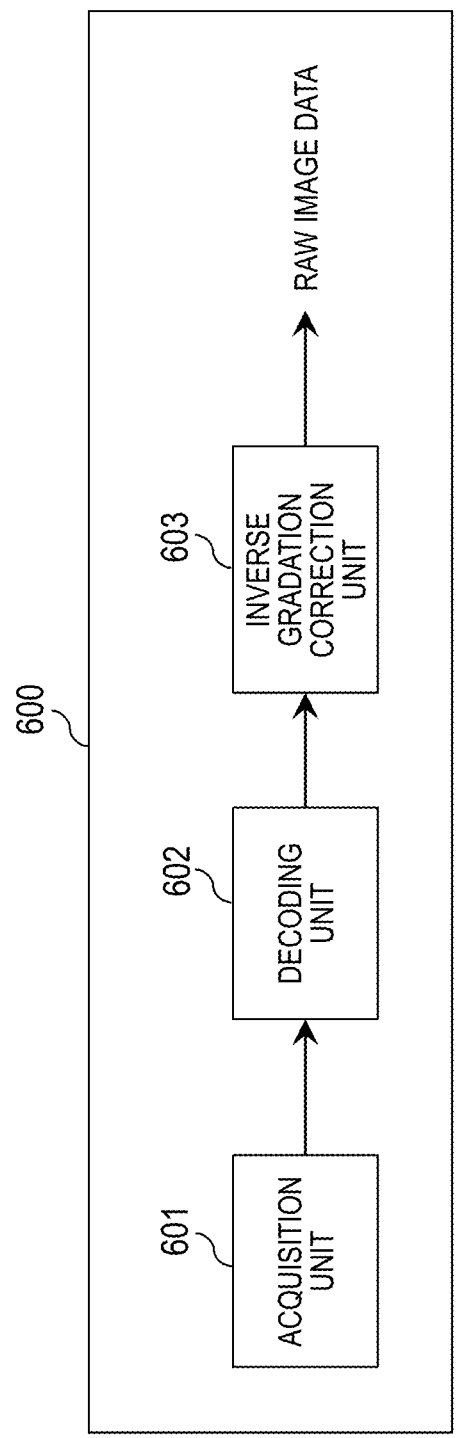
FIG. 6 is a block diagram showing a mechanical configuration example of the decoder.

FIG. 6 is a block diagram showing a mechanical configuration example of the decoder. The decoder 600 has an acquisition unit 601, a decoding unit 602, and an inverse gradation correction unit 603. The acquisition unit 601, the decoding unit 602, and the inverse gradation correction unit 603 are specifically functions realized by the LSI 104, or by the processor 101 executing programs stored in the storage device 102, for example.

The acquisition unit 601 acquires the encoded gradation correction RAW image data 300 encoded by the encoder 200. If the decoder 600 and the encoder 200 can communicate with each other, then the acquisition unit 601 receives the encoded gradation correction RAW image data 300 transmitted from the encoder 200. If the decoder 600 and the encoder 200 are installed in the same device, then the acquisition unit 601 reads the encoded gradation correction RAW image data 300 stored in the storage device 102.

The decoding unit 602 decodes the encoded gradation correction RAW image data 300 to the gradation correction RAW image data using the control information 312. Specifically, for example, the decoding unit identifies the reference frame according to the type of encoded gradation correction RAW image data 300 (I-picture, P-picture, B-picture) and decodes the encoded gradation correction RAW image data 300 to the gradation correction RAW image data.

The inverse gradation correction unit 603 performs inverse gradation correction on the gradation correction RAW image data decoded by the decoding unit 602 to restore the RAW image data prior to gradation correction. Specifically, for example, the inverse gradation correction unit 603 refers to the gradation correction identifier 326 of the control information 312 to identify the gradation correction algorithm applied to the RAW image data, and executes an inverse gradation correction algorithm corresponding to the identified gradation correction algorithm. The inverse gradation correction unit 603 executes a noise reduction process (NR process) when performing inverse gradation correction.

Configuration Example of Decoding Unit 602

Figure 7:
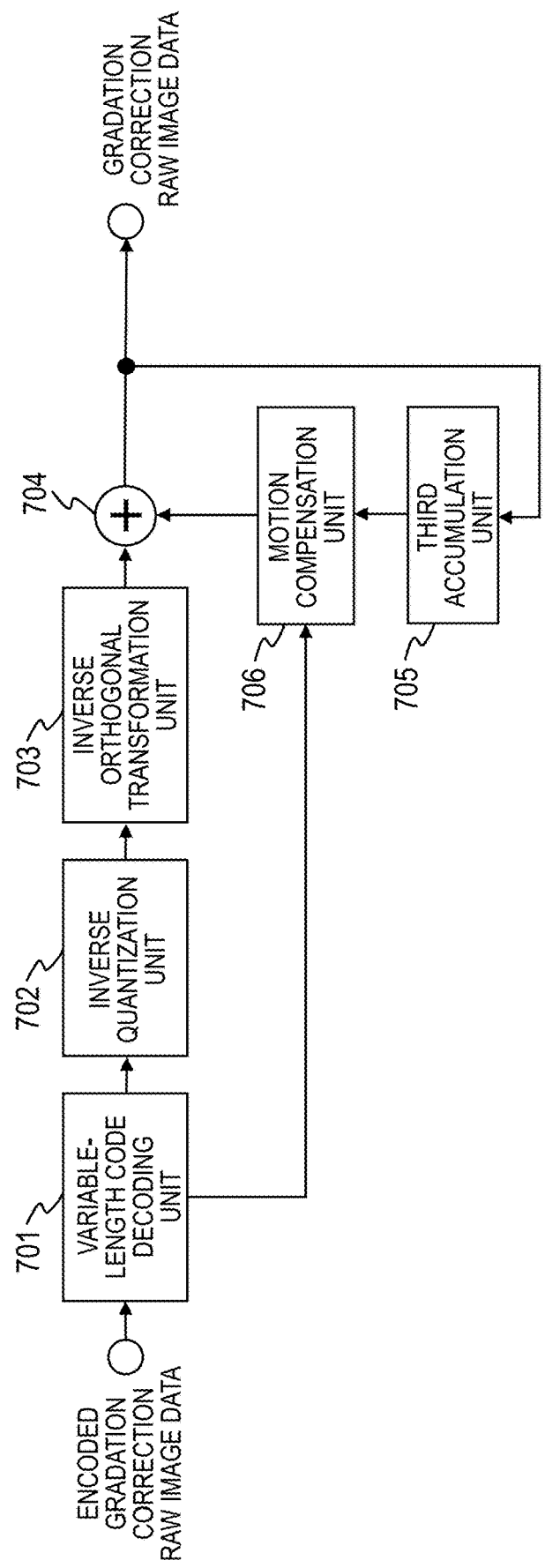
FIG. 7 is a block diagram showing a configuration example of the decoding unit.

FIG. 7 is a block diagram showing a configuration example of the decoding unit 602. The decoding unit 602 has a variable-length code decoding unit 701, an inverse quantization unit 702, an inverse orthogonal transformation unit 703, an addition unit 704, a third accumulation unit 705, and a motion detection unit 706.

The variable-length code decoding unit 701 decodes the inputted encoded gradation correction RAW image data 300 and outputs a quantization coefficient and a motion vector. The decoded quantization coefficient is inputted to the inverse quantization unit 702 and the decoded motion vector is inputted to the motion compensation unit 706.

The inverse quantization unit 702 performs inverse quantization on a quantized coefficient at the block level to decode the frequency coefficient. The inverse orthogonal transformation unit 703 performs inverse orthogonal transformation on the frequency coefficient decoded by the inverse quantization unit 702 to decode the prediction error value (or signal of original image).

The addition unit 704 adds the decoded prediction error value to a prediction value generated by the motion compensation unit 706, thereby outputting the decoded image data at the block level. The image data outputted from the addition unit 704 is outputted as the gradation correction RAW image data and inputted to the third accumulation unit 705.

The third accumulation unit 705 accumulates the decoded value of the image as the reference frame. Image data not referred to in motion compensation prediction thereafter is sequentially deleted from the third accumulation unit 705. The motion compensation unit 706 outputs, to the addition unit 704, the prediction values predicted at the block level for the image to be decoded on the basis of the motion vector and the reference frame.

Example of Decoding Process Steps

Figure 8:
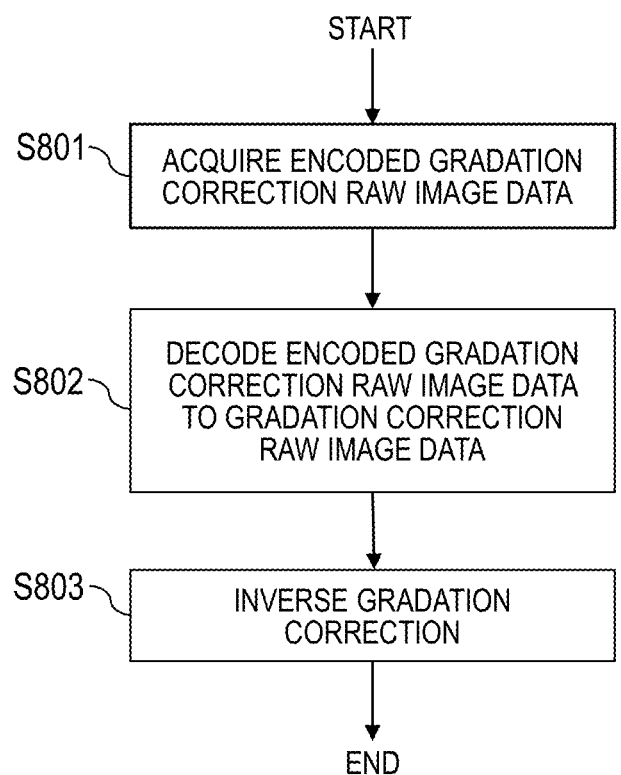
FIG. 8 is a flowchart showing an example of decoding process steps by the decoder.

FIG. 8 is a flowchart showing an example of decoding process steps by the decoder 600. The decoder 600 uses the acquisition unit 601 to acquire the encoded gradation correction RAW image data 300 (step S801), and uses the decoding unit 602 to decode the encoded gradation correction RAW image data 300 to the gradation correction RAW image data (step S2102). Then, the decoder 600 uses the inverse gradation correction unit 603 to perform inverse gradation correction on the decoded gradation correction RAW image data to restore the RAW image data (step S803).

Specific Example of Gradation Correction and Inverse Gradation Correction

Figure 10:
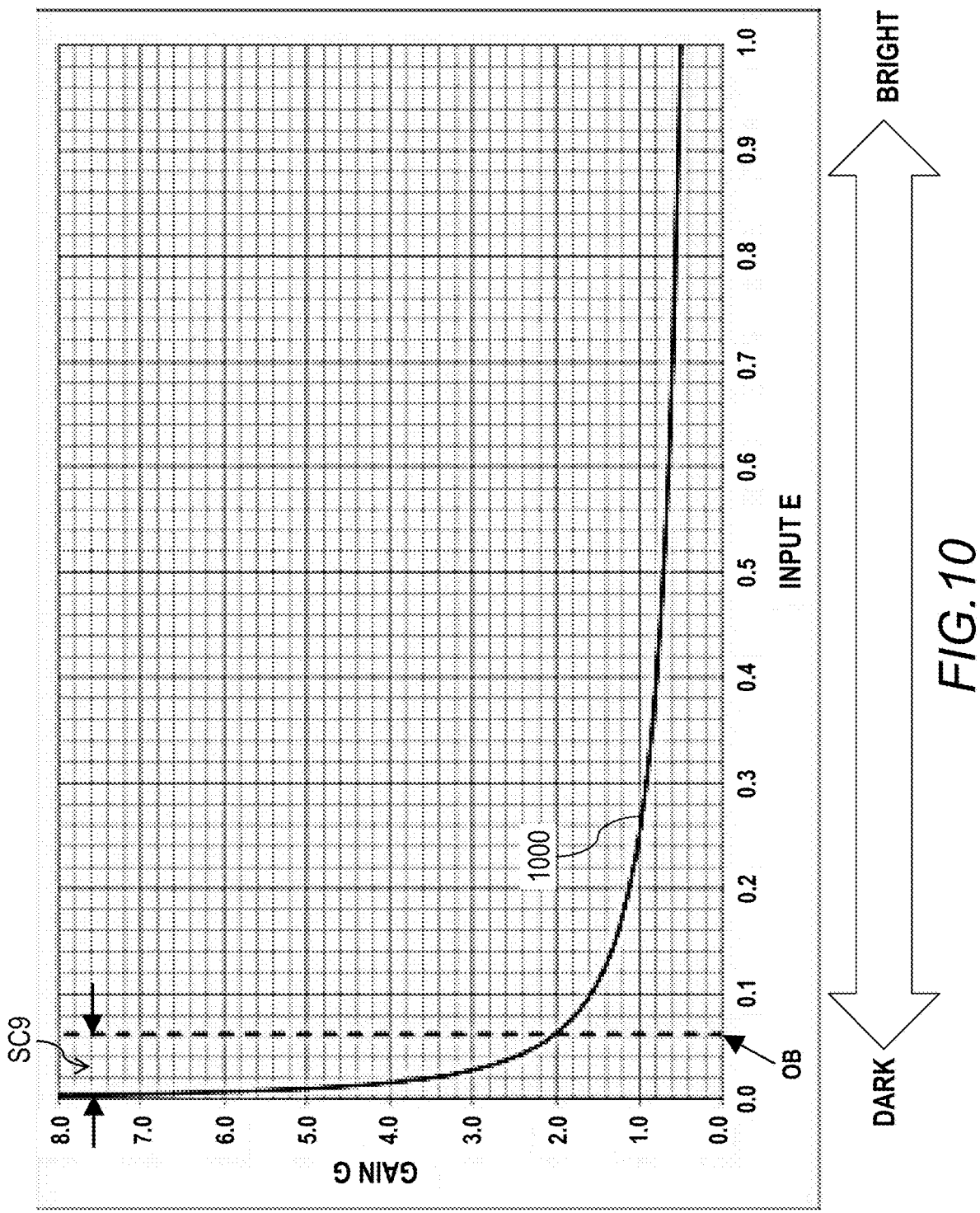
FIG. 10 is a graph showing gain characteristics for gradation correction when the optical black value is not used.
Figure 11:
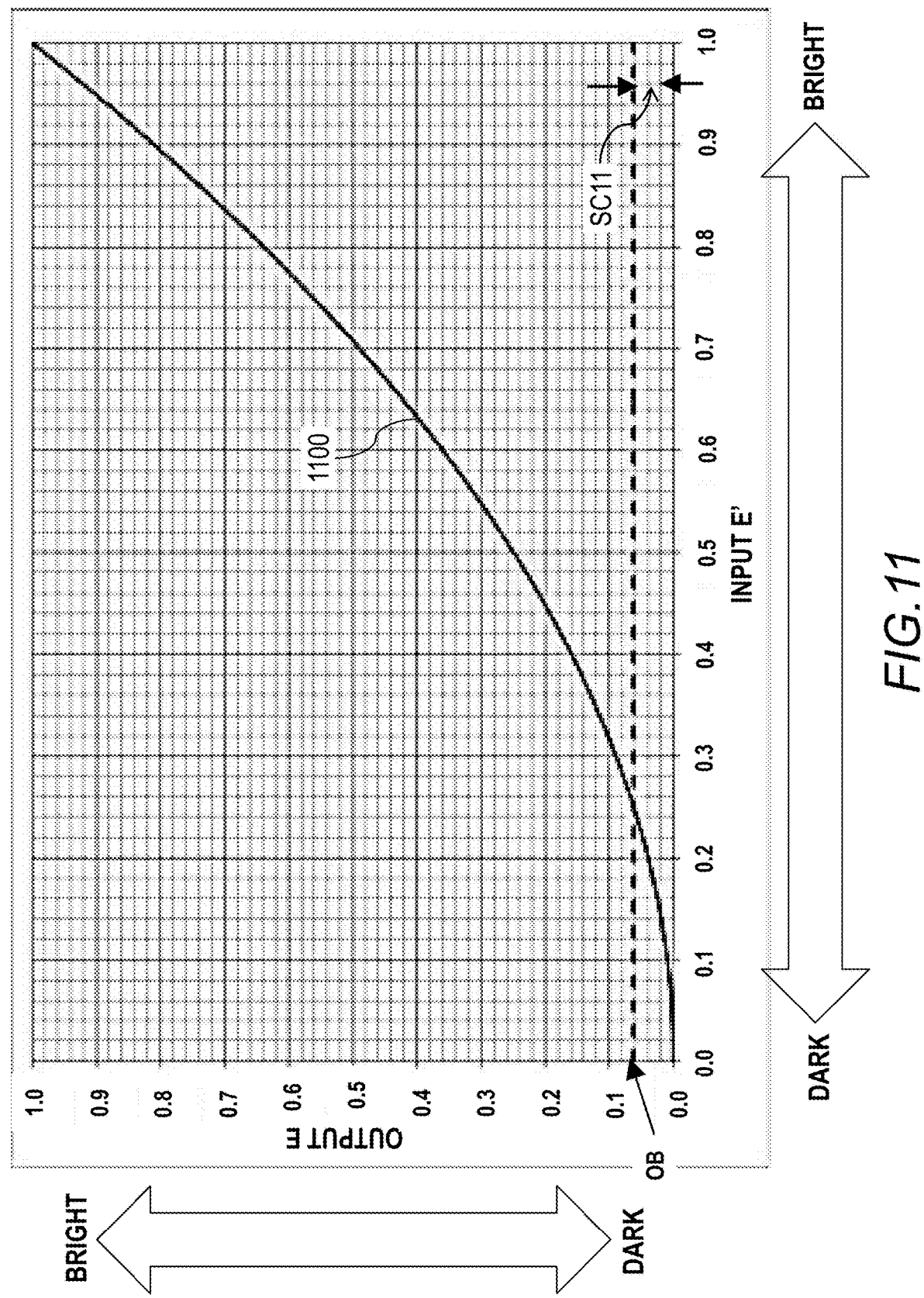
FIG. 11 is a graph showing input-output characteristics for inverse gradation correction when the optical black value is not used.
Figure 12:
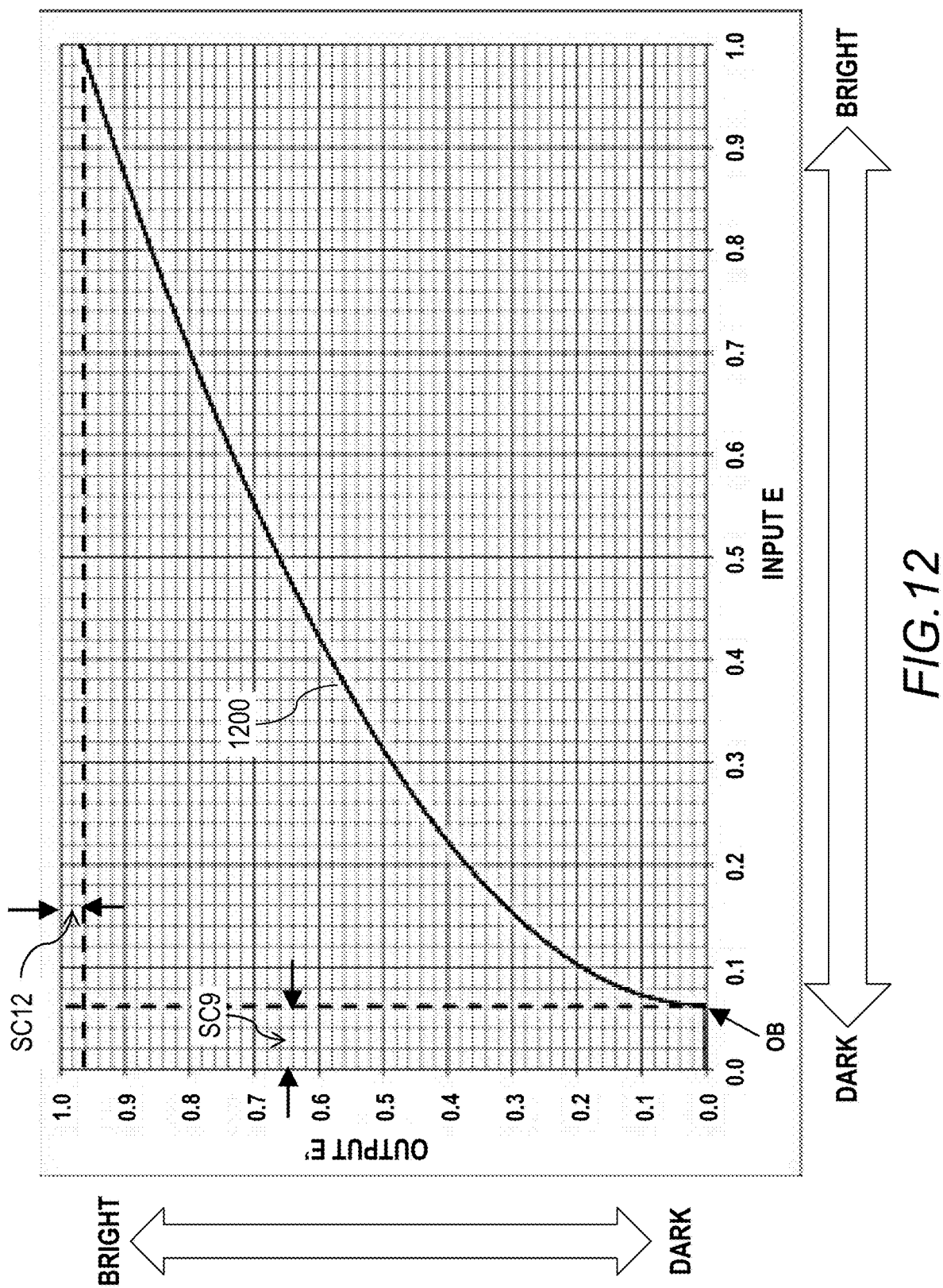
FIG. 12 is a graph showing input-output characteristics 1 for gradation correction when an optical black value is used.
Figure 13:
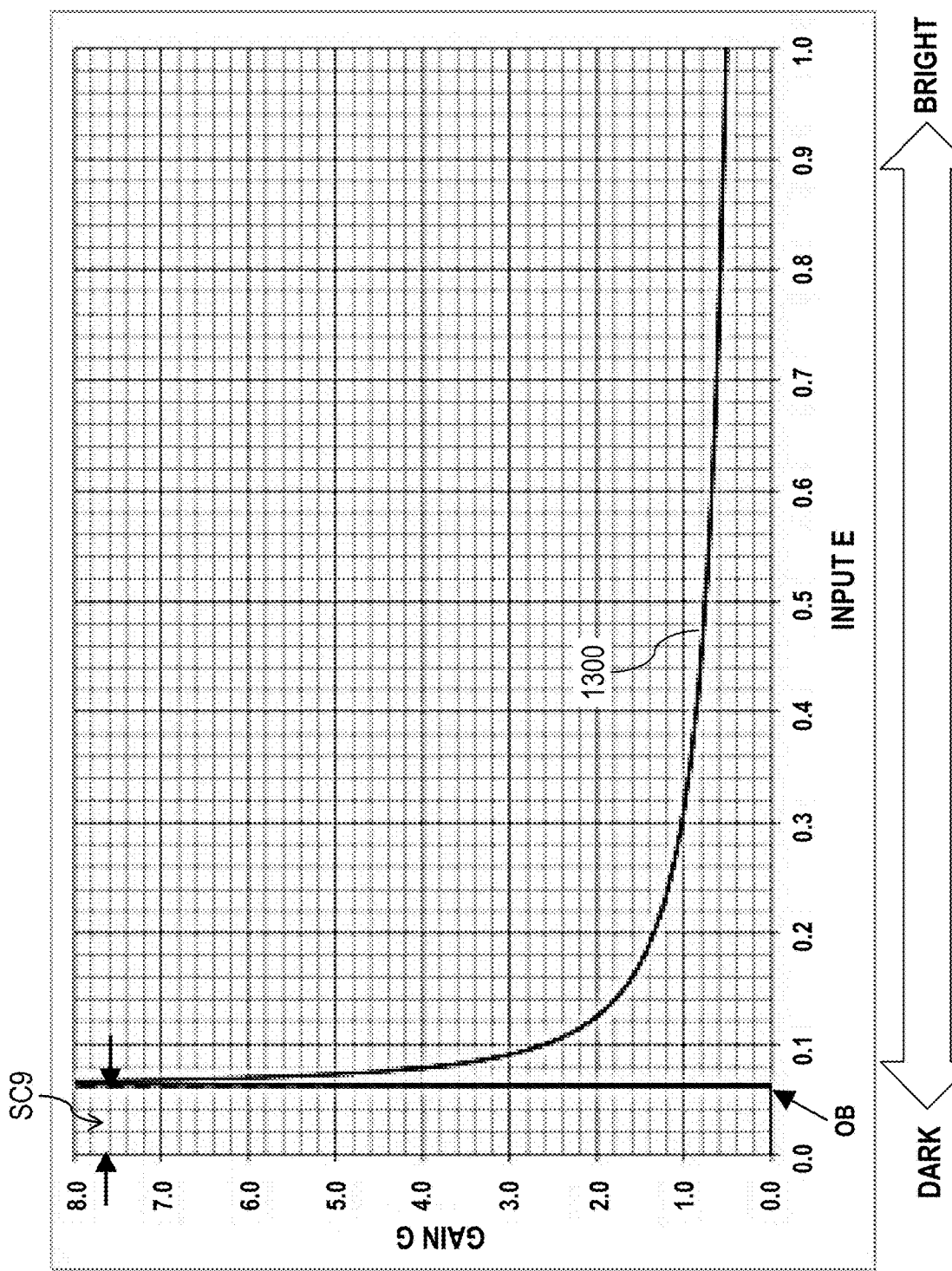
FIG. 13 is a graph showing gain characteristics under input-optical characteristics 1 for gradation correction when an optical black value is used.
Figure 14:
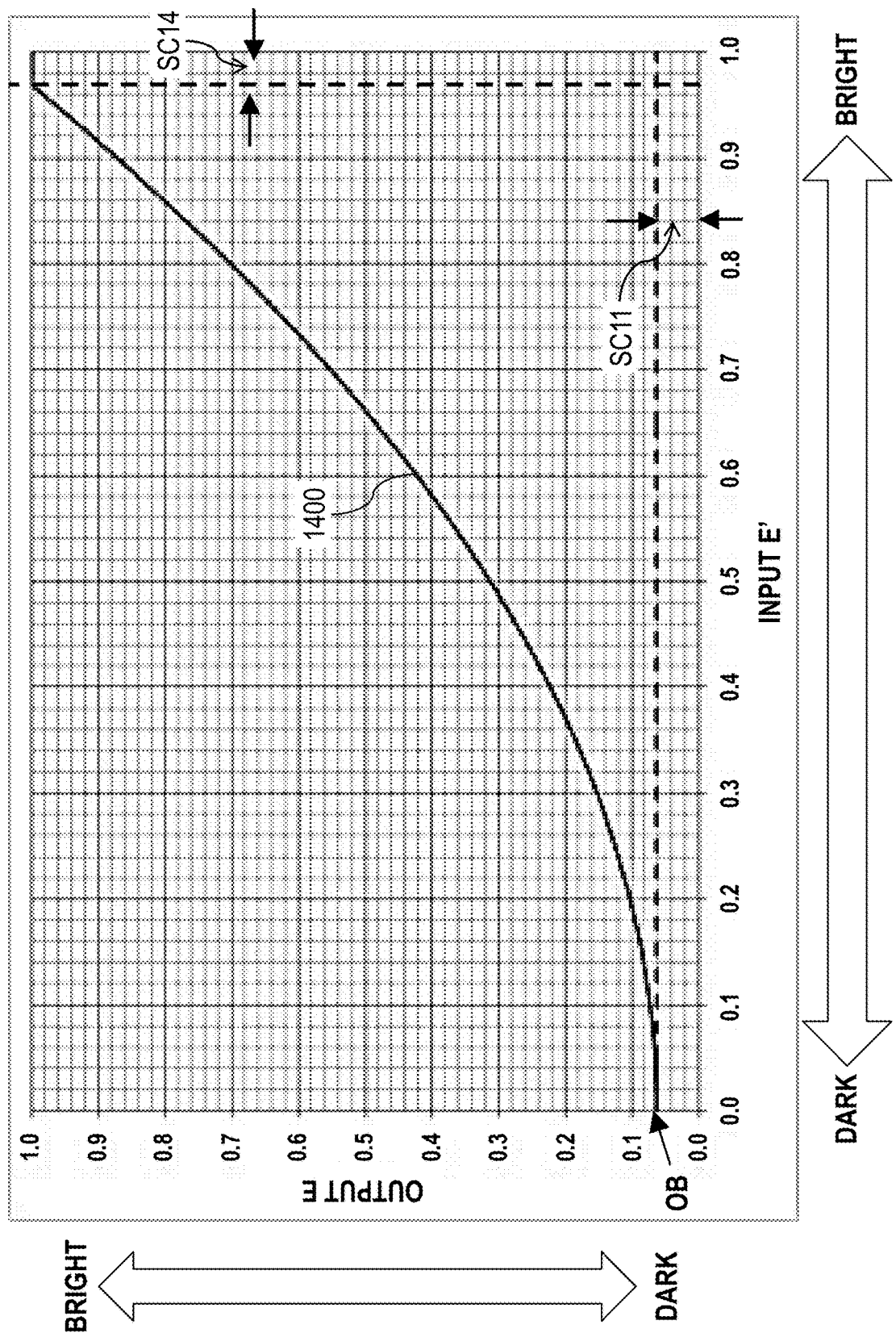
FIG. 14 is a graph showing input-output characteristics 1 for inverse gradation correction when an optical black value is used.
Figure 15:
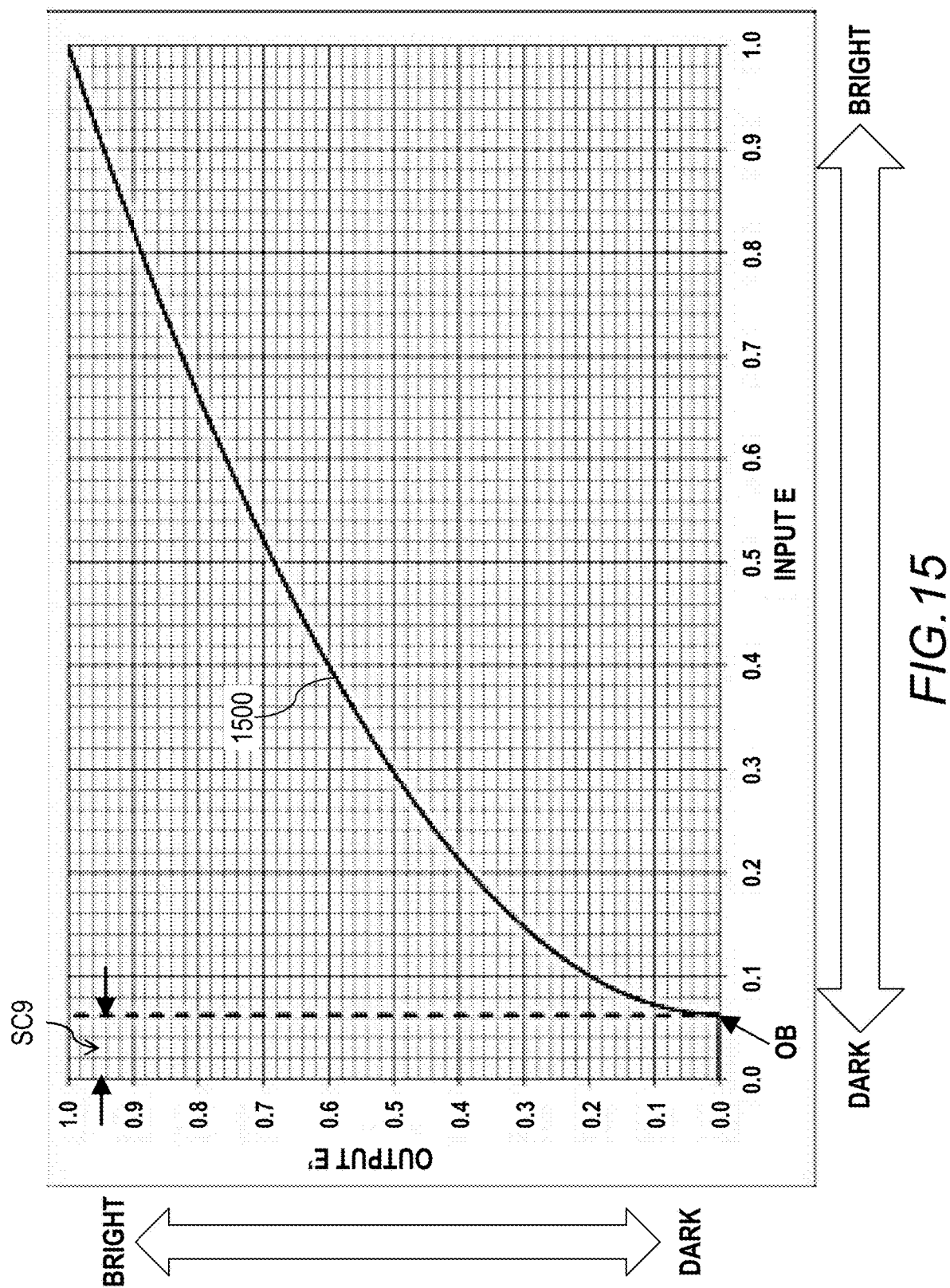
FIG. 15 is a graph showing input-output characteristics 2 for gradation correction when an optical black value is used.
Figure 16:
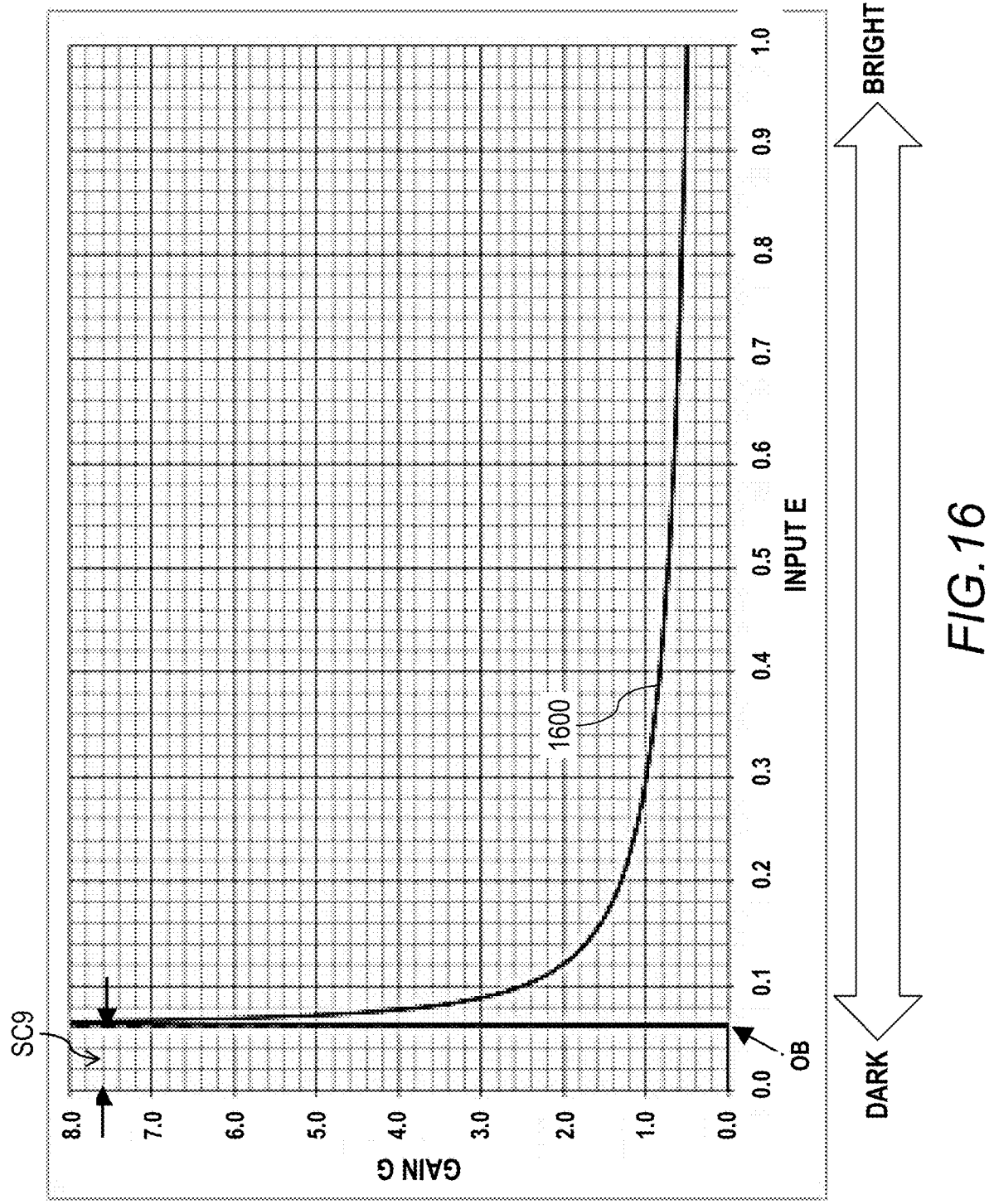
FIG. 16 is a graph showing gain characteristics under input-optical characteristics 2 for gradation correction when an optical black value is used.
Figure 17:
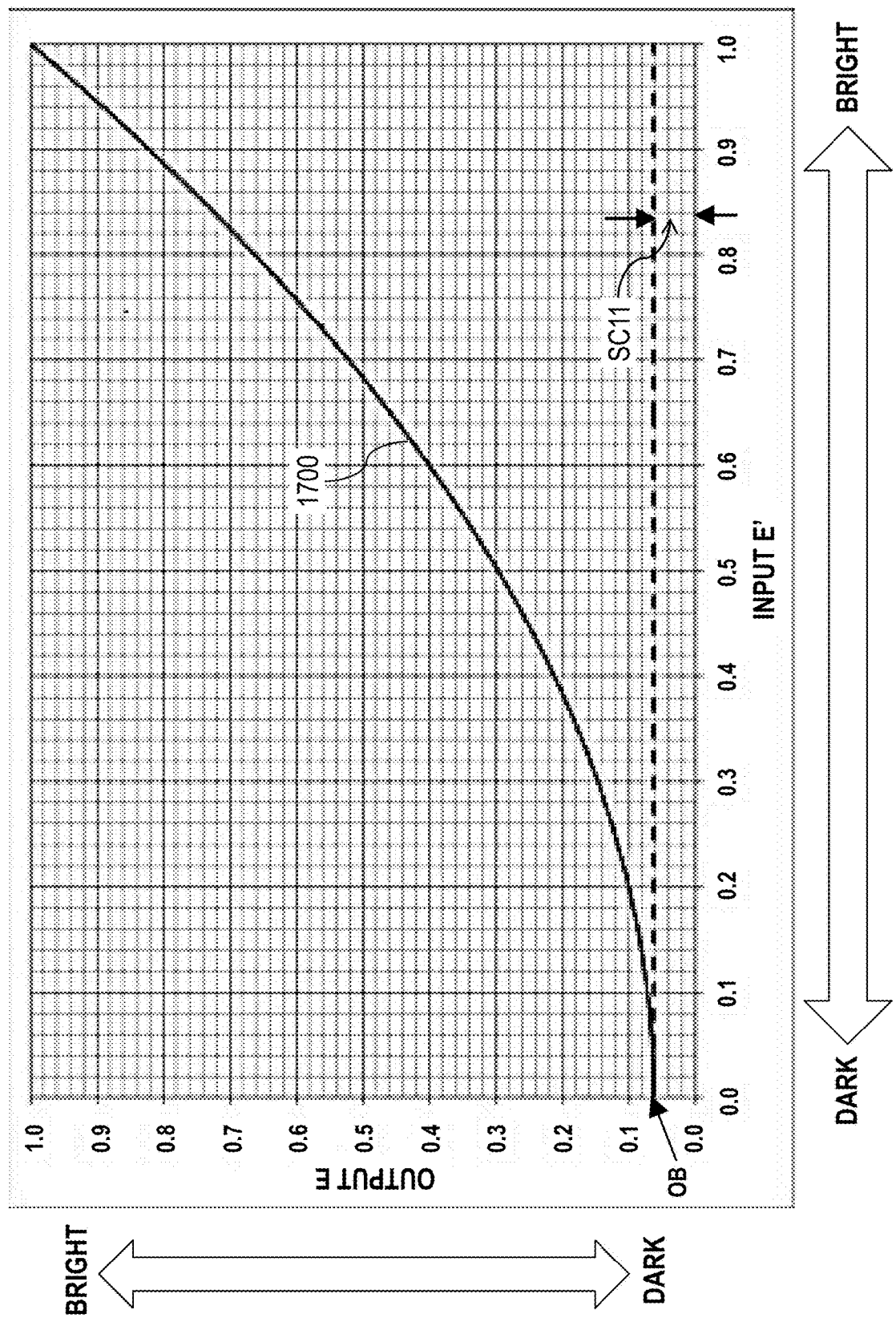
FIG. 17 is a graph showing input-output characteristics 2 for inverse gradation correction when an optical black value is used.

Next, specific examples of gradation correction by the gradation correction unit 201 and inverse gradation correction by the inverse gradation correction unit 603 according to Embodiment 1 will be described with reference to FIGS. 9 to 17. For comparison with Embodiment 1, gradation correction and inverse gradation correction in which an optical black value is not used are indicated in the graphs of FIGS. 9 to 11, gradation correction 1 and inverse gradation correction 1 of Embodiment 1 are indicated in FIGS. 12 to 14, and gradation correction 2 and inverse gradation correction 2 of Embodiment 1 are indicated in FIGS. 15 to 17.

(Characteristics of Gradation Correction when Optical Black Value is not Used)

Figure 9:
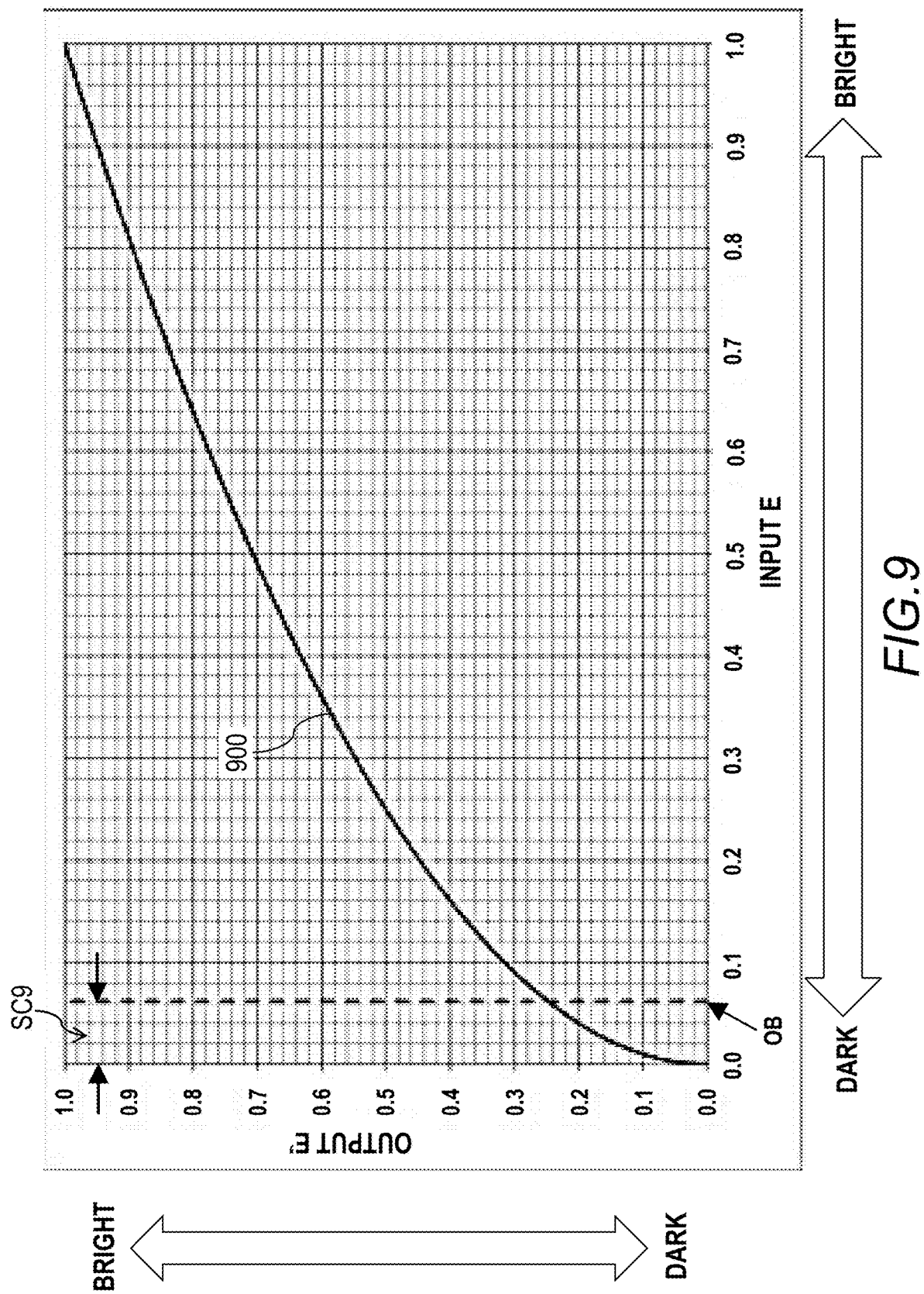
FIG. 9 is a graph showing input-output characteristics for gradation correction when the optical black value is not used.

FIG. 9 is a graph showing input-output characteristics for gradation correction when the optical black value is not used. The horizontal axis indicates the signal level (input signal level E) for the RAW image data from the image capture element 153, and the vertical axis indicates the signal level (output signal level E') for the gradation correction RAW image data. This similarly applies to FIGS. 12, 15, 18, 21, and 24. However, the input signal level E of FIG. 9 is the signal level for RAW image data from an image capture element 153 that does not have the optical black pixel area 162.

Also, the signal level is a voltage indicating the luminance of pixels in the active pixel area 161, for example, and is normalized to within a range of 0.0 to 1.0. Pixels with a low signal level are dark pixels and pixels with a high signal level are bright pixels. OB (optical black) indicates the optical black value.

The gradation correction algorithm shown in the input-output characteristic curve 900 of FIG. 9 is represented by the following formula (1).

$$E' = \text{OETF}[E] = E^{1/\gamma} \quad (1)$$

E represents the signal level of the RAW image data (input signal level), E' represents the signal level of the gradation correction RAW image data (output signal level), OETF[ ] represents a gradation correction function, and γ is the gamma value.

In the input-output characteristic curve 900, gradation correction is executed for an interval SC9 from an input signal level of 0.0 to the optical black value OB. When encoding the RAW image data, both dark and bright portions are subjected to equivalent encoding, and thus, if gamma correction is performed at the developing stage, then the dark portions are emphasized, and the higher the compression rate is, the more apparent the encoding distortion is.

FIG. 10 is a graph showing gain characteristics for gradation correction when the optical black value is not used. The gain is the degree of emphasis of the input signal level E. A gain characteristic curve 1000 for gradation correction when the optical black value is not used is represented by the following formula (2), which is the derivative of formula (1).

$$G = \{\text{OETF}[E]\}' = (1/\gamma) \times E^{\{(1/\gamma)-1\}} \quad (2)$$

G is the gain of the input signal level E. In the gain characteristic curve 1000, the value of the gain G for the interval SC9 from an input signal level E of 0.0 to the optical black value OB is greater than the value of the gain G for the optical black value OB. In other words, the gain of the pixels is large for the interval SC9 in which the value of the input signal level E, which is inactive after developing, is from 0.0 to the optical black value OB. Thus, the gain in the interval of greater than or equal to the optical black value OB, which is active for the image after developing, has a low gain and a lesser effect of mitigating encoding distortion.

FIG. 11 is a graph showing input-output characteristics for inverse gradation correction when the optical black value is not used. The horizontal axis indicates the signal level (input signal level E') for the gradation correction RAW image data, and the vertical axis indicates the signal level (output signal level E) for the RAW image data that has undergone inverse gradation correction from the gradation correction RAW image data.

This similarly applies to FIGS. 14, 17, 20, 23, and 26. However, the output signal level E of FIG. 11 is the signal level for RAW image data, which was restored by inverse gradation correction, from an image capture element 153 that does not have the optical black pixel area 162. Also, similar to FIG. 9, the signal level is a voltage indicating the luminance of pixels in the active pixel area 161, for example, and is normalized to within a range of 0.0 to 1.0. Pixels with a low signal level are dark pixels and pixels with a high signal level are bright pixels.

The inverse gradation correction algorithm shown in the input-output characteristic curve 1100 of FIG. 11 is represented by the following formula (3).

$$E = \text{EOTF}[E'] = E'^{\gamma} \quad (3)$$

E' represents the signal level of the gradation correction RAW image data (input signal level), E represents the signal level of the restored RAW image data (output signal level), EOTF[ ] represents an inverse gradation correction function, and γ is the gamma value.

Characteristic Example 1 of Gradation Correction when Optical Black Value is Used Next, with reference to FIGS. 12 to 14, a characteristic example 1 of gradation correction for when the optical black value is used will be described.

FIG. 12 is a graph showing input-output characteristics 1 for gradation correction when an optical black value is used. In the input-output characteristic curve 1200, the gradation correction unit 201 does not execute gradation correction for an input signal level E lower than the optical black value OB. In other words, in the input-output characteristic curve 1200 of FIG. 12, the output signal level E' is 0.0 for the interval SC9 from when the input signal level E is at 0.0 to the optical black value OB and rises from when the input signal level E is at the optical black value OB, and the output signal level E' reaches the maximum value when the input signal level E is at 1.0.

The gradation correction algorithm shown in the input-output characteristic curve 1200 of FIG. 12 is represented by the following formula (4).

$$E' = \text{OETF}[E] = 0 \quad E < OB$$

$$(E-OB)^{1/\gamma} \quad OB \leq E \quad (4)$$

E represents the signal level of the RAW image data (input signal level), E' represents the signal level of the gradation correction RAW image data (output signal level), OETF[ ] represents a gradation correction function, OB is the optical black value, and $\gamma$ is the gamma value. The gradation correction unit 201 outputs the gradation correction identifier 326 indicating the gradation correction algorithm of formula (4) to the encoding unit 202, and the encoding unit 202 uses the gradation correction identifier 326 from the gradation correction unit 201 as the control information 312 in the header information 301.

FIG. 13 is a graph showing gain characteristics under input-optical characteristics 1 for gradation correction when an optical black value is used. A gain characteristic curve 1300 at an input signal level E for gradation correction when an optical black value is used is represented by the following formula (5), which is the derivative of formula (4).

$$G = \{\text{OETF}[E]\}' = 0 \quad E < OB$$

$$(1/\gamma) \times (E-OB)^{\{(1/\gamma)-1\}} \quad OB \leq E \quad (5)$$

G is the gain of the input signal level E. In the gain characteristic curve 1300, the value of the gain G for the interval from an input signal level E of 0.0 to the optical black value OB is 0.0, and thus, the input signal level E in the interval SC9 from 0.0 to the optical black value OB, which is the dark portion, is not emphasized. Also, the value of the gain G reaches the maximum value at the optical black value OB, and thus, by setting at a high value the gain in the interval of greater than or equal to the optical black value OB, which is active for the image after developing, it is possible to achieve a greater effect of mitigating encoding distortion.

During developing or image adjustment, there are cases in which dark portions should be brightened to allow for greater visibility of figures in dark portions or the like. At this time, distortion of dark portions occurring between the encoding unit 202 and the decoding unit 602 has a tendency to become prominent. By setting the gain G of the dark portion to be large during gradation correction, distortion of dark portions occurring between the encoding unit 202 and the decoding unit 602 can be suppressed. As a result, during developing or image adjustment, even if dark portions are brightened to allow for greater visibility of figures in dark portions or the like, distortion of dark portions has less of a tendency to be prominent.

FIG. 14 is a graph showing input-output characteristics 1 for inverse gradation correction when an optical black value is used. The inverse gradation correction algorithm shown in the input-output characteristic curve 1400 of FIG. 14 is represented by the following formula (6).

$$E = \text{EOTF}[E'] = (E')^\gamma - OB \quad (6)$$

E' represents the signal level of the gradation correction RAW image data (input signal level), E represents the signal level of the restored RAW image data (output signal level), and EOTF[ ] represents an inverse gradation correction function. The inverse gradation correction unit 603 executes the inverse gradation correction of formula (6) if the gradation correction identifier 326 indicating formula (4) is detected in the control information 312.

In the input-output characteristic curve 1400, the restored RAW image data has the optical black value OB as the minimum value for the output signal level E, and thus, by setting at a high value the gain in the interval of greater than or equal to the optical black value OB, which is active for the image after developing, it is possible to achieve a greater effect of mitigating encoding distortion.

Characteristic Example 2 of Gradation Correction when Optical Black Value is Used Next, with reference to FIGS. 15 to 17, a characteristic example 2 of gradation correction for when the optical black value is used will be described. In characteristic example 1 for gradation correction for when the optical black value OB is used, no restoration occurs in the interval SC12, which is the bright portion of the output signal level E', in the input-output characteristic curve 1200 of FIG. 12. In characteristic example 2 of gradation correction for when the optical black value OB is used, the reproducibility of bright portions is improved while mitigating black level degradation with a high reproducibility of the original black as in characteristic example 1 of gradation correction for when the optical black value OB is used.

FIG. 15 is a graph showing input-output characteristics 2 for gradation correction when an optical black value is used. In the input-output characteristic example 2 for gradation correction when using the optical black value OB, similar to the input-output characteristic example 1 for gradation correction when using the optical black value OB, the gradation correction unit 201 does not execute gradation correction for an input signal level E lower than the optical black value OB.

In other words, in the input-output characteristic curve 1500 of FIG. 15, the output signal level E' is 0.0 for the interval SC9 from when the input signal level E is at 0.0 to the optical black value and rises from when the input signal level E is at the optical black value OB, and the output signal level E' reaches the upper limit of 1.0 when the input signal level E is at 1.0.

The gradation correction algorithm shown in the input-output characteristic curve 1500 of FIG. 15 is represented by the following formula (7).

$$E' = \text{OETF}[E] = 0 \quad E < OB$$

$$\{(E-OB)/(1-OB)\}^{1/\gamma} \quad OB \leq E \quad (7)$$

E represents the signal level of the RAW image data (input signal level), E' represents the signal level of the gradation correction RAW image data (output signal level), OETF[ ] represents a gradation correction function, OB is the optical black value, and $\gamma$ is the gamma value. The gradation correction unit 201 outputs the gradation correction identifier 326 indicating the gradation correction algorithm of formula (7) to the encoding unit 202, and the encoding unit 202 uses the gradation correction identifier 326 from the gradation correction unit 201 as the control information 312 in the header information 301.

Thus, by setting the maximum value for the output signal level E' to 1.0, it is possible to improve color reproduction in the bright portions as compared to the input-output characteristic curve 1200.

FIG. 16 is a graph showing gain characteristics under input-optical characteristics 2 for gradation correction when an optical black value is used. A gain characteristic curve 1600 at an input signal level E for gradation correction when an optical black value is used is represented by the following formula (8), which is the derivative of formula (7).

$$G=\{OETF[E]\}'=0 \quad E<OB$$

$$(1/\gamma) \times \{(E-OB)/(1-OB)\}^{(1/\gamma)-1} \quad OB \leq E \qquad (8)$$

G is the gain of the input signal level E. The value of the gain G for the interval SC9 from an input signal level E of 0.0 to the optical black value OB is 0.0, and thus, the input signal level E in the interval SC9 from 0.0 to the optical black value OB, which is the dark portion, is not emphasized. Also, the value of the gain G reaches the maximum value (infinity) at the optical black value OB, and thus, by setting at a high value the gain in the interval of greater than or equal to the optical black value OB, which is active for the image after developing, it is possible to achieve a greater effect of mitigating encoding distortion.

Similar to the input-output characteristic example 1 for gradation correction when using the optical black value, by setting the gain G of the dark portion to be large during gradation correction, distortion of dark portions occurring between the encoding unit 202 and the decoding unit 602 can be suppressed. As a result, during developing or image adjustment, even if dark portions are brightened to allow for greater visibility of figures in dark portions or the like, distortion of dark portions has less of a tendency to be prominent.

FIG. 17 is a graph showing input-output characteristics 2 for inverse gradation correction when an optical black value is used. The inverse gradation correction algorithm shown in the input-output characteristic curve 1700 of FIG. 17 is represented by the following formula (9).

$$E=EOTF[E']=(1-OB)\times(E')^{\gamma}+OB \qquad (9)$$

E' represents the signal level of the gradation correction RAW image data (input signal level), E represents the signal level of the restored RAW image data (output signal level), and EOTF[ ] represents an inverse gradation correction function. The inverse gradation correction unit 603 executes the inverse gradation correction of formula (9) if the gradation correction identifier 326 indicating formula (7) is detected in the control information 312.

Similar to the input-output characteristic example 1 of gradation correction when using the optical black value OB, the restored RAW image data has the optical black value OB as the minimum value for the output signal level E, and thus, the color of the pixel in the interval SC11 where the output signal level E is from 0.0 to the optical black value OB is not reproduced, and by setting at a high value the gain in the interval of greater than or equal to the optical black value OB, which is active for the image after developing, it is possible to achieve a greater effect of mitigating encoding distortion.

Also, the input-output characteristic curve 1700 of FIG. 17, unlike the input-output characteristic curve 1400 of FIG. 14, does not have the interval SC14 where the input signal level E' is not present. In other words, in the input-output characteristic example 2 for gradation correction when using the optical black value OB, it is possible to improve color reproduction for pixels in the bright portions.

Embodiment 2

Embodiment 2 is an example in which an input signal level E less than or equal to the optical black value OB is replicated while the gain G of the optical black value OB is maximized in the manner of the input-output characteristic example 2 of gradation correction for when the optical black value of Embodiment 1 is used. In Embodiment 2, differences from Embodiment 1 will be primarily described, and descriptions of the same configurations and content as Embodiment 1 are applicable to Embodiment 2 as well, and descriptions thereof are omitted.

Figure 18:
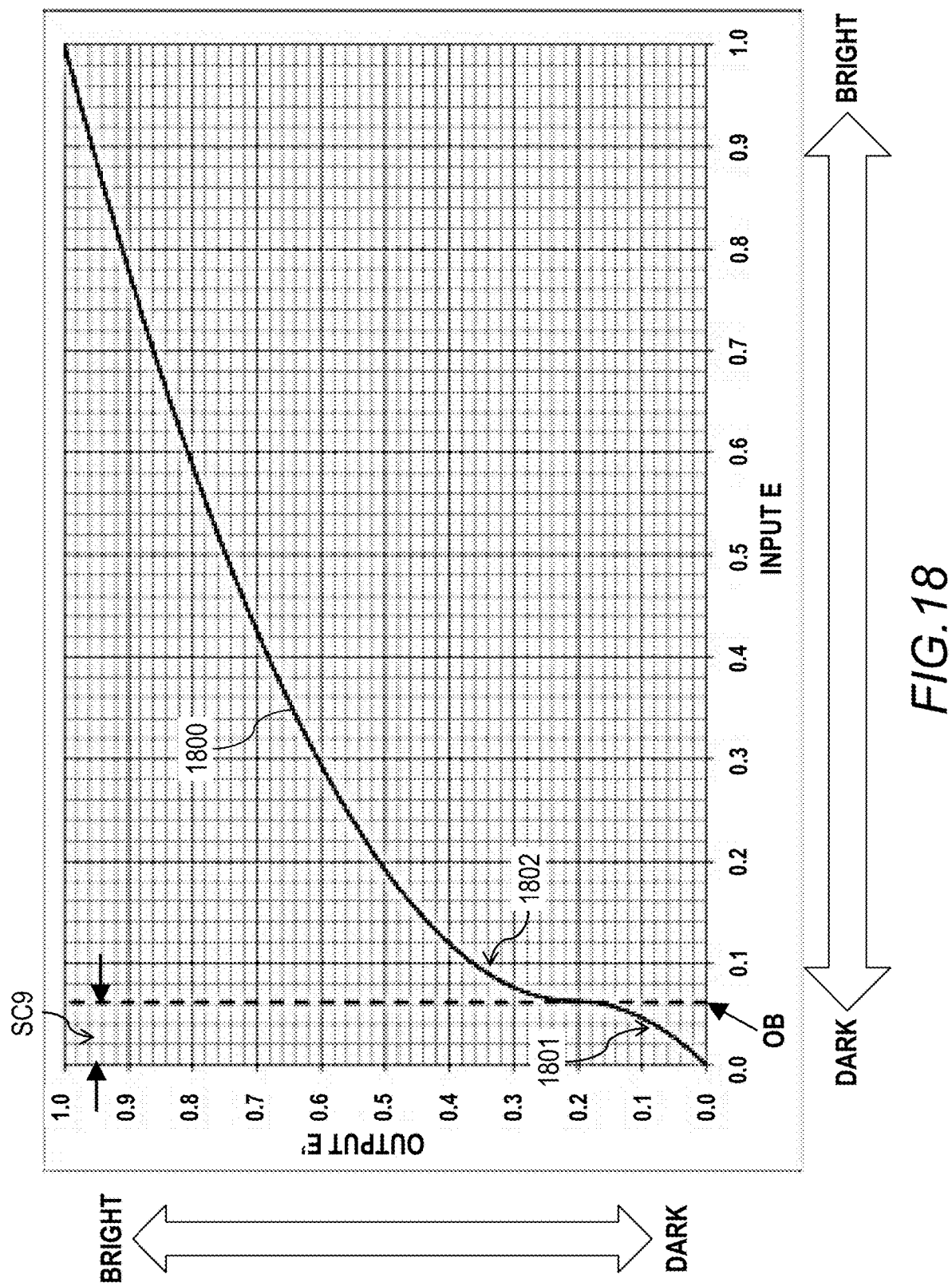
FIG. 18 is a graph showing input-output characteristics 3 for gradation correction when an optical black value is used.

FIG. 18 is a graph showing input-output characteristics 3 for gradation correction when an optical black value is used. In the input-output characteristic example 3 for gradation correction when using the optical black value, unlike the input-output characteristic examples 1 and 2 of gradation correction when using the optical black value, the gradation correction unit 201 executes negative gradation correction for input signal levels E lower than the optical black value OB, or in other words, executes negative 1/γ correction, and executes positive gradation correction for input signal levels E greater than or equal to the optical black value OB, or in other words, executes positive 1/γ correction.

Specifically, for example, in the input-output characteristic curve 1800, a waveform 1801 in the interval SC9 is a waveform attained from negative 1/γ correction, and a waveform 1802 of the interval greater than or equal to the optical black value OB is a waveform attained from positive 1/γ correction.

The gradation correction algorithm shown in the input-output characteristic curve 1800 of FIG. 18 is represented by the following formula (10).

$$E'=OETF[E]=-\alpha\times\{(OB-E)/(1-OB)\}^{1/\gamma}+\beta \quad E<OB$$

$$\alpha\times\{(E-OB)/(1-OB)\}^{1/\gamma}+\beta \quad OB \leq E \qquad (10)$$

where
$\alpha=1/\{1\pm\{OB/(1-OB)\}^{1/\gamma}\}$
$\beta=\alpha\times\{OB/(1-OB)\}^{1/\gamma}$ E represents the signal level of the RAW image data (input signal level), E' represents the signal level of the gradation correction RAW image data (output signal level), OETF[ ] represents a gradation correction function, OB is the optical black value, and γ is the gamma value.

In formula (10), the formula for when the condition is E<OB is the formula for negative 1/γ correction, and the formula for when the condition is OB≤E is the formula for positive 1/γ correction. The gradation correction unit 201 outputs the gradation correction identifier 326 indicating the gradation correction algorithm of formula (10) to the encoding unit 202, and the encoding unit 202 uses the gradation correction identifier 326 from the gradation correction unit 201 as the control information 312 in the header information 301.

By executing negative 1/γ correction in the interval SC9, it is possible to improve color reproduction in the vicinity of the optical black value OB in the RAW image data that has undergone gradation correction. In other words, in the portion of the input-output characteristic curve 1800 in the vicinity of the optical black value OB, noise on the side where the input signal level E is less than the optical black value OB (negative direction) and noise on the side where the input signal level E is greater than the optical black value OB (positive direction) cancel each other out in a noise reduction process, which allows for more efficient noise reduction than in Embodiment 1. Thus, it is possible to mitigate black level degradation in the vicinity of the optical black value OB in the RAW image data that has undergone gradation correction, and improve color reproduction.

Figure 19:
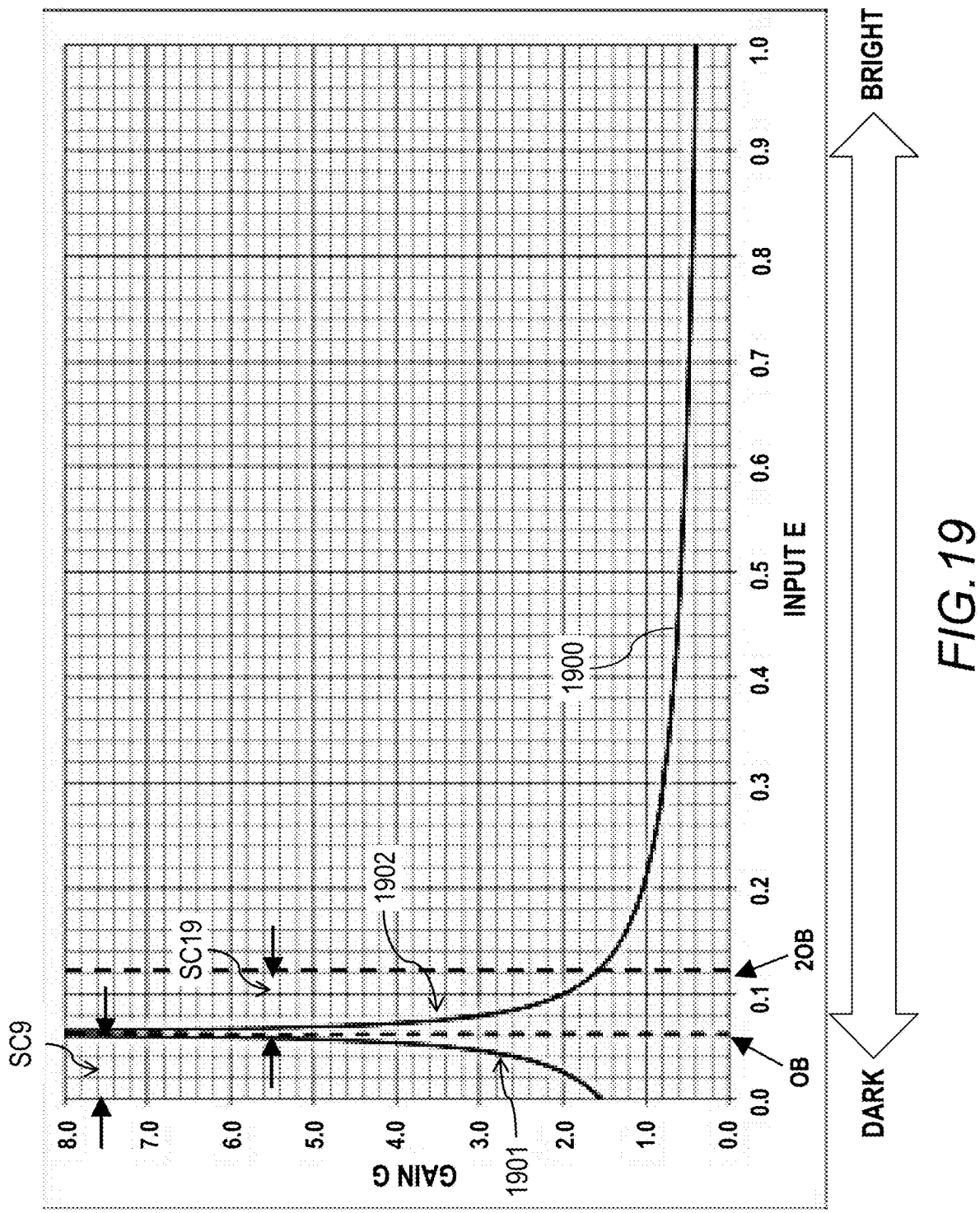
FIG. 19 is a graph showing gain characteristics under input-optical characteristics 3 for gradation correction when an optical black value is used.

FIG. 19 is a graph showing gain characteristics under input-optical characteristics 3 for gradation correction when an optical black value is used. A gain characteristic curve 1900 at an input signal level E for gradation correction when an optical black value is used is represented by the following formula (11), which is the derivative of formula (10).

$$G=\{OETF[E]\}'=(\alpha/\gamma)\times\{(OB-E)/(1-OB)\}^{(1/\gamma)-1} \quad E<OB$$

$$(\alpha/\gamma)\times\{(E-OB)/(1-OB)\}^{(1/\gamma)-1} \quad OB\leq E \quad (11)$$

G is the gain of the input signal level E. Specifically, in the gain characteristic curve 1900, for example, the gain G takes on the minimum value when the input signal level E is at 0.0 in the interval SC9, increases from 0.0, and reaches the maximum value (infinity) when the input signal level E reaches the optical black value OB.

An interval SC19 is an interval from the optical black value OB to a value 2OB for the input signal level E, which is double the optical black value OB. In the interval SC19, the gain G takes on the maximum value (infinity) where the input signal level E is at the optical black value OB, and is reduced from the optical black value OB, reaching the minimum value at 2OB. In other words, the waveform 1901 indicating the gain characteristics in the interval SC9 and the waveform 1902 indicating the gain characteristics in the interval SC19 are in linear symmetry about the optical black value OB.

As a result, the optical black value OB is the maximum value for the gain G in the interval SC9 and the interval SC19, which are dark portions. Also, the gain G attenuates, the farther the input signal level E is from the optical black value OB in the interval SC9 and the interval SC19. Thus, by setting at a high value the gain in the interval of greater than or equal to the optical black value OB, which is active for the image after developing, it is possible to achieve a greater effect of mitigating encoding distortion as well as reducing noise occurring in the dark portions.

Also, the waveforms 1901 and 1902 are in linear symmetry about the optical black value OB, and thus, in the vicinity of the optical black value OB, noise on the side where the input signal level E is less than the optical black value OB (negative direction) and noise on the side where the input signal level E is greater than the optical black value OB (positive direction) cancel each other out to reduce noise, and thus, it is possible to mitigate black level degradation.

Also, similar to Embodiment 1, by setting the gain G of the dark portion to be large during gradation correction, distortion of dark portions occurring between the encoding unit 202 and the decoding unit 602 can be suppressed. As a result, during developing or image adjustment, even if dark portions are brightened to allow for greater visibility of figures in dark portions or the like, distortion of dark portions has less of a tendency to be prominent.

Figure 20:
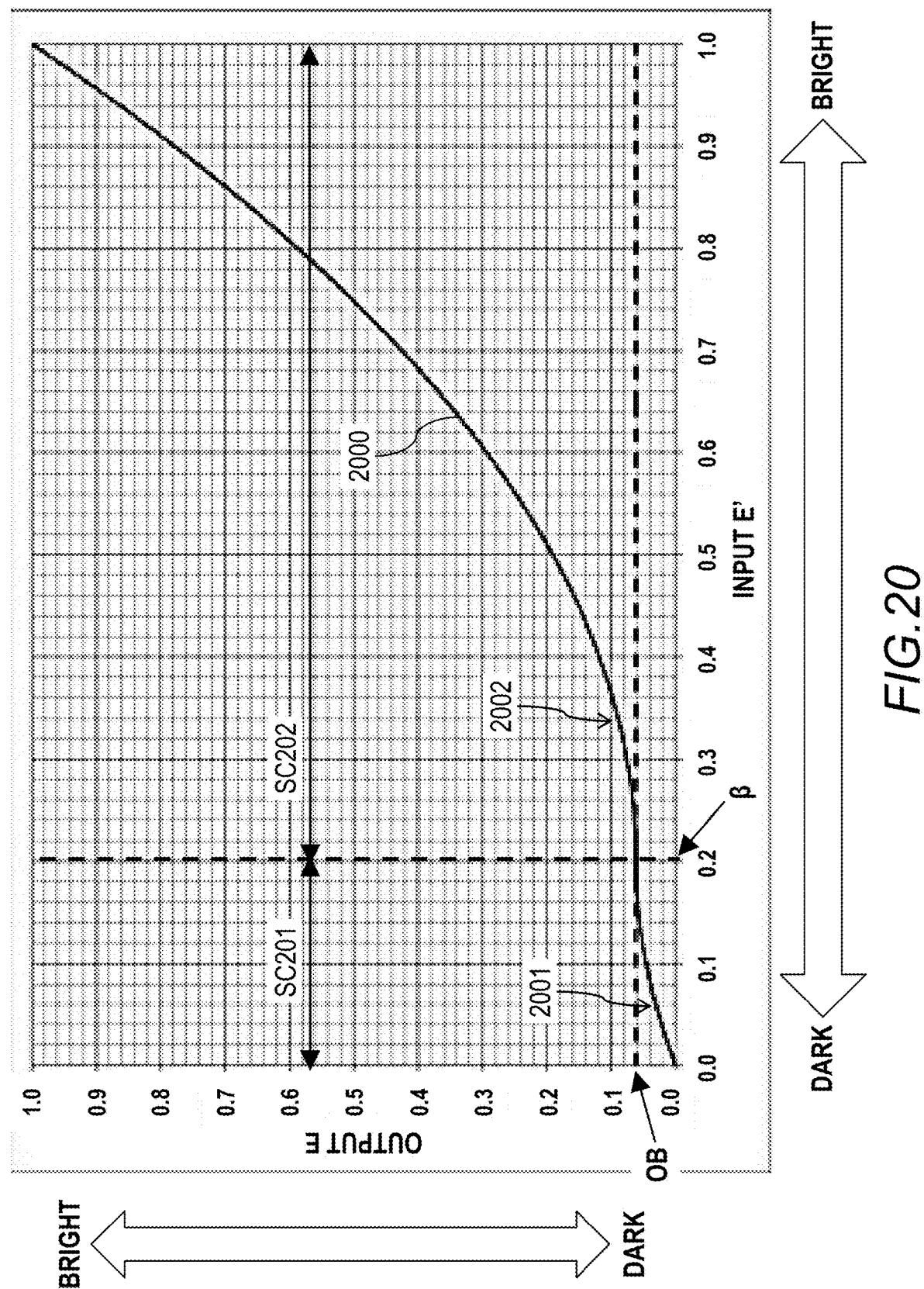
FIG. 20 is a graph showing input-output characteristics 3 for inverse gradation correction when an optical black value is used.

FIG. 20 is a graph showing input-output characteristics 3 for inverse gradation correction when an optical black value is used. The inverse gradation correction unit 603 executes positive inverse gradation correction for a value greater than or equal to β for a given input signal level E' of the gradation correction RAW image data, or in other words, executes positive γ correction, and executes negative inverse gradation correction for input signal levels less than β, or in other words, executes negative γ correction.

An interval SC201 is an interval where the input signal level E' is from 0.0 to β indicated in formula (10), and an interval SC202 is an interval where the input signal level E' is from β to 1.0. Specifically, for example, in the input-output characteristic curve 2000, a waveform 2001 in the interval SC201 is a waveform attained from negative γ correction, and a waveform 2002 of the interval SC202 is a waveform attained from positive γ correction.

The inverse gradation correction algorithm shown in the input-output characteristic curve 2000 of FIG. 20 is represented by the following formula (12).

$$E=EOTF[E']=OB-(1-OB)\times\{(E'-\beta)/\alpha\}^\gamma \quad E'<\beta$$

$$OB+(1-OB)\times\{(E'-\beta)/\alpha\}^\gamma \quad \beta\leq E' \quad (12)$$

where
$\alpha=1/\{1+\{OB/(1-OB)\}^{1/\gamma}\}$
$\beta=\alpha\times\{OB/(1-OB)\}^{1/\gamma}$ E' represents the signal level of the gradation correction RAW image data (input signal level), E represents the signal level of the restored RAW image data (output signal level), and EOTF[ ] represents an inverse gradation correction function. In formula (12), the formula for when the condition is E'<β is the formula for negative γ correction, and the formula for when the condition is β≤E' is the formula for positive γ correction. The inverse gradation correction unit 603 executes the inverse gradation correction of formula (12) if the gradation correction identifier 326 indicating formula (10) is detected in the control information 312.

By executing negative γ correction in the interval SC201, it is possible to increase the effect of mitigating encoding distortion in the vicinity of the optical black value OB in the restored RAW image data that has undergone inverse gradation correction, and it is possible to reduce noise occurring in the dark portions, and thus, it is possible to improve color reproduction.

Embodiment 3

Embodiment 3 is an example in which the gain of dark portions is increased as compared to Embodiment 2. In Embodiment 3, differences from Embodiment 2 will be primarily described, and descriptions of the same configurations and content as Embodiment 2 are applied to Embodiment 3 as well, and descriptions thereof are omitted.

Figure 21:
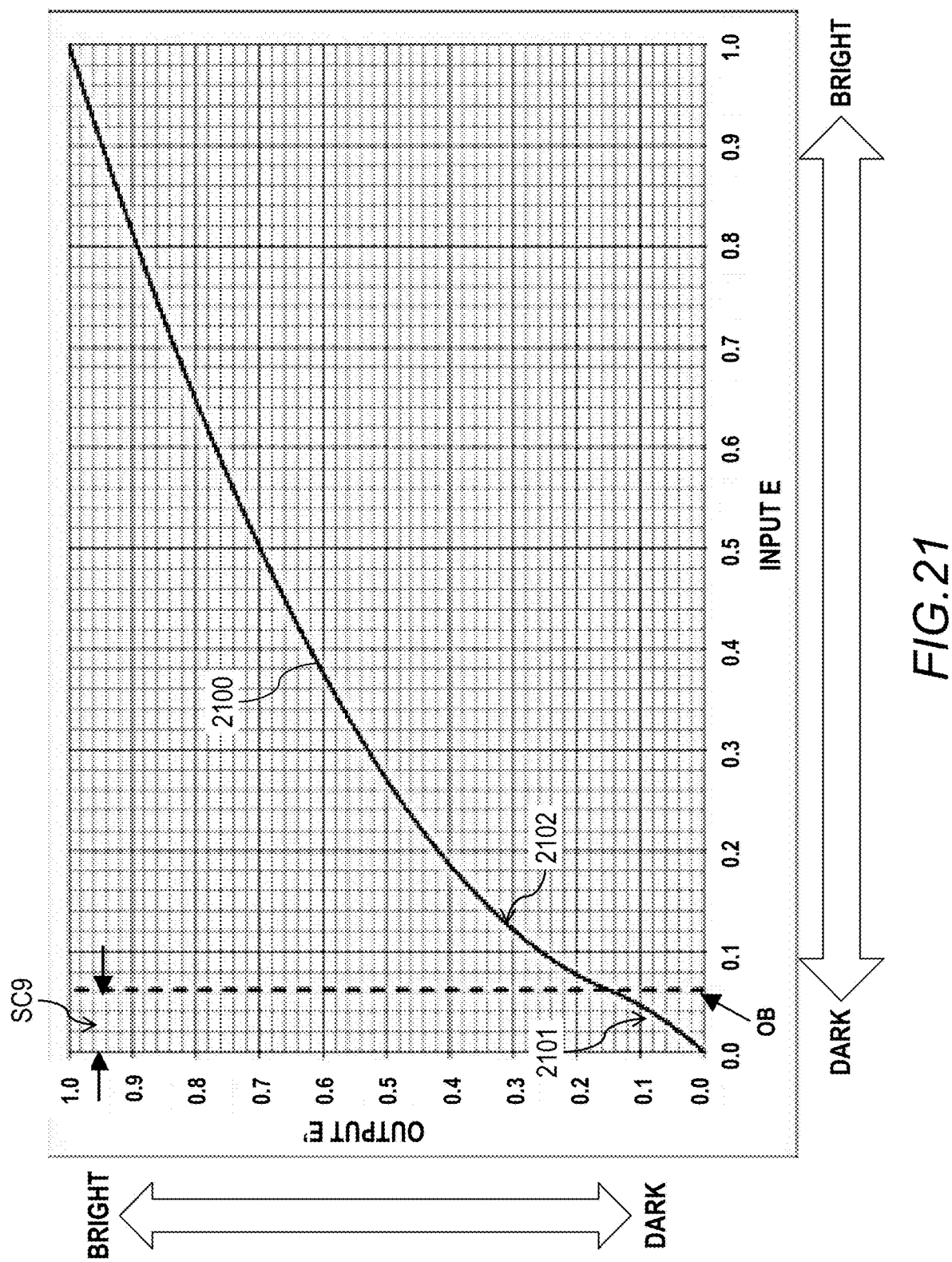
FIG. 21 is a graph showing input-output characteristics 4 for gradation correction when an optical black value is used.

FIG. 21 is a graph showing input-output characteristics 4 for gradation correction when an optical black value is used. In the input-output characteristic example 4 of gradation correction when using the optical black value, the gradation correction unit 201 executes negative gradation correction for input signal levels E lower than the optical black value OB, or in other words, executes negative offset 1/γ correction, and executes positive gradation correction for input signal levels E greater than or equal to the optical black value OB, or in other words, executes positive offset 1/γ correction.

Specifically, for example, in the input-output characteristic curve 2100, a waveform 2101 in the interval SC9 is a waveform attained from negative offset 1/γ correction, and a waveform 2102 of the interval greater than or equal to the optical black value OB is a waveform attained from positive offset 1/γ correction.

The gradation correction algorithm shown in the input-output characteristic curve 2100 of FIG. 21 is represented by the following formula (13).

$$E' = \text{OETF}[E] = \text{OUT}[1] - C \times \{(OB-E+K)^{1/\gamma} - K^{1/\gamma}\}$$
$$E < OB$$

$$\text{OUT}[1] + C \times \{(E-OB+K)^{1/\gamma} - K^{1/\gamma}\} \quad OB \leq E \quad (13)$$

where
$K = (g \times \gamma)^{\gamma/(1-\gamma)}$
$C = 1/\{(OB+K)^{1/\gamma} + (1-OB+K)^{1/\gamma} - 2K^{1/\gamma}\}$
$\text{OUT}[1] = C \times \{(OB+K)^{1/\gamma} - K^{1/\gamma}\}$ E represents the signal level of the RAW image data (input signal level), E' represents the signal level of the gradation correction RAW image data (output signal level), OETF[ ] represents a gradation correction function, OB is the optical black value, γ is the gamma value, and g is the calculated provisional gain. In formula (13), the formula for when the condition is E<OB is the formula for negative offset 1/γ correction, and the formula for when the condition is OBE is the formula for positive offset 1/γ correction. The gradation correction unit 201 outputs the gradation correction identifier 326 indicating the gradation correction algorithm of formula (13) to the encoding unit 202, and the encoding unit 202 uses the gradation correction identifier 326 from the gradation correction unit 201 as the control information 312 in the header information 301.

Figure 22:
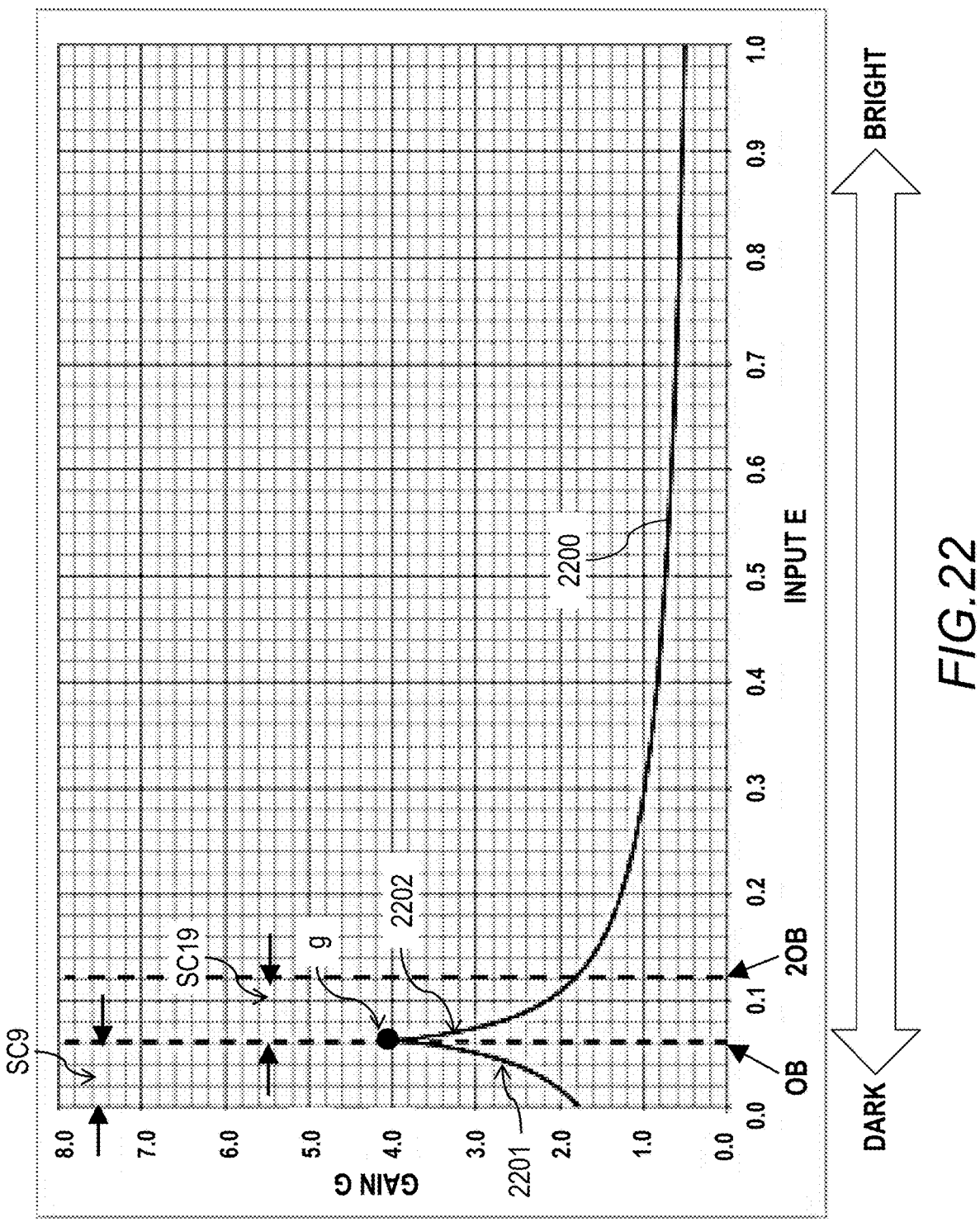
FIG. 22 is a graph showing gain characteristics under input-optical characteristics 4 for gradation correction when an optical black value is used.

FIG. 22 is a graph showing gain characteristics under input-optical characteristics 4 for gradation correction when an optical black value is used. A gain characteristic curve 2200 at an input signal level E for gradation correction when an optical black value is used is represented by the following formula (14), which is the derivative of formula (13).

$$G = \{\text{OETF}[E]\}' = (C/\gamma) \times (OB-E+K)^{(1/\gamma)-1} E < OB$$

$$(C/\gamma) \times (E-OB+K)^{(1/\gamma)-1} OB \leq E \quad (14)$$

G is the gain of the input signal level E. Specifically, in the gain characteristic curve 2200, for example, the gain G takes on the minimum value when the input signal level E is at 0.0 in the interval SC9, increases from 0.0, and reaches the calculated provisional gain g, which is the maximum value, when the input signal level E reaches the optical black value OB. The calculated provisional gain is a value set by the setting unit 204.

In the interval SC19, the gain G takes on the calculated provisional gain g, which is the maximum value, where the input signal level E is at the optical black value OB, and is reduced from the optical black value OB, reaching the minimum value at 2OB. In other words, the waveform 2201 indicating the gain characteristics in the interval SC9 and the waveform 2202 indicating the gain characteristics in the interval SC19 are in linear symmetry about the optical black value OB.

Also, by offsetting the value of the gain G in the optical black value OB to the calculated provisional gain g from infinity, as described in Embodiment 2, the gain characteristic curve 2200 has a higher input signal level for the bright portion as compared to the gain characteristic curve 1900. Thus, it is possible to emphasize pixels in the vicinity of the optical black value OB by gradation correction and emphasize pixels in the bright portion.

Figure 23:
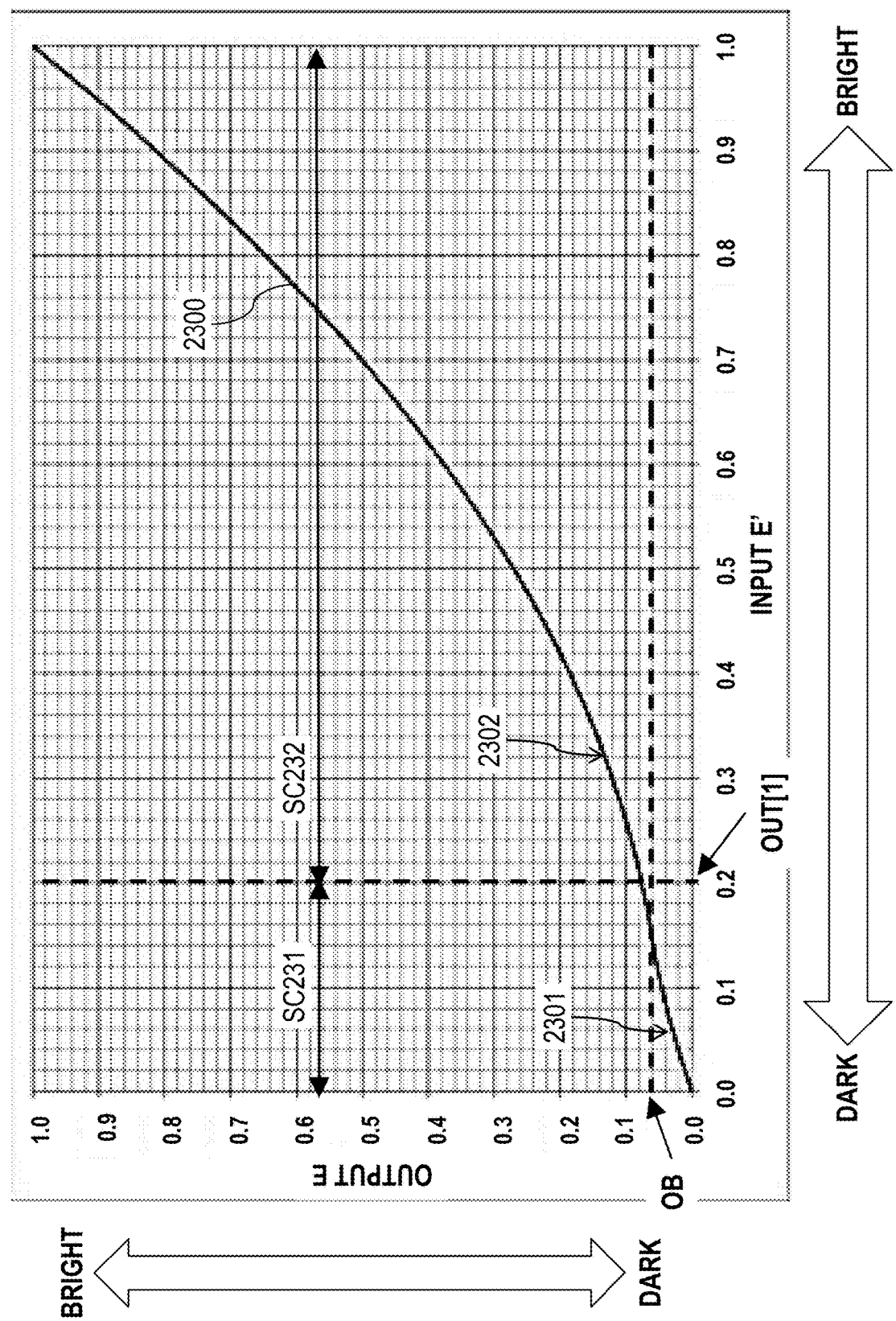
FIG. 23 is a graph showing input-output characteristics 4 for inverse gradation correction when an optical black value is used.

FIG. 23 is a graph showing input-output characteristics 4 for inverse gradation correction when an optical black value is used. The inverse gradation correction unit 603 executes positive inverse gradation correction for values of OUT[1] or greater for a given input signal level E' of the gradation correction RAW image data, or in other words, executes positive offset γ correction, and executes negative gradation correction for input signal levels lower than OUT[1], or in other words, executes negative offset γ correction.

An interval SC231 is an interval where the input signal level E' is from 0.0 to OUT[1] indicated in formula (13), and an interval SC232 is an interval where the input signal level E' is from OUT[1] to 1.0. Specifically, for example, in the input-output characteristic curve 2300, a waveform 2301 in the interval SC231 is a waveform attained from negative offset γ correction, and a waveform 2302 of the interval SC232 is a waveform attained from positive offset γ correction.

The inverse gradation correction algorithm shown in the input-output characteristic curve 2300 of FIG. 23 is represented by the following formula (15).

$$E = \text{EOTF}[E'] = OB + K - \{(\text{OUT}[1] - E')/C + K^{1/\gamma}\}^\gamma$$
$$E' < \text{OUT}[1]$$

$$OB - K + \{(E' - \text{OUT}[1])/C + K^{1/\gamma}\}^\gamma \quad \text{OUT}[1] \leq E' \quad (15)$$

E' represents the signal level of the gradation correction RAW image data (input signal level), E represents the signal level of the restored RAW image data (output signal level), and EOTF[ ] represents an inverse gradation correction function. In formula (15), the formula for when the condition is E'<OUT[1] is the formula for negative offset γ correction, and the formula for when the condition is OUT[1]E' is the formula for positive offset γ correction. The inverse gradation correction unit 603 executes the inverse gradation correction of formula (15) if the gradation correction identifier 326 indicating formula (13) is detected in the control information 312.

By executing negative offset 1/γ correction in the interval SC231, it is possible to improve color reproduction in the vicinity of the optical black value OB in the RAW image data that has undergone inverse gradation correction. Also, the gain of the bright portions is increased, and thus, it is possible to emphasize pixels that are in the bright portion as a result of gradation correction.

Additionally, the setting unit 204 may set a calculated gain GOB in the inverse gradation correction unit 603 instead of the calculated provisional gain g (formula (16) below). By setting the calculated gain GOB in the inverse gradation correction unit 603, it is possible to improve the reproducibility of bright portions or optical black portions, which are dark portions, in the original RAW image data as a result of inverse gradation correction.

$$G_{OB} = C \times g \quad (16)$$

Embodiment 4

Embodiment 4 is an example in which an input signal level E of a given width including an optical black value is provided in the calculated provisional gain g of Embodiment 3. In Embodiment 4, differences from Embodiment 3 will be primarily described, and descriptions of the same configurations and content as Embodiment 3 are applicable to Embodiment 4 as well, and descriptions thereof are omitted.

Figure 24:
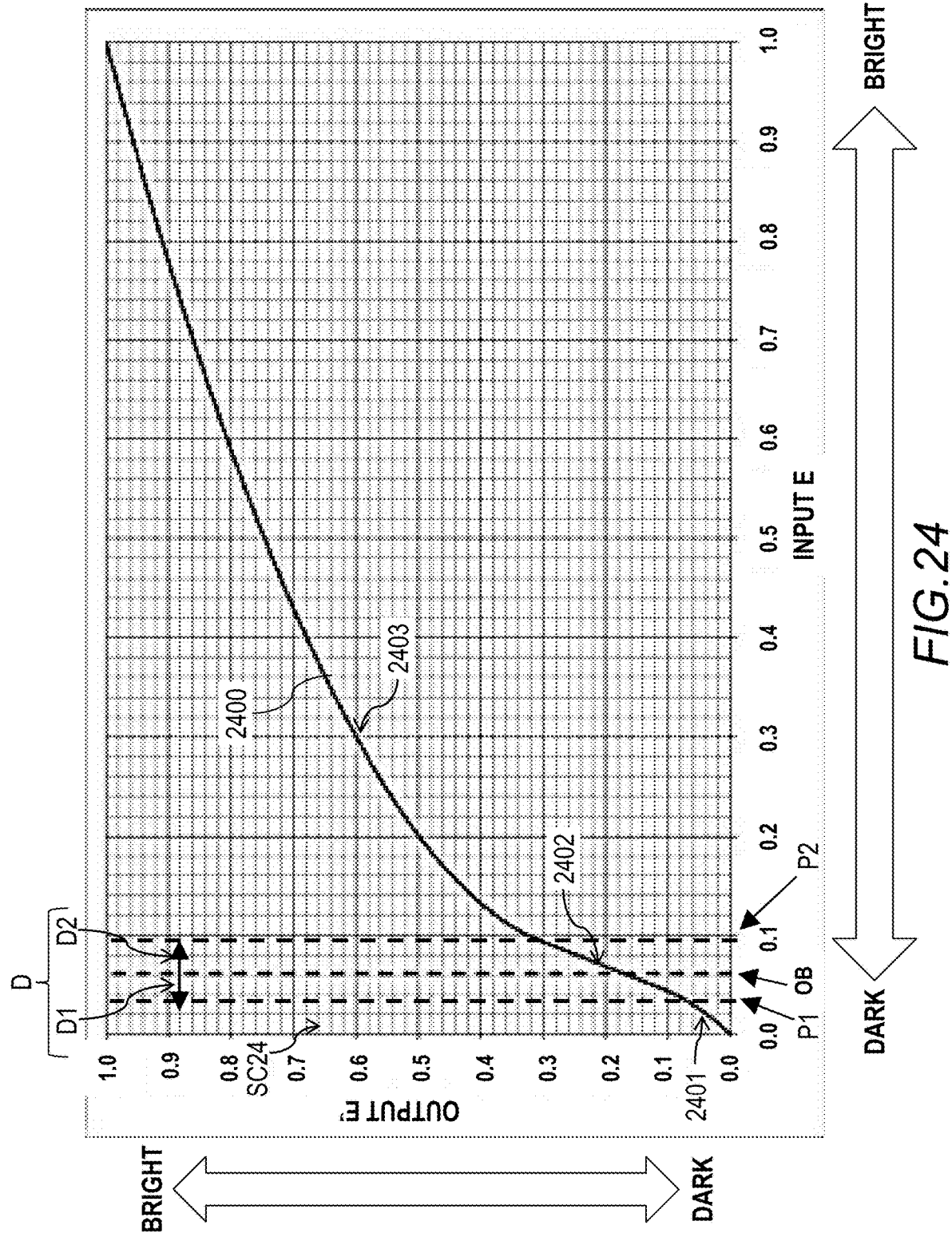
FIG. 24 is a graph showing input-output characteristics 5 for gradation correction when an optical black value is used.

FIG. 24 is a graph showing input-output characteristics 5 for gradation correction when an optical black value is used. In an input-output characteristic example 5 for gradation correction when using an optical black value, a given pouch width D including the optical black value OB is set by the setting unit 204. The same gain G is set for the input signal level E with a pouch width D.

The range within the pouch width D where the value of the input signal level E is P1 (0.0<P1<OB) to the optical black value OB is a first pouch width D1 and the range within the pouch width D where the value of the input signal level E is from the optical black value OB to P2 (OB≤P2) is a second pouch width D2. The pouch width D is a range in which the gain G of the input signal level E is constant.

The gradation correction unit 201 executes negative gradation correction for input signal levels E in the interval SC24 of 0.0 to P1, or in other words, executes negative offset 1/γ correction, executes gradation correction with a constant gain G for input signal levels E in the interval of the pouch width D, and executes positive gradation correction for input signal levels E in the interval of P2 or greater, or in other words, executes positive offset 1/γ correction.

Specifically, for example, in the input-output characteristic curve 2400, a waveform 2401 in the interval SC24 is a waveform attained from negative offset 1/γ correction, a waveform 2402 in the interval of the pouch width D is a waveform attained from gradation correction in which the gain G is constant, and a waveform 2403 of the interval where the input signal level E is P2 or greater is a waveform attained from positive offset 1/γ correction.

The gradation correction algorithm shown in the input-output characteristic curve 2400 of FIG. 24 is represented by the following formula (17).

$$E'=\text{OETF}[E]=\text{OUT}[1]-C\times\{(\text{IN}[1]-E+K)^{1/\gamma}-K^{1/\gamma}\}$$
$$E<\text{IN}[1]$$

$$\text{OUT}[1]+C\times g\times(E-\text{IN}[1])\,\text{IN}[1]\leq E<\text{IN}[2]$$

$$\text{OUT}[2]+C\times\{(E-\text{IN}[2])+K)^{1/\gamma}-K^{1/\gamma}\}\,\text{IN}[2]\leq E \quad (17)$$

where
$K=(g\times\gamma)^{\gamma/(1-\gamma)}$
$C=1/\{(\text{IN}[1]+K)^{1/\gamma}+(1-\text{IN}[2]+K)^{1/\gamma}-2K^{1/\gamma}-g\times(P1+P2)\}$
$\text{IN}[1]=\text{OB}-P1$
$\text{IN}[2]=\text{OB}+P2$
$\text{OUT}[1]=C\times\{(\text{IN}[1]+K)^{1/\gamma}-K^{1/\gamma}\}$
$\text{OUT}[2]=\text{OUT}[1]+C\times g\times(P1+P2)$ E represents the signal level of the RAW image data (input signal level), E' represents the signal level of the gradation correction RAW image data (output signal level), OETF[ ] represents a gradation correction function, OB is the optical black value, γ is the gamma value, and g is the calculated provisional gain. Also, IN[1] is the first pouch width D1 and IN[2] is the second pouch width D2.

In formula (17), the formula for when the condition is E<OB is the formula for negative offset 1/γ correction, the formula for when the condition is IN[1]≤E<IN[2], or in other words, the pouch width D signifies gradation correction in which the gain G is constant, and the formula for when the condition is IN[2]≤E is the formula for positive offset 1/γ correction. The gradation correction unit 201 outputs the gradation correction identifier 326 indicating the gradation correction algorithm of formula (17) to the encoding unit 202, and the encoding unit 202 uses the gradation correction identifier 326 from the gradation correction unit 201 as the control information 312 in the header information 301.

Figure 25:
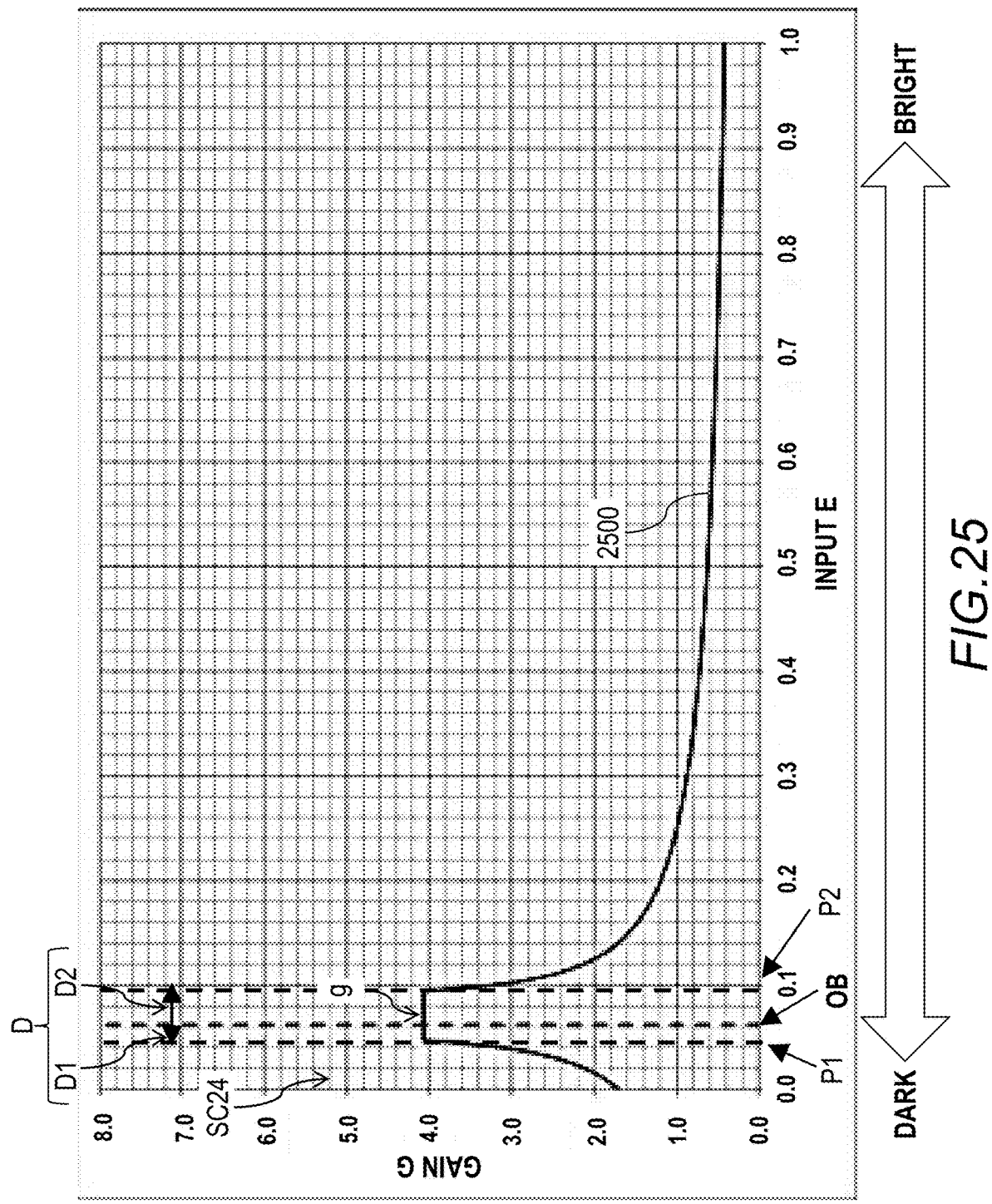
FIG. 25 is a graph showing gain characteristics under input-optical characteristics 5 for gradation correction when an optical black value is used.

FIG. 25 is a graph showing gain characteristics under input-optical characteristics 5 for gradation correction when an optical black value is used. A gain characteristic curve 2500 at an input signal level E for gradation correction when an optical black value is used is represented by the following formula (18), which is the derivative of formula (17).

$$G=\{\text{OETF}[E]\}'=(C/\gamma)\times(\text{IN}[1]-E+K)^{(1/\gamma)-1}\,E<\text{IN}[1]$$

$$C\times g\,\text{IN}[1]\leq E<\text{IN}[2]$$

$$(C/\gamma)\times(E-\text{IN}[2]+K)^{(1/\gamma)-1}\,\text{IN}[2]\leq E \quad (18)$$

G is the gain of the input signal level E. Specifically, in the gain characteristic curve 2500, for example, the gain G takes on the minimum value when the input signal level E is at 0.0 in the interval SC24, increases from 0.0, and reaches the calculated provisional gain g, which is the maximum value, at P1, which is the right hand edge of the pouch width D. The calculated provisional gain g is a value set by the setting unit 204.

The gain G is held constant at the calculated provisional gain g in the pouch width D. The gain G decreases from the optical black value OB at P2, which is the left hand edge of the pouch width D, or greater. As a result of setting the first pouch width D1, it is possible to preserve noise in the vicinity of the optical black value OB. Also, as a result of setting the second pouch width D2, it is possible to increase the degree to which black is expressed, the higher the compression rate is.

Also, the second pouch width D2 is variable according to the exposure amount set by the setting unit 204. Specifically, the optical black value OB is fixed and the position of P2 is changed. By setting the exposure amount to be an underexposure in the setting unit 204, P2 is changed such that the input signal level E increases, and the second pouch width P2 is widened, for example.

On the other hand, by setting the exposure amount to be an overexposure in the setting unit s204, P2 is changed such that the input signal level E decreases, and the second pouch width P2 is narrowed. In this manner, it is possible to expand or shrink the second pouch width D2 according to the exposure amount and emphasize pixels in the vicinity of the optical black value according to the exposure amount.

Figure 26:
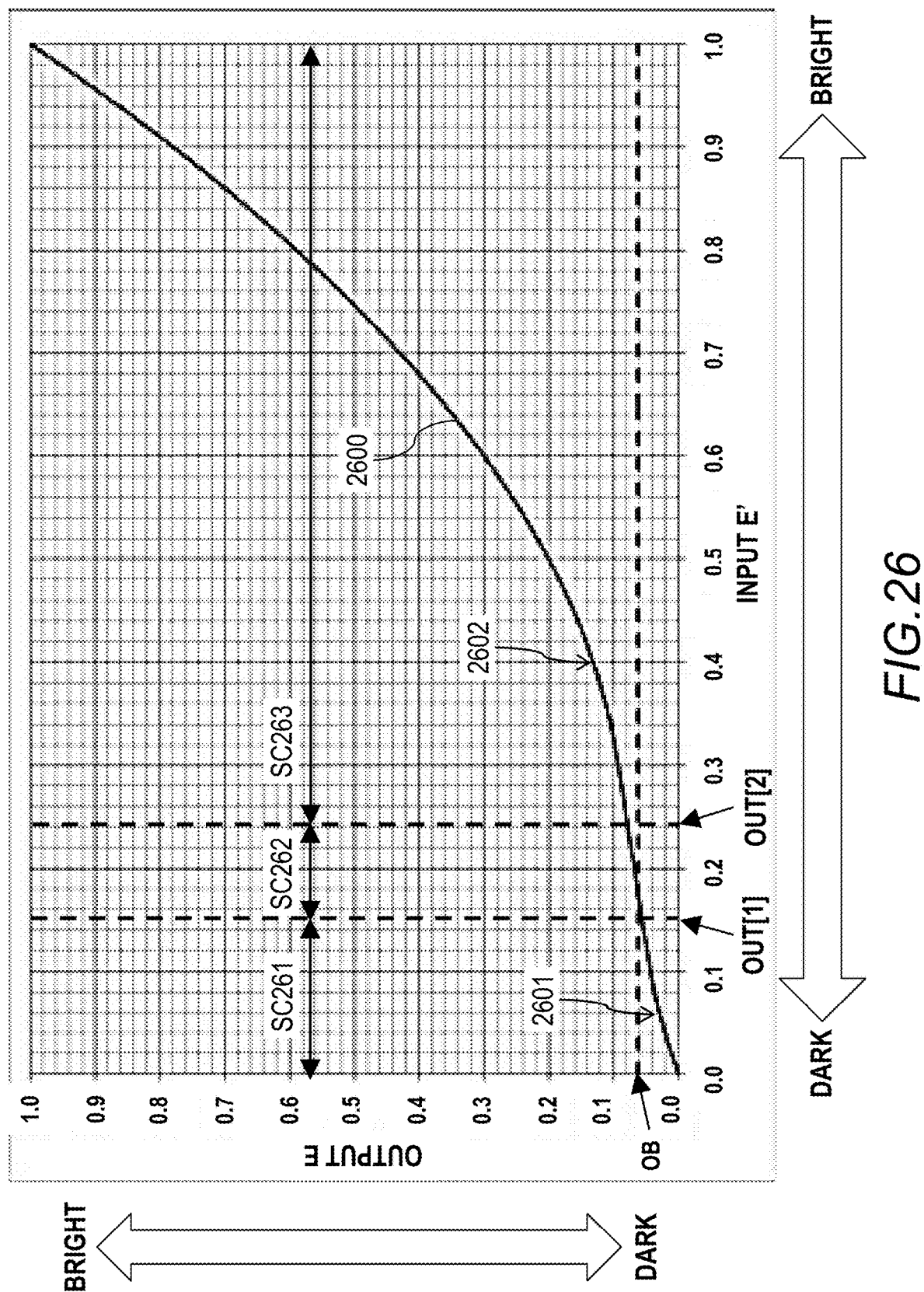
FIG. 26 is a graph showing input-output characteristics 5 for inverse gradation correction when an optical black value is used.

FIG. 26 is a graph showing input-output characteristics 5 for inverse gradation correction when an optical black value is used. The inverse gradation correction unit 603 executes positive inverse gradation correction for values of OUT[2] or greater for a given input signal level E' of the gradation correction RAW image data, or in other words, executes positive offset γ correction, performs inverse gradation correction in which the gain G is constant for values of OUT[1] or greater and less than OUT[2], and executes negative gradation correction for input signal levels lower than OUT [1], or in other words, executes negative offset γ correction.

An interval SC261 is an interval where the input signal level E' is from 0.0 to OUT[1] indicated in formula (16), an interval SC262 is an interval where the input signal level E' is from OUT[1] to OUT[2], and an interval SC263 is an interval where the input signal level E' is from OUT[2] to 1.0.

Specifically, for example, in the input-output characteristic curve 2600, a waveform 2601 in the interval SC261 is a waveform attained from negative offset γ correction, a waveform 2602 of the interval SC262 is a waveform attained from inverse gradation correction in which the gain G is constant, and a waveform 2603 of the interval SC263 is a waveform attained from positive offset γ correction.

The inverse gradation correction algorithm shown in the input-output characteristic curve 2600 of FIG. 26 is represented by the following formula (19).

$$E=\text{EOTF}[E']=\text{IN}[1]+K-\{(\text{OUT}[1]-E')/C+K^{1/\gamma}\}^{\gamma}$$
$$E'<\text{OUT}[1]$$

$$\text{IN}[1]+(E'-\text{OUT}[1])/(C\times g)\,\text{OUT}[1]\leq E'<\text{OUT}[2]$$

$$\text{IN}[2]-K+\{(E'-\text{OUT}[2])/C+K^{1/\gamma}\}^{\gamma}\,\text{OUT}[2]\leq E' \quad (19)$$

E' represents the signal level of the gradation correction RAW image data (input signal level), E represents the signal level of the restored RAW image data (output signal level), and EOTF[ ] represents an inverse gradation correction function. In formula (19), the formula for when the condition is E'<OUT[1] is the formula for negative offset γ correction, the formula for when the condition is In[1]≤E<In[2] signifies inverse gradation correction in which the gain G is constant, and the formula for when the condition is OUT[2]E' is the formula for positive offset γ correction. The inverse gradation correction unit 603 executes the inverse gradation correction of formula (19) if the gradation correction identifier 326 indicating formula (17) is detected in the control information 312.

By executing negative offset γ correction in the interval SC261, it is possible to improve color reproduction in the vicinity of the optical black value OB in the RAW image data that has undergone inverse gradation correction. Also, the gain of the bright portions is increased, and thus, it is possible to emphasize pixels that are in the bright portion as a result of gradation correction.

Embodiment 5

Embodiment 5 shows an example in which the positive slope of the interval in the input-output characteristic curve where the input signal level E is from 0 to OB is constant. In Embodiment 5, differences from Embodiment 3 will be primarily described, and descriptions of the same configurations and content as Embodiment 3 are applicable to Embodiment 5 as well, and descriptions thereof are omitted.

Figure 27:
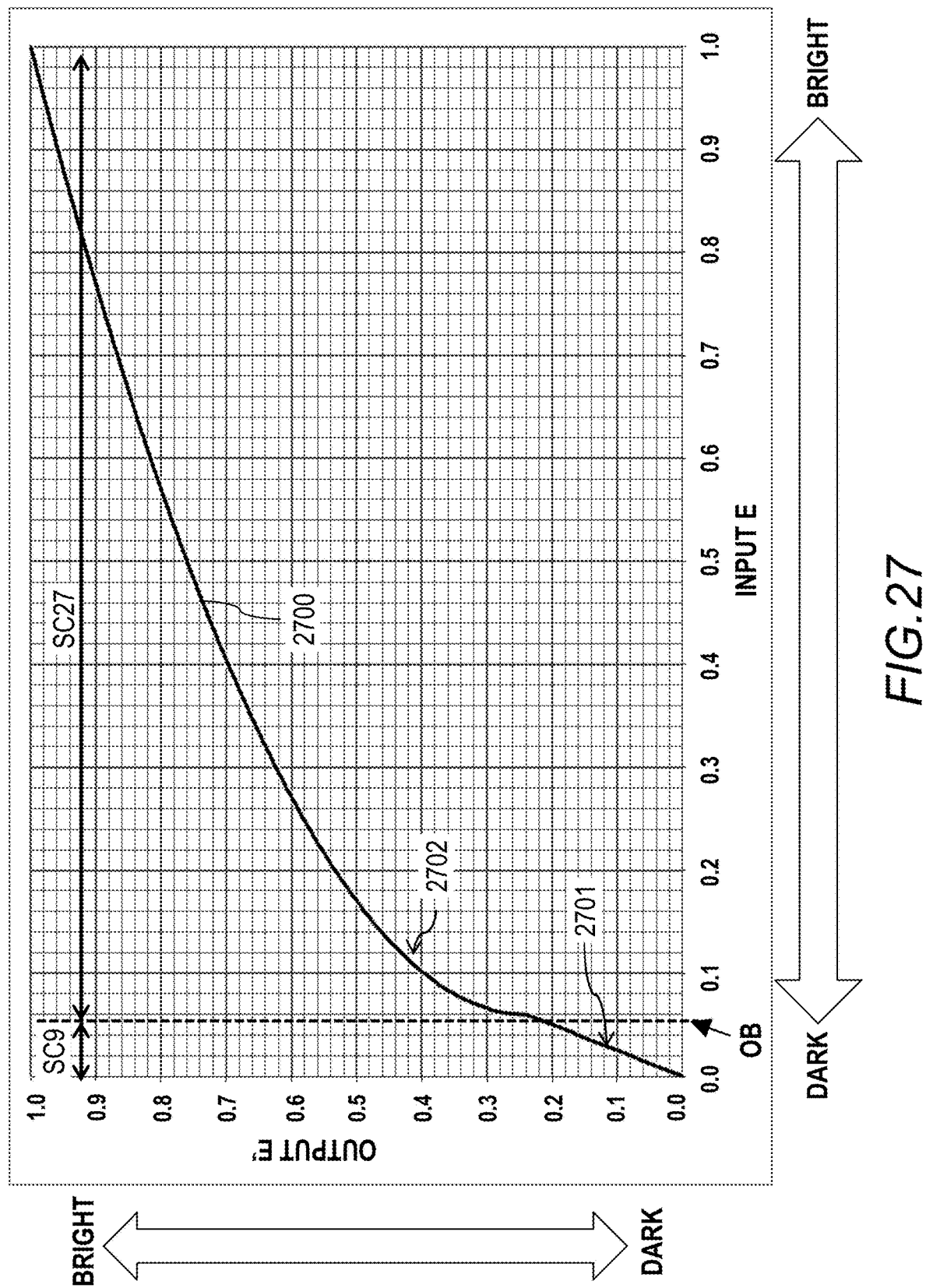
FIG. 27 is a graph showing input-output characteristics 6 for gradation correction when an optical black value is used.

FIG. 27 is a graph showing input-output characteristics 6 for gradation correction when an optical black value is used. In the input-output characteristic example 6 of gradation correction when using the optical black value, the gradation correction unit 201 executes gradation correction in which the positive slope is constant for input signal levels E lower than the optical black value OB, and executes positive gradation correction for input signal levels E greater than or equal to the optical black value OB, or in other words, executes positive offset 1/γ correction.

Specifically, in the input-output characteristic curve 2700, for example, the waveform 2701 of the interval SC9 is a linear waveform in which the output signal level E' increases as the input signal level E increases. In other words, in the interval SC9, the input signal level E is directly proportional to the output signal level E'. The waveform 2702 of the interval SC27 (OBE) greater than or equal to the optical black value OB is a waveform attained from positive offset 1/γ correction. The gradation correction unit 201 performs fitting by gradation correction such that the output signal level E' is 1.0 when the input signal level E is 1.0.

The gradation correction algorithm shown in the input-output characteristic curve 2700 of FIG. 27 is represented by the following formula (20).

$$E'=OETF[E]=E \times S\ E<OB$$

$$\beta+\alpha \times (E-OB)^{1/\gamma}\ OB \leq E \quad (20)$$

where
$\alpha=(1-OB \times S)/(1-OB)^{1/\gamma}$
$\beta=OB \times S$

E represents the signal level of the RAW image data (input signal level), E' represents the signal level of the gradation correction RAW image data (output signal level), OETF[ ] represents a gradation correction function, OB is the optical black value, and γ is the gamma value. S is a constant value indicating the slope of the waveform 2701 of the interval SC9. The slope S is equal to 4 in FIG. 27, for example. The slope S may be any positive value. α is a fitting coefficient that can be adjusted by the setting unit 204. Specifically, for example, the setting unit 204 can adjust the fitting coefficient α according to fluctuations in the ISO sensitivity in the information processing apparatus 100.

In formula (20), the formula for when the condition is E<OB is the formula for gradation correction in which the positive slope is constant for the input signal level E, and the formula for when the condition is OBE is the formula for positive offset 1/γ correction. The gradation correction unit 201 outputs the gradation correction identifier 326 indicating the gradation correction algorithm of formula (20) to the encoding unit 202, and the encoding unit 202 uses the gradation correction identifier 326 from the gradation correction unit 201 as the control information 312 in the header information 301.

Figure 28:
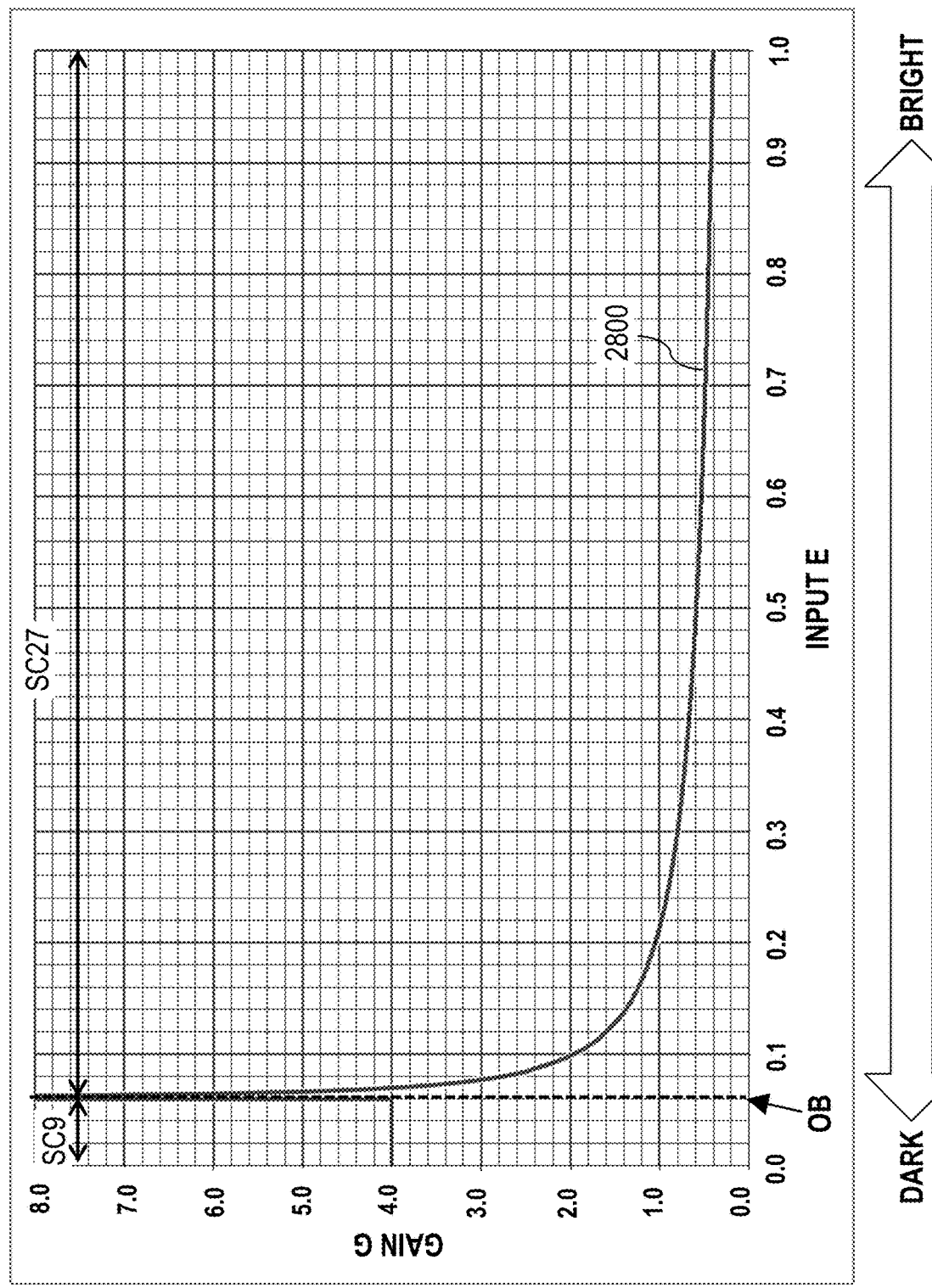
FIG. 28 is a graph showing gain characteristics under input-optical characteristics 6 for gradation correction when an optical black value is used.

FIG. 28 is a graph showing gain characteristics under input-optical characteristics 6 for gradation correction when an optical black value is used. A gain characteristic curve 2800 at an input signal level E for gradation correction when an optical black value is used is represented by the following formula (21), which is the derivative of formula (20).

$$G=\{OETF[E]\}'=S\ E<OB$$

$$(\alpha/\gamma) \times (E-OB)^{1/(\gamma-1)} OB \leq E \quad (21)$$

G is the gain of the input signal level E. Specifically, in the gain characteristic curve 2800, for example, the gain G takes on a constant value in the interval SC9.

Also, similar to Embodiment 1, by setting the gain G of the dark portion to be large during gradation correction, distortion of dark portions occurring between the encoding unit 202 and the decoding unit 602 can be suppressed. As a result, during developing or image adjustment, even if dark portions are brightened to allow for greater visibility of figures in dark portions or the like, distortion of dark portions has less of a tendency to be prominent.

Figure 29:
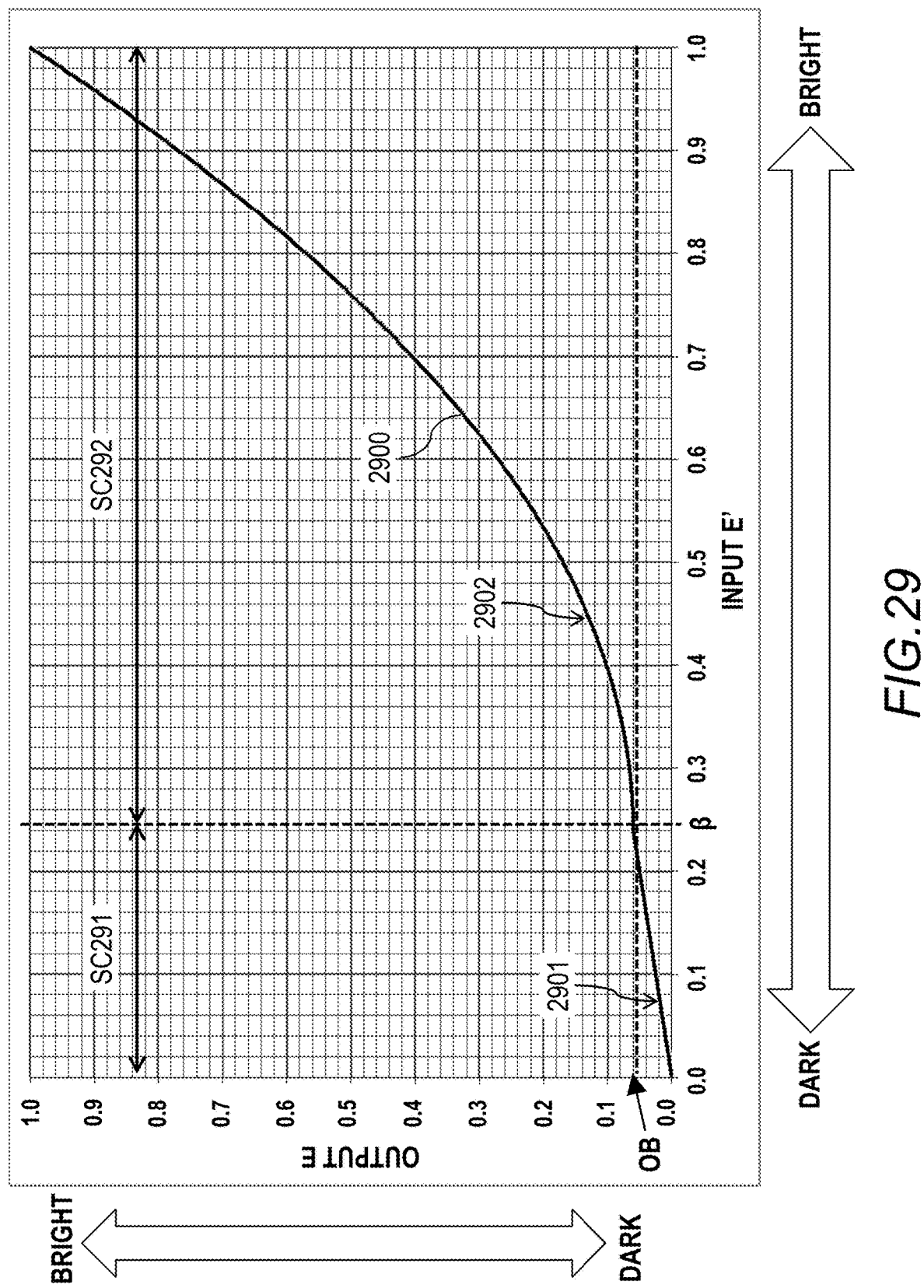
FIG. 29 is a graph showing input-output characteristics 6 for inverse gradation correction when an optical black value is used.

FIG. 29 is a graph showing input-output characteristics 6 for inverse gradation correction when an optical black value is used. The inverse gradation correction unit 603 executes inverse gradation correction such that the positive slope is constant for input signal levels E' lower than the optical black value OB, and executes negative inverse gradation correction for input signal levels E' lower than β, or in other words, executes negative γ correction.

An interval SC291 is an interval where the input signal level E' is from 0.0 to β indicated in formula (10), and an interval SC292 is an interval where the input signal level E' is from β to 1.0. Specifically, for example, in the input-output characteristic curve 2900, a waveform 2901 in the interval SC291 is a waveform attained from inverse gradation correction such the positive slope is constant, and a waveform 2902 of the interval SC292 is a waveform attained from positive γ correction.

The inverse gradation correction algorithm shown in the input-output characteristic curve 2900 of FIG. 29 is represented by the following formula (22).

$$E=EOTF[E']=E'/S\ E'<\beta$$

$$OB+(1/\alpha \times (E'-\beta)^{\gamma}\ \beta \leq E' \quad (22)$$

E' represents the signal level of the gradation correction RAW image data (input signal level), E represents the signal level of the restored RAW image data (output signal level), and EOTF[ ] represents an inverse gradation correction function. In formula (22), the formula for when the condition is E'<β is the formula for inverse gradation correction in which the positive slope is constant for input signal levels E lower than the optical black value OB, and the formula for when the condition is β≤E' is the formula for positive γ correction. The inverse gradation correction unit 603 executes the inverse gradation correction of formula (22) if the gradation correction identifier 326 indicating formula (20) is detected in the control information 312.

By executing inverse gradation correction such that the positive slope is constant in the interval SC201, it is possible to increase the effect of mitigating encoding distortion in the vicinity of the optical black value OB in the restored RAW image data that has undergone inverse gradation correction, and it is possible to reduce noise occurring in the dark portions, and thus, it is possible to improve color reproduction.

Embodiment 6

Embodiment 6 shows an example in which two fitting coefficients are adopted in the configuration of Embodiment 5. Specifically, for example, in Embodiment 5, in an interval of the input-output characteristic curve 2700 where the input signal level E is greater than or equal to OB (OBE), the fitting coefficient α is adjustable. In Embodiment 6, different fitting coefficients are used for the interval SC9 in which the input signal level E is less than OB (E<OB) and the interval in which the input signal level E is greater than or equal to OB (OBE). In Embodiment 6, differences from Embodiment 5 will be primarily described, and descriptions of the same configurations and content as Embodiment 5 are applicable to Embodiment 6 as well, and descriptions thereof are omitted.

Figure 30:
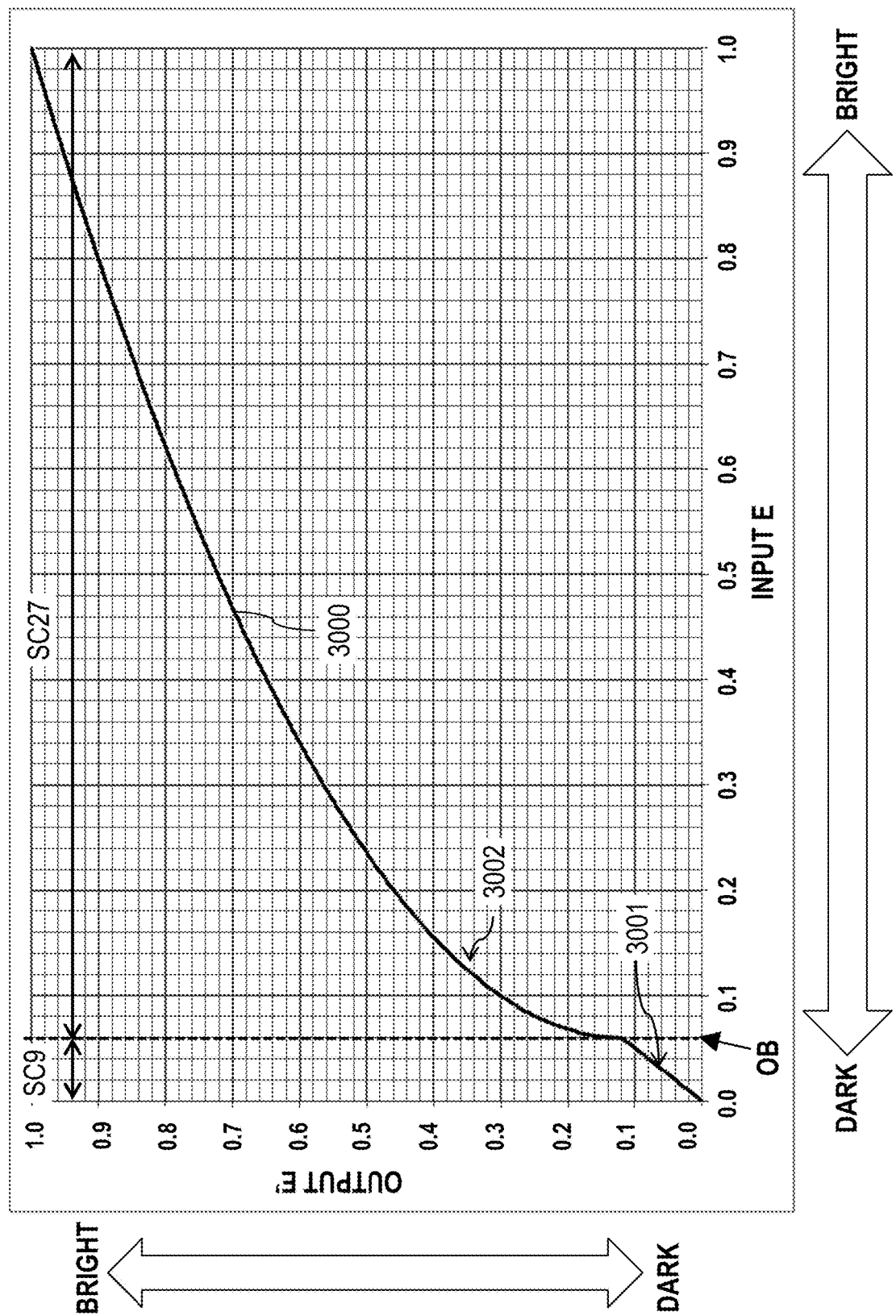
FIG. 30 is a graph showing input-output characteristics 7 for gradation correction when an optical black value is used.

FIG. 30 is a graph showing input-output characteristics 7 for gradation correction when an optical black value is used. In the input-output characteristic example 7 of gradation correction when using the optical black value, similar to the input-output characteristic example 6, the gradation correction unit 201 executes gradation correction in which the positive slope is constant for input signal levels E lower than the optical black value OB, and executes positive gradation correction for input signal levels E greater than or equal to the optical black value OB, or in other words, executes positive offset 1/γ correction.

Specifically, for example, in the input-output characteristic curve 3000, a waveform 3001 in the interval SC9 is a linear waveform in which the output signal level E' increases as the input signal level E increases, and a waveform 3002 of the interval greater than or equal to the optical black value OB is a waveform attained from positive offset 1/γ correction. The gradation correction unit 201 performs fitting by gradation correction such that the output signal level E' is 1.0 when the input signal level E is 1.0.

The gradation correction algorithm shown in the input-output characteristic curve 3000 of FIG. 30 is represented by the following formula (23).

$$E'=OETF[E]=E\times\alpha1 \quad E<OB$$

$$\alpha2\times(E-OB)^{1/\gamma}+\beta \quad OB\leq E \quad (23)$$

where
$\alpha2=(1-\beta)/(1-OB)^{1/\gamma}$
$\beta=\alpha1\times OB^{1/\gamma}$

E represents the signal level of the RAW image data (input signal level), E' represents the signal level of the gradation correction RAW image data (output signal level), OETF[ ] represents a gradation correction function, OB is the optical black value, and γ is the gamma value. α1 is an adjustable fitting coefficient and indicates a positive slope of the waveform 3001 of the interval SC9. α1 is equal to 2 in FIG. 30, for example. α1 may be any positive value. α2 is a fitting coefficient differing from α1 but dependent thereon.

The setting unit 204 can adjust the fitting coefficient α according to fluctuations in the ISO sensitivity in the information processing apparatus 100. As a result, it is possible to adjust the input-output characteristic curve 3000 with the fitting coefficient α1 in the interval SC9, and to adjust the input-output characteristic curve 3000 with the fitting coefficient α2 having a different value from the fitting coefficient α1 in the interval SC27 where OBE.

In formula (23), the formula for when the condition is E<OB is the formula for gradation correction in which the positive slope is constant for the input signal level E, and the formula for when the condition is OB≤E is the formula for positive offset 1/γ correction. The gradation correction unit 201 outputs the gradation correction identifier 326 indicating the gradation correction algorithm of formula (23) to the encoding unit 202, and the encoding unit 202 uses the gradation correction identifier 326 from the gradation correction unit 201 as the control information 312 in the header information 301.

Figure 31:
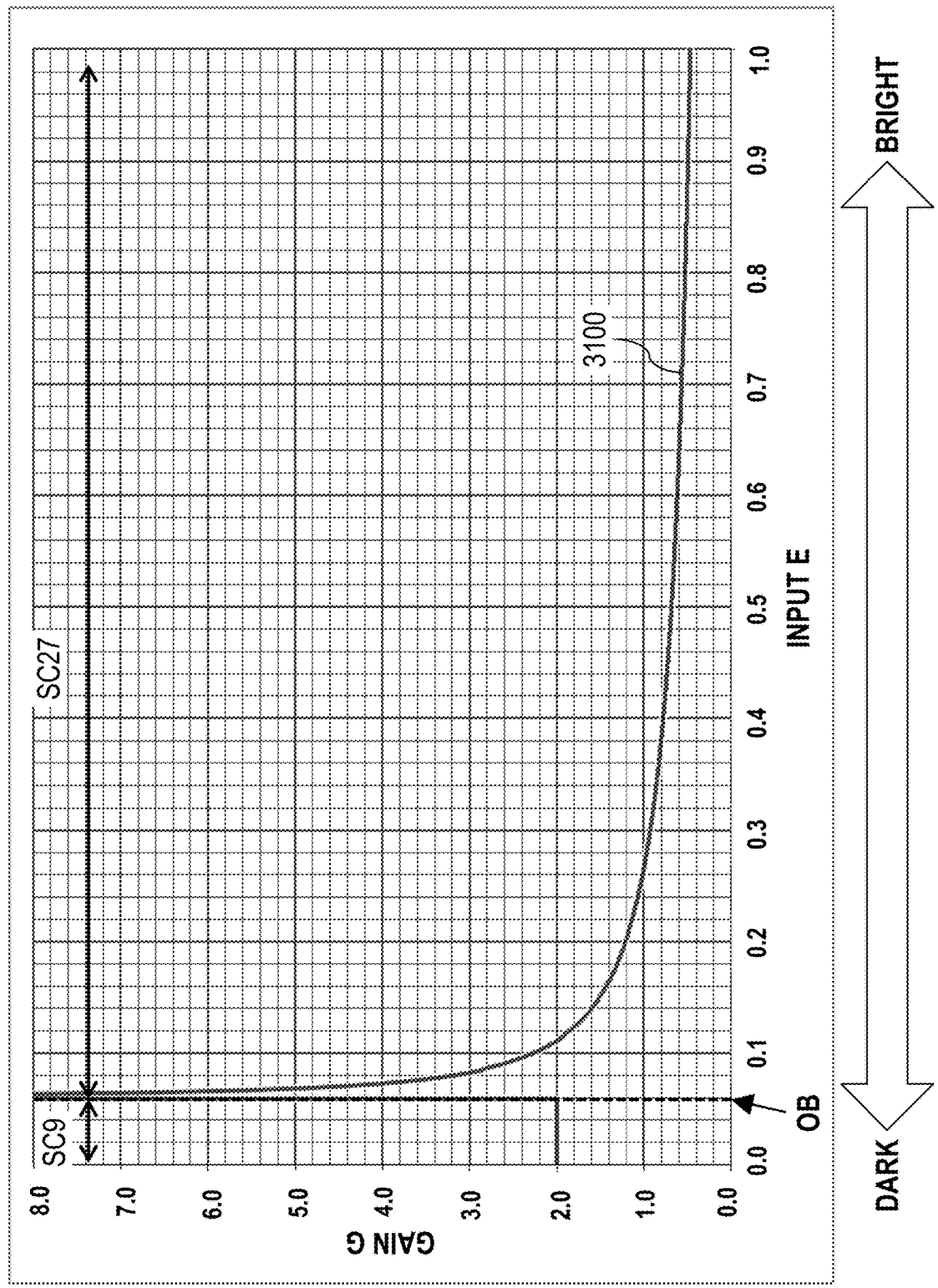
FIG. 31 is a graph showing gain characteristics under input-optical characteristics 7 for gradation correction when an optical black value is used.

FIG. 31 is a graph showing gain characteristics under input-optical characteristics 7 for gradation correction when an optical black value is used. A gain characteristic curve 3100 at an input signal level E for gradation correction when an optical black value is used is represented by the following formula (24), which is the derivative of formula (23).

$$G=\{OETF[E]\}'=\alpha1 E<OB$$

$$(\alpha2/\gamma)\times(E-OB)^{1/(\gamma-1)} OB\leq E \quad (24)$$

G is the gain of the input signal level E. Specifically, in the gain characteristic curve 3100, for example, the gain G takes on a constant value in the interval SC9.

Also, similar to Embodiment 1, by setting the gain G of the dark portion to be large during gradation correction, distortion of dark portions occurring between the encoding unit 202 and the decoding unit 602 can be suppressed. As a result, during developing or image adjustment, even if dark portions are brightened to allow for greater visibility of figures in dark portions or the like, distortion of dark portions has less of a tendency to be prominent.

Figure 32:
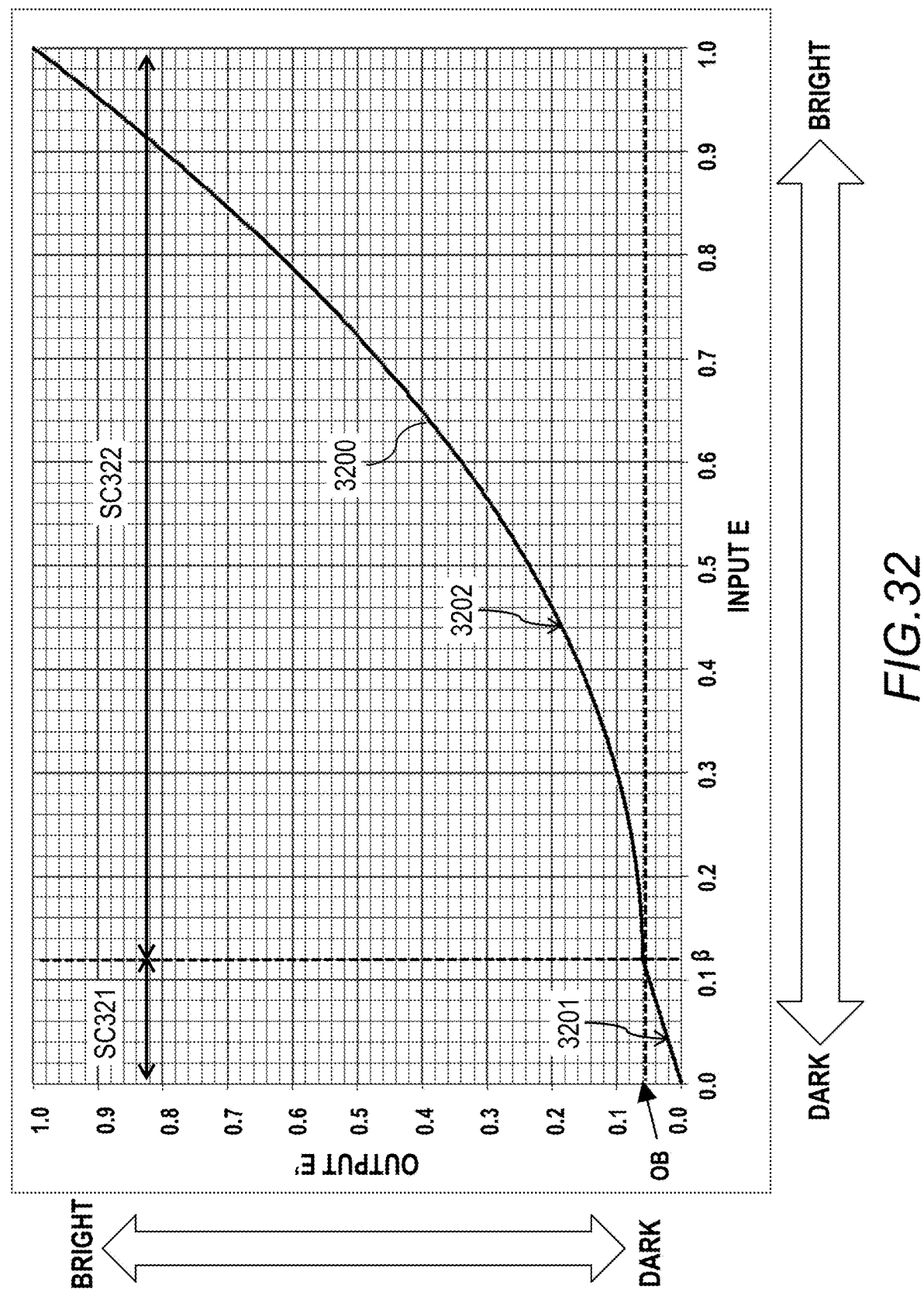
FIG. 32 is a graph showing input-output characteristics 7 for inverse gradation correction when an optical black value is used.

FIG. 32 is a graph showing input-output characteristics 7 for inverse gradation correction when an optical black value is used. The inverse gradation correction unit 603 executes inverse gradation correction such that the positive slope is constant for input signal levels E lower than the optical black value OB, and executes negative inverse gradation correction for input signal levels lower than β, or in other words, executes negative γ correction.

An interval SC321 is an interval where the input signal level E' is from 0.0 to β indicated in formula (10), and an interval SC292 is an interval where the input signal level E' is from β to 1.0. Specifically, for example, in the input-output characteristic curve 3200, a waveform 3201 in the interval SC321 is a waveform attained from negative γ correction, and a waveform 3202 of the interval SC322 is a waveform attained from positive γ correction.

The inverse gradation correction algorithm shown in the input-output characteristic curve 3200 of FIG. 32 is represented by the following formula (25).

$$E=EOTF[E']=E'/\alpha1 \quad E'<\beta$$

$$OB+(1/\alpha2\times(E'-\beta))^{\gamma} \quad \beta\leq E' \quad (25)$$

E' represents the signal level of the gradation correction RAW image data (input signal level), E represents the signal level of the restored RAW image data (output signal level), and EOTF[ ] represents an inverse gradation correction function. In formula (25), the formula for when the condition is E'<β is the formula for inverse gradation correction in which the positive slope is constant for input signal levels E lower than the optical black value OB, and the formula for when the condition is β≤E' is the formula for positive γ correction. The inverse gradation correction unit 603 executes the inverse gradation correction of formula (25) if the gradation correction identifier 326 indicating formula (23) is detected in the control information 312.

By executing inverse gradation correction such that the positive slope is constant in the interval SC321, it is possible to increase the effect of mitigating encoding distortion in the vicinity of the optical black value OB in the restored RAW image data that has undergone inverse gradation correction, and it is possible to reduce noise occurring in the dark portions, and thus, it is possible to improve color reproduction.

Embodiment 7

Embodiment 7 is another example of Embodiment 2 in which an input signal level E less than or equal to the optical black value OB is replicated while the gain G of the optical black value OB is maximized in the manner of the input-output characteristic example 2 of gradation correction for when the optical black value of Embodiment 1 is used. In Embodiment 7, differences from Embodiment 2 will be primarily described, and descriptions of the same configurations and content as Embodiment 2 are applicable to Embodiment 7 as well, and descriptions thereof are omitted.

Figure 33:
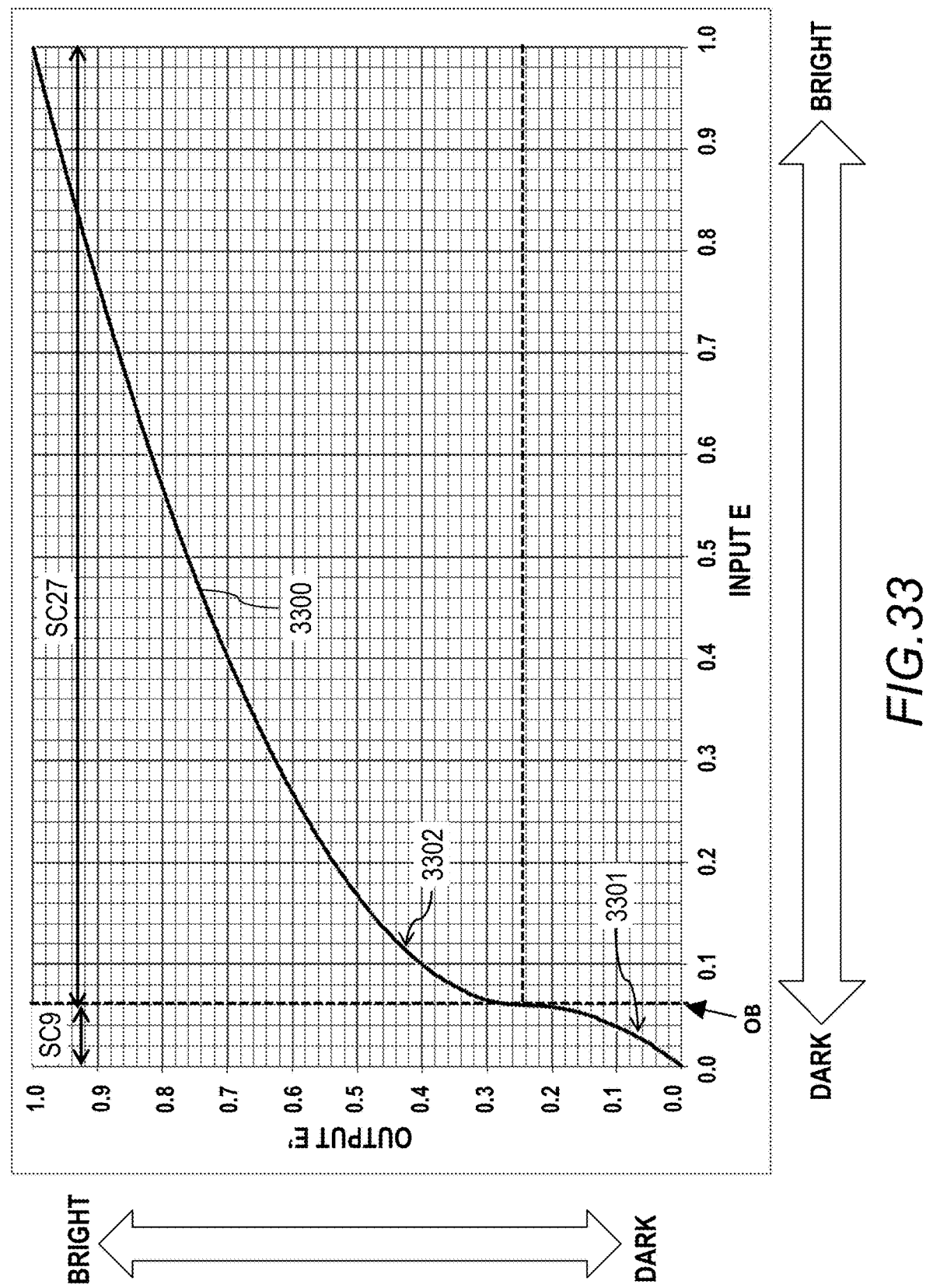
FIG. 33 is a graph showing input-output characteristics 8 for gradation correction when an optical black value is used.

FIG. 33 is a graph showing input-output characteristics 8 for gradation correction when an optical black value is used. In the input-output characteristic example 8 for gradation correction when using the optical black value, unlike the input-output characteristic examples 1 and 2 of gradation correction when using the optical black value, the gradation correction unit 201 executes negative gradation correction for input signal levels E lower than the optical black value OB, or in other words, executes negative $1/\gamma$ correction, and executes positive gradation correction for input signal levels E greater than or equal to the optical black value OB, or in other words, executes positive $1/\gamma$ correction.

Specifically, for example, in the input-output characteristic curve 3300, a waveform 3301 in the interval SC9 is a waveform attained from negative $1/\gamma$ correction, and a waveform 3302 of the interval greater than or equal to the optical black value OB is a waveform attained from positive $1/\gamma$ correction.

The gradation correction algorithm shown in the input-output characteristic curve 3300 of FIG. 33 is represented by the following formula (26).

$$E'=\text{OETF}[E]=-(OB-E)^{1/\gamma}+\beta \quad E<OB$$

$$\alpha\times(E-OB)^{1/\gamma}+\beta \quad OB\leq E \quad (26)$$

where
$\alpha=(1-OB^{1/\gamma})/(1-OB)^{1/\gamma}$
$\beta=OB^{1/\gamma}$

E represents the signal level of the RAW image data (input signal level), E' represents the signal level of the gradation correction RAW image data (output signal level), OETF[ ] represents a gradation correction function, OB is the optical black value, γ is the gamma value, and α is a fitting coefficient that can be adjusted by the setting unit 204. Specifically, for example, the setting unit 204 can adjust the fitting coefficient α according to fluctuations in the ISO sensitivity in the information processing apparatus 100.

In formula (26), the formula for when the condition is E<OB is the formula for negative $1/\gamma$ correction, and the formula for when the condition is OB≤E is the formula for positive $1/\gamma$ correction. The gradation correction unit 201 outputs the gradation correction identifier 326 indicating the gradation correction algorithm of formula (26) to the encoding unit 202, and the encoding unit 202 uses the gradation correction identifier 326 from the gradation correction unit 201 as the control information 312 in the header information 301.

By executing negative $1/\gamma$ correction in the interval SC9, it is possible to improve color reproduction in the vicinity of the optical black value OB in the RAW image data that has undergone gradation correction. In other words, in the portion of the input-output characteristic curve 3300 in the vicinity of the optical black value OB, noise on the side where the input signal level E is less than the optical black value OB (negative direction) and noise on the side where the input signal level E is greater than the optical black value OB (positive direction) cancel each other out in a noise reduction process, which allows for more efficient noise reduction than in Embodiment 1. Thus, it is possible to mitigate black level degradation in the vicinity of the optical black value OB in the RAW image data that has undergone gradation correction, and improve color reproduction.

Figure 34:
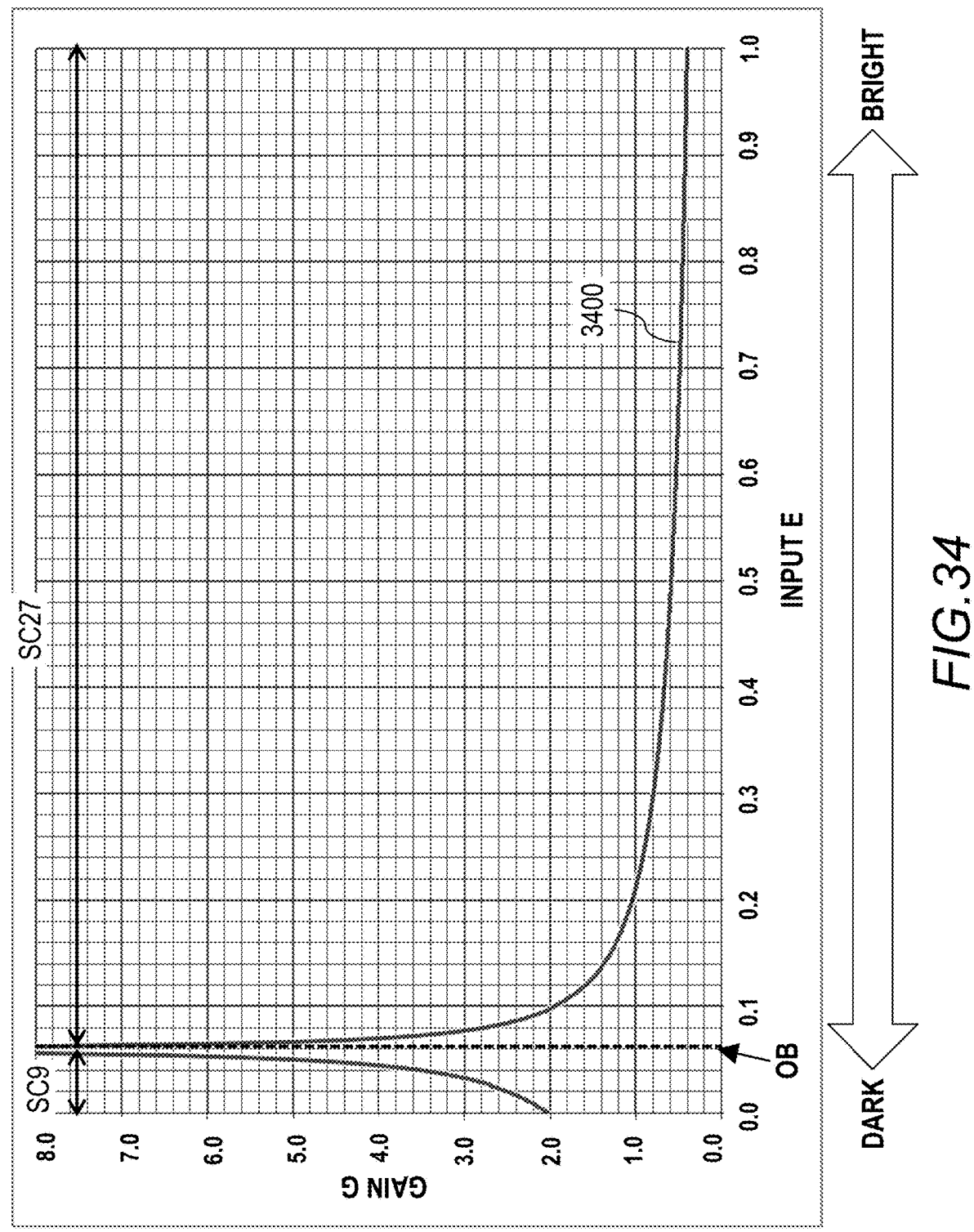
FIG. 34 is a graph showing gain characteristics under input-optical characteristics 8 for gradation correction when an optical black value is used.

FIG. 34 is a graph showing gain characteristics under input-optical characteristics 8 for gradation correction when an optical black value is used. A gain characteristic curve 3400 at an input signal level E for gradation correction when an optical black value is used is represented by the following formula (27), which is the derivative of formula (26).

$$G=\{\text{OETF}[E]\}'=(1/\gamma)\times(OB-E)^{1/(\gamma-1)} \quad E<OB$$

$$(\alpha/\gamma)\times(E-OB)^{1/(\gamma-1)} \quad OB\leq E \quad (27)$$

where $\alpha=(1-OB^{1/\gamma})/(1-OB)^{1/\gamma}$

G is the gain of the input signal level E. Specifically, in the gain characteristic curve 3400, for example, the gain G takes on the minimum value when the input signal level E is at 0.0 in the interval SC9, increases from 0.0, and reaches the maximum value (infinity) when the input signal level E reaches the optical black value OB.

Also, by setting the gain G of the dark portion to be large during gradation correction, distortion of dark portions occurring between the encoding unit 202 and the decoding unit 602 can be suppressed. As a result, during developing or image adjustment, even if dark portions are brightened to allow for greater visibility of figures in dark portions or the like, distortion of dark portions has less of a tendency to be prominent.

Figure 35:
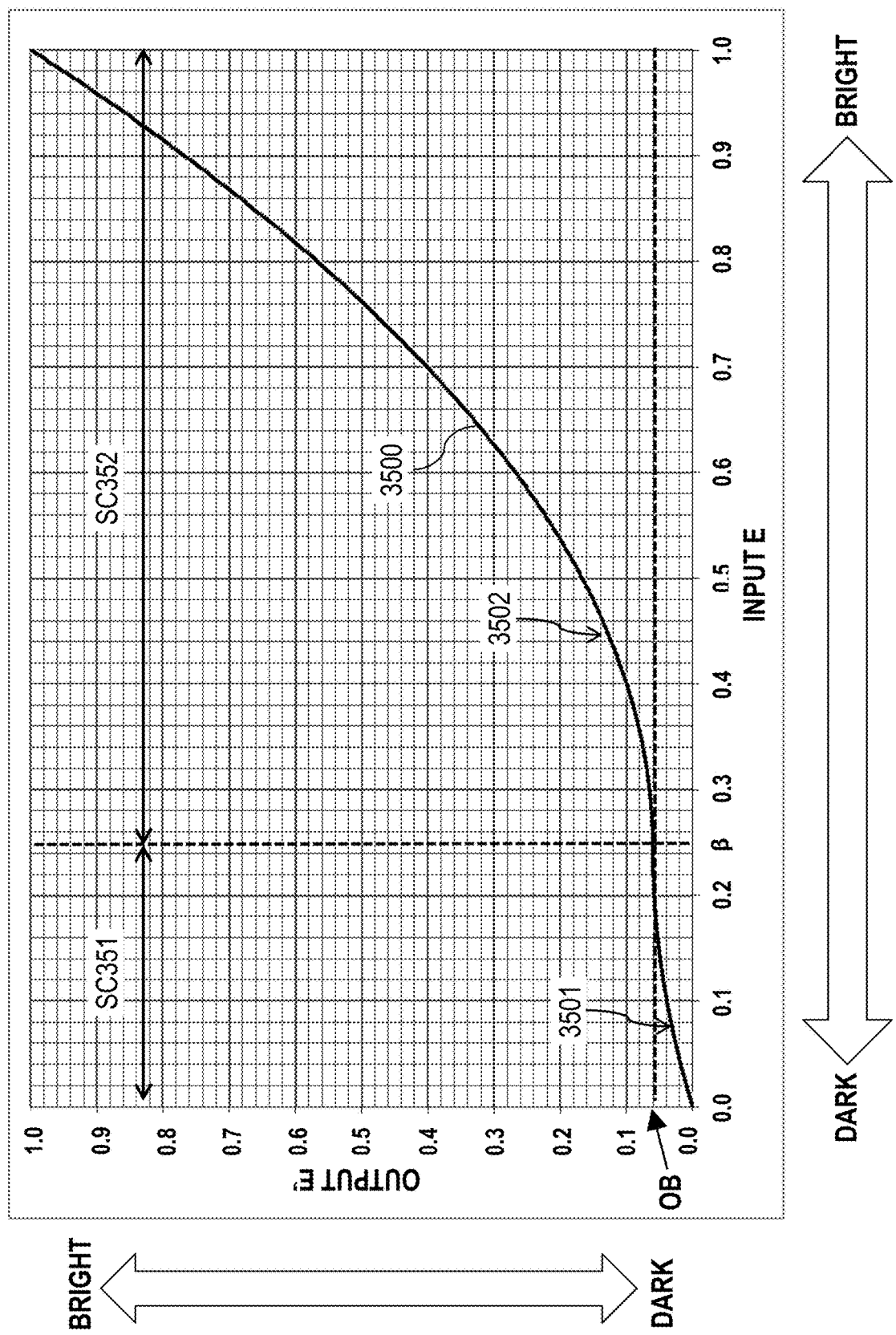
FIG. 35 is a graph showing input-output characteristics 8 for inverse gradation correction when an optical black value is used.

FIG. 35 is a graph showing input-output characteristics 8 for inverse gradation correction when an optical black value is used. The inverse gradation correction unit 603 executes positive inverse gradation correction for a value greater than or equal to β for a given input signal level E' of the gradation correction RAW image data, or in other words, executes positive γ correction, and executes negative inverse gradation correction for input signal levels less than β, or in other words, executes negative γ correction.

An interval SC351 is an interval where the input signal level E' is from 0.0 to β indicated in formula (10), and an interval SC352 is an interval where the input signal level E' is from β to 1.0. Specifically, for example, in the input-output characteristic curve 3500, a waveform 3501 in the interval SC351 is a waveform attained from negative γ correction, and a waveform 3502 of the interval SC352 is a waveform attained from positive γ correction.

The inverse gradation correction algorithm shown in the input-output characteristic curve 3500 of FIG. 35 is represented by the following formula (28).

$$E = \text{EOTF}[E'] = OB - (\beta - E')^\gamma \quad E' < \beta$$

$$OB + \{1/\alpha \times (E' - \beta)\}^\gamma \quad \beta \leq E' \tag{28}$$

where $\alpha = (1 - OB^{1/\gamma})/(1 - OB)^{1/\gamma}$

E' represents the signal level of the gradation correction RAW image data (input signal level), E represents the signal level of the restored RAW image data (output signal level), and EOTF[ ] represents an inverse gradation correction function. In formula (28), the formula for when the condition is E'<β is the formula for negative γ correction, and the formula for when the condition is β≤E' is the formula for positive γ correction. The inverse gradation correction unit 603 executes the inverse gradation correction of formula (28) if the gradation correction identifier 326 indicating formula (26) is detected in the control information 312.

By executing negative γ correction in the interval SC351, it is possible to increase the effect of mitigating encoding distortion in the vicinity of the optical black value OB in the restored RAW image data that has undergone inverse gradation correction, and it is possible to reduce noise occurring in the dark portions, and thus, it is possible to improve color reproduction.

Embodiment 8

Embodiment 8 shows an example in which two fitting coefficients are adopted in the configuration of Embodiment 7. Specifically, for example, in Embodiment 7, in an interval SC27 of the input-output characteristic curve 3300 where the input signal level E is greater than or equal to OB (OB≤E), the fitting coefficient α is adjustable. In Embodiment 8, different fitting coefficients are used for the interval SC9 in which the input signal level E is less than OB (E<OB) and the interval SC27 in which the input signal level E is greater than or equal to OB (OB≤E). In Embodiment 8, differences from Embodiment 7 will be primarily described, and descriptions of the same configurations and content as Embodiment 7 are applicable to Embodiment 8 as well, and descriptions thereof are omitted.

Figure 36:
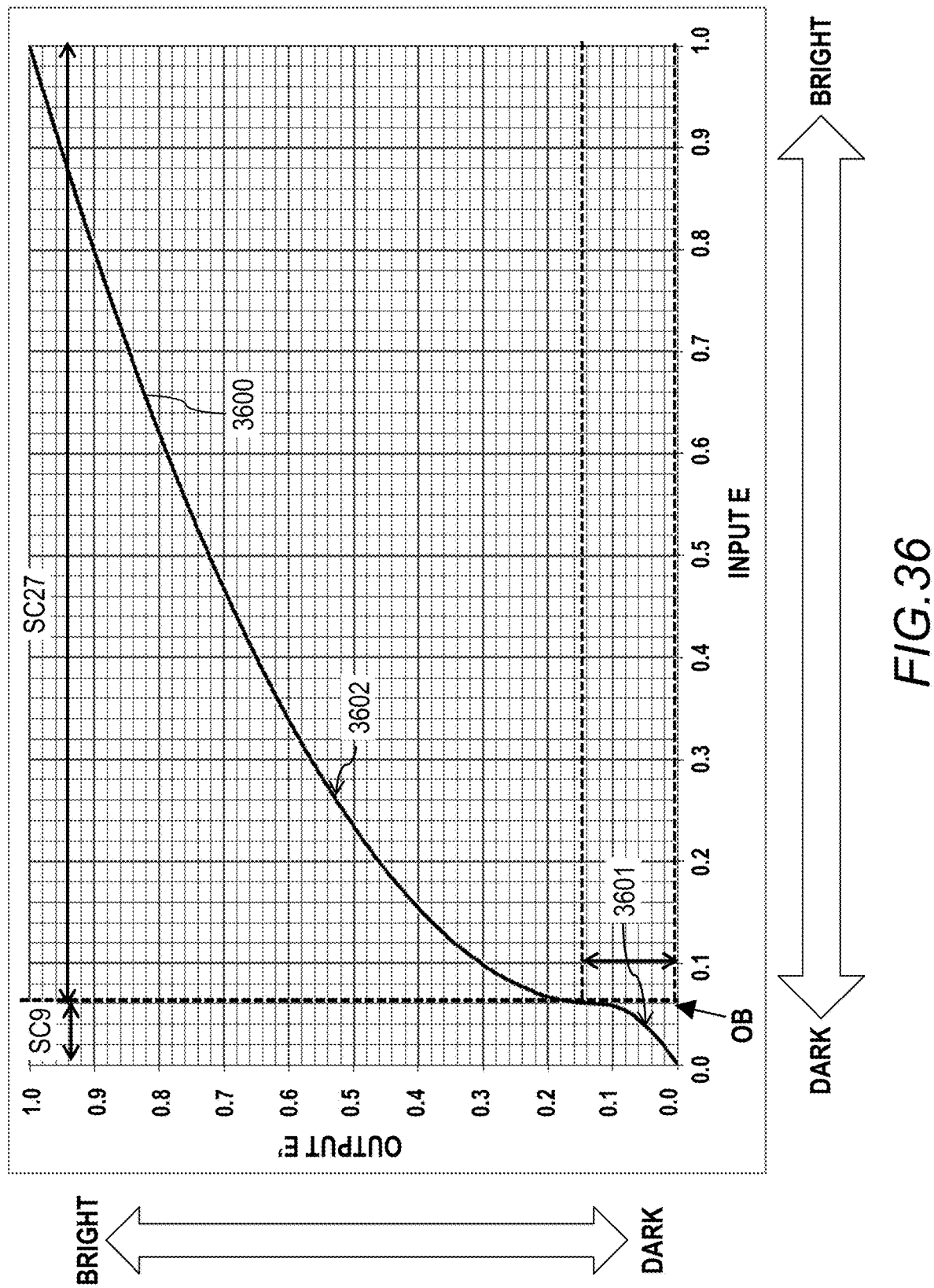
FIG. 36 is a graph showing input-output characteristics 9 for gradation correction when an optical black value is used.

FIG. 36 is a graph showing input-output characteristics 9 for gradation correction when an optical black value is used. In the input-output characteristic example 9 of gradation correction when using the optical black value, like the input-output characteristic example 8 and unlike the input-output characteristic examples 1 and 2 of gradation correction when using the optical black value, the gradation correction unit 201 executes negative gradation correction for input signal levels E lower than the optical black value OB, or in other words, executes negative 1/γ correction, and executes positive gradation correction for input signal levels E greater than or equal to the optical black value OB, or in other words, executes positive 1/γ correction.

Specifically, for example, in the input-output characteristic curve 3600, a waveform 3601 in the interval SC9 is a waveform attained from negative 1/γ correction, and a waveform 3602 of the interval SC27 greater than or equal to the optical black value OB is a waveform attained from positive 1/γ correction.

The gradation correction algorithm shown in the input-output characteristic curve 3600 of FIG. 36 is represented by the following formula (29).

$$E' = \text{OETF}[E] = -\alpha 1 \times (OB - E)^{1/\gamma} + \beta \quad E < OB$$

$$\alpha 2 \times (E - OB)^{1/\gamma} + \beta \quad OB \leq E \tag{29}$$

where
$\alpha 2 = (1 - \beta)(1 - OB)^{1/\gamma}$
$\beta = \alpha 1 \times OB^{1/\gamma}$ E represents the signal level of the RAW image data (input signal level), E' represents the signal level of the gradation correction RAW image data (output signal level), OETF[ ] represents a gradation correction function, OB is the optical black value, γ is the gamma value, and α1 and α2 are adjustable fitting coefficients. α2 is a fitting coefficient differing from α1 but dependent thereon.

The setting unit 204 can adjust the fitting coefficient α according to fluctuations in the ISO sensitivity in the information processing apparatus 100. As a result, it is possible to adjust the input-output characteristic curve 3600 with the fitting coefficient α1 in the interval SC9, and to adjust the input-output characteristic curve 3600 with the fitting coefficient α2 having a different value from the fitting coefficient α1 in the interval SC27 where OBE.

In formula (29), the formula for when the condition is E<OB is the formula for negative 1/γ correction, and the formula for when the condition is OB≤E is the formula for positive 1/γ correction. The gradation correction unit 201 outputs the gradation correction identifier 326 indicating the gradation correction algorithm of formula (29) to the encoding unit 202, and the encoding unit 202 uses the gradation correction identifier 326 from the gradation correction unit 201 as the control information 312 in the header information 301.

By executing negative 1/γ correction in the interval SC9, it is possible to improve color reproduction in the vicinity of the optical black value OB in the RAW image data that has undergone gradation correction. In other words, in the portion of the input-output characteristic curve 3600 in the vicinity of the optical black value OB, noise on the side where the input signal level E is less than the optical black value OB (negative direction) and noise on the side where the input signal level E is greater than the optical black value OB (positive direction) cancel each other out in a noise reduction process, which allows for more efficient noise reduction than in Embodiment 1. Thus, it is possible to mitigate black level degradation in the vicinity of the optical black value OB in the RAW image data that has undergone gradation correction, and improve color reproduction.

Figure 37:
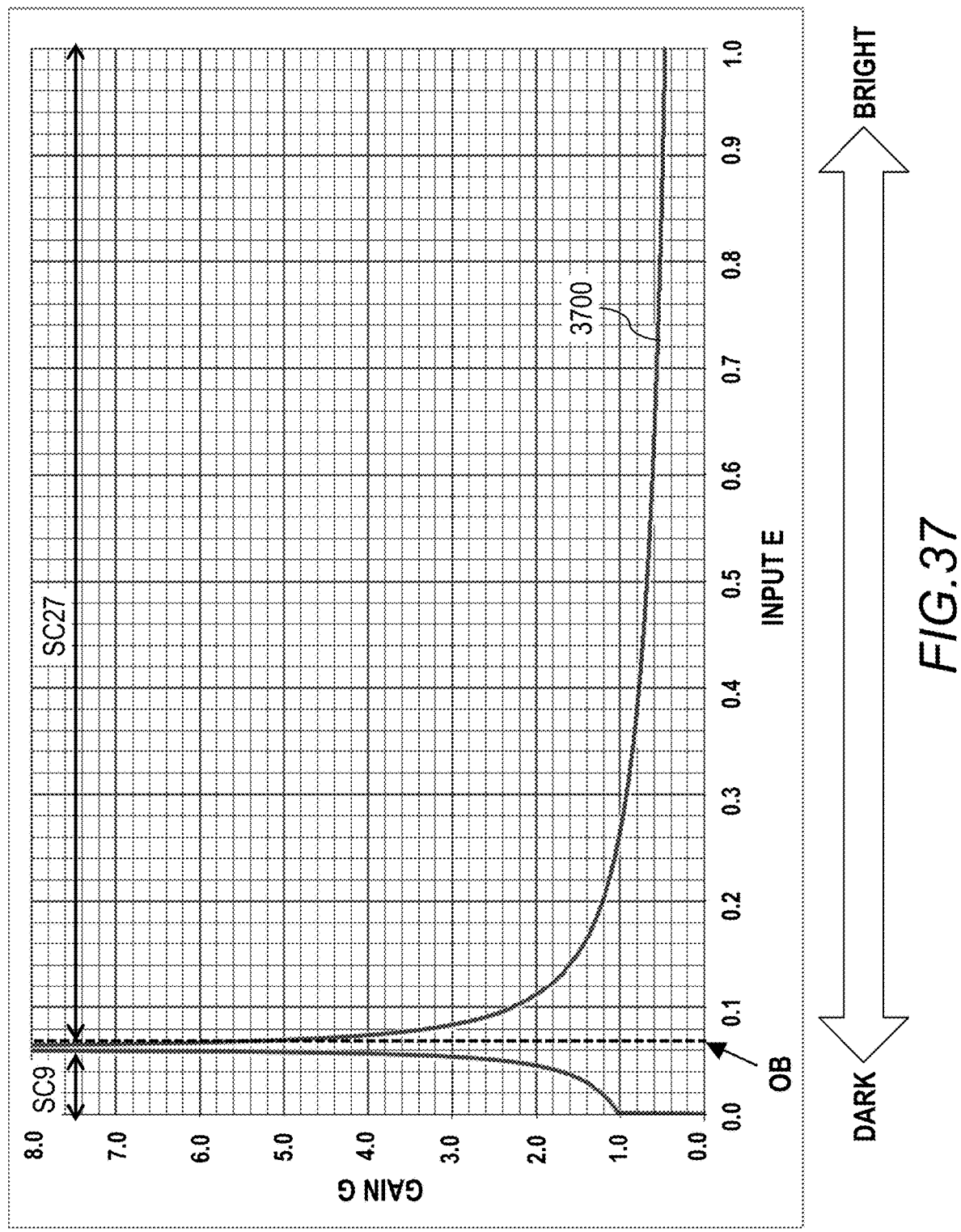
FIG. 37 is a graph showing gain characteristics under input-optical characteristics 9 for gradation correction when an optical black value is used.

FIG. 37 is a graph showing gain characteristics under input-optical characteristics 9 for gradation correction when an optical black value is used. A gain characteristic curve 3700 at an input signal level E for gradation correction when an optical black value is used is represented by the following formula (30), which is the derivative of formula (29).

$$G = \{\text{OETF}[E]\}' = (\alpha 1/\gamma) \times (OB - E)^{1/(\gamma - 1)} E < OB$$

$$(\alpha 2/\gamma) \times (E - OB)^{1/(\gamma - 1)} OB \leq E \tag{30}$$

where
$\alpha 2 = (1 - \beta)(1 - OB)^{1/\gamma}$
$\beta = \alpha 1 \times OB^{1/\gamma}$ G is the gain of the input signal level E. Specifically, in the gain characteristic curve 3700, for example, the gain G takes on the minimum value when the input signal level E is at 0.0 in the interval SC9, increases from 0.0, and reaches the maximum value (infinity) when the input signal level E reaches the optical black value OB.

Also, by setting the gain G of the dark portion to be large during gradation correction, distortion of dark portions occurring between the encoding unit 202 and the decoding unit 602 can be suppressed. As a result, during developing or image adjustment, even if dark portions are brightened to allow for greater visibility of figures in dark portions or the like, distortion of dark portions has less of a tendency to be prominent.

Figure 38:
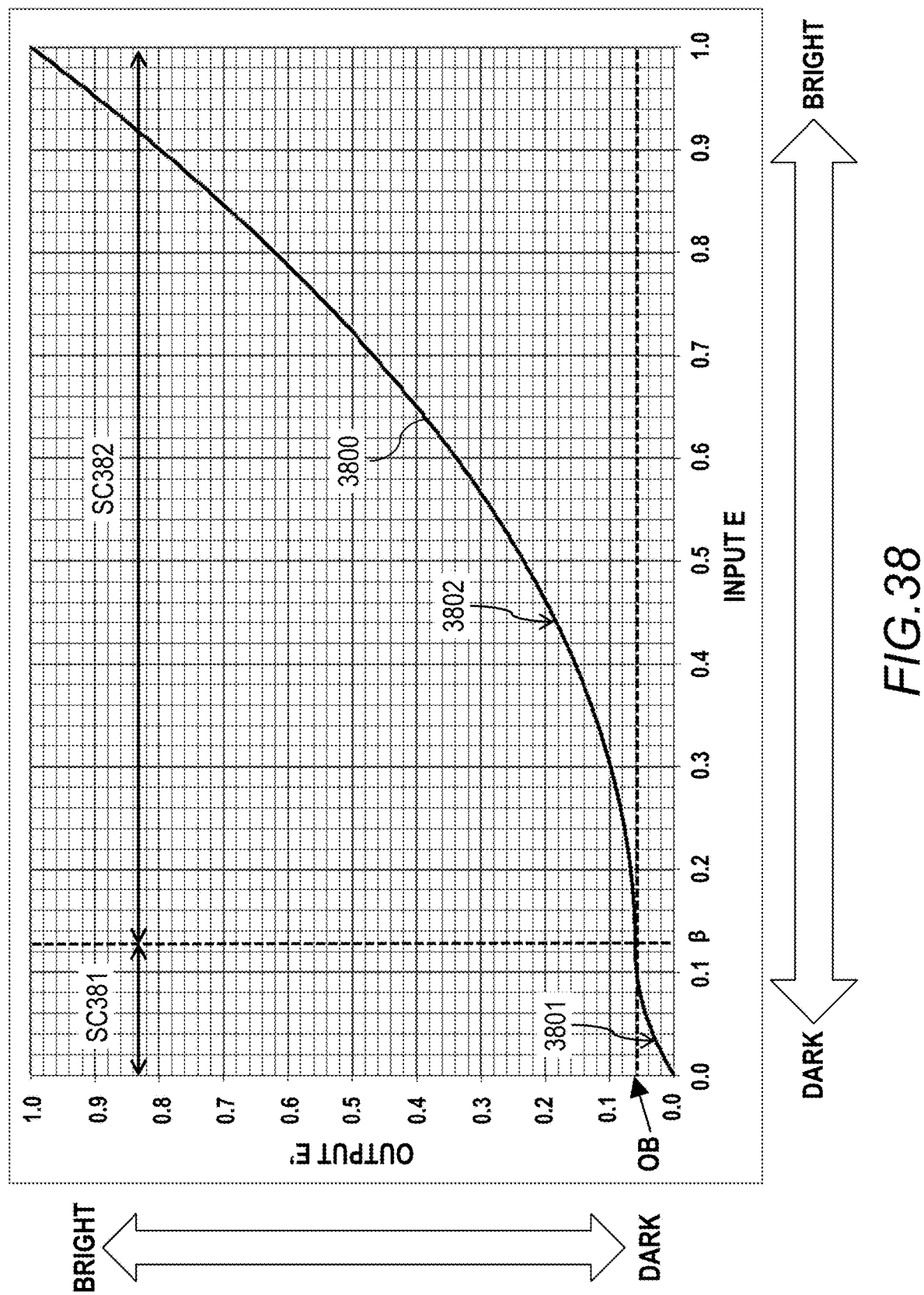
FIG. 38 is a graph showing input-output characteristics 9 for inverse gradation correction when an optical black value is used.

FIG. 38 is a graph showing input-output characteristics 9 for inverse gradation correction when an optical black value is used. The inverse gradation correction unit 603 executes positive inverse gradation correction for a value greater than or equal to β for a given input signal level E' of the gradation correction RAW image data, or in other words, executes positive γ correction, and executes negative inverse gradation correction for input signal levels less than β, or in other words, executes negative γ correction.

An interval SC381 is an interval where the input signal level E' is from 0.0 to β indicated in formula (10), and an interval SC382 is an interval where the input signal level E' is from β to 1.0. Specifically, for example, in the input-output characteristic curve 3800, a waveform 3801 in the interval SC381 is a waveform attained from negative γ correction, and a waveform 3802 of the interval SC382 is a waveform attained from positive γ correction.

The inverse gradation correction algorithm shown in the input-output characteristic curve 3800 of FIG. 38 is represented by the following formula (31).

$$E = EOTF[E'] = \{1/\alpha1 \times (\beta - E')\}^\gamma \quad E' < \beta$$

$$OB + \{1/a2 \times (E-\beta)\}^\gamma \quad \beta \le E' \quad (31)$$

where
$\alpha2 = (1-\beta)(1-OB)^{1/\gamma}$
$\beta = \alpha1 \times OB^{1/\gamma}$ E' represents the signal level of the gradation correction RAW image data (input signal level), E represents the signal level of the restored RAW image data (output signal level), and EOTF[ ] represents an inverse gradation correction function. In formula (31), the formula for when the condition is E'<β is the formula for negative γ correction, and the formula for when the condition is β≤E' is the formula for positive γ correction. The inverse gradation correction unit 603 executes the inverse gradation correction of formula (31) if the gradation correction identifier 326 indicating formula (29) is detected in the control information 312.

By executing negative γ correction in the interval SC381, it is possible to increase the effect of mitigating encoding distortion in the vicinity of the optical black value OB in the restored RAW image data that has undergone inverse gradation correction, and it is possible to reduce noise occurring in the dark portions, and thus, it is possible to improve color reproduction.

As described above, according to the present embodiment, it is possible to mitigate encoding distortion of dark portions resulting from gradation correction. Also, if displaying dark portions to be brighter for a reason such as greater visibility of forms in the dark portions when developing or performing image adjustment, for example, distortion of dark portions occurring between the encoding unit 202 and the decoding unit 602 can be suppressed by setting the gain G of the dark portion to be large during gradation correction. As a result, during developing or image adjustment, even if dark portions are brightened to allow for greater visibility of figures in dark portions or the like, distortion of dark portions has less of a tendency to be prominent. Also, it is possible to restore the original RAW image data through inverse gradation correction.

DESCRIPTION OF THE REFERENCE NUMERALS 100 an information processing apparatus, 153 an image capture element, 161 an active pixel area, 162 an optical black pixel area, 200 an encoder, 201 a gradation correction unit, 202 an encoding unit, 203 a recording unit, 204 a setting unit, 312 control information, 326 a gradation correction identifier, 600 a decoder, 601 an acquisition unit, 602 a decoding unit, 603 an inverse gradation correction unit

What is claimed is:

1. An encoder, comprising:
   a correction unit configured to execute gradation correction on RAW image data from an image capture element having optical black on the basis of a gamma coefficient and an optical black value of the optical black; and
   an encoding unit configured to encode gradation correction RAW image data that has undergone gradation correction by the correction unit,
   wherein the correction unit is configured to execute first gradation correction for a first interval in which the input signal level of the RAW image data is less than the optical black value, and executes second gradation correction for a second interval in which the input signal level of the RAW image data is in at least a portion of a range from the optical black value to a maximum value.

2. The encoder according to claim 1,
   wherein the correction unit is configured to execute, as the first gradation correction, negative gradation correction on the RAW image data in the first interval on the basis of the gamma coefficient and the optical black value, and execute, as the second gradation correction, positive gradation correction on the RAW image data in the second interval on the basis of the gamma coefficient and the optical black value.

3. The encoder according to claim 2,
   wherein the correction unit is configured to execute, as the first gradation correction, gradation correction on the RAW image data in the first interval on the basis of gain characteristics in which a gain indicating a degree of emphasis of the input signal level increases the closer a value of the input signal level is to the optical black value.

4. The encoder according to claim 1,
   wherein the correction unit is configured to execute, as the first gradation correction, gradation correction on the RAW image data in the first interval on the basis of gain characteristics in which a gain indicating a degree of emphasis of the input signal level in the first interval is constant, and execute, as the second gradation correction, positive gradation correction on the RAW image data in the second interval on the basis of the gamma coefficient and the optical black value.

5. The encoder according to claim 1,
   wherein the correction unit is configured to execute third gradation correction in a third interval that is between the first interval and the second interval, and that includes an input signal level of the optical black value.

6. The encoder according to claim 5,
   wherein the correction unit is configured to execute, as the third gradation correction, gradation correction on the RAW image data in the third interval on the basis of gain characteristics in which a gain indicating a degree of emphasis of the input signal level in the third interval is constant.

7. The encoder according to claim 6,
wherein the gain is a provisional gain set to the input signal level of the optical black value.

8. The encoder according to claim 6,
wherein the correction unit is configured to execute, as the first gradation correction, negative gradation correction on the RAW image data in the first interval on the basis of the gamma coefficient and the optical black value, and execute, as the second gradation correction, positive gradation correction on the RAW image data in the second interval on the basis of the gamma coefficient and the optical black value.

9. The encoder according to claim 5,
further comprising: a setting unit configured to set a width of the third interval on the basis of an exposure amount.

10. The encoder according to claim 1,
wherein the encoding unit is configured to output data including encoded data resulting from the encoding unit encoding the gradation correction RAW image data, and control information including at least one of the gamma coefficient, the optical black value, or an identifier that identifies a type of gradation correction executed by the correction unit.

11. The encoder according to claim 5,
wherein the encoding unit is configured to output data including control information that includes information of the gain of the third interval.

12. The encoder according to claim 5,
wherein the encoding unit is configured to output data including control information that includes information indicating a range of the third interval.

13. The encoder according to claim 12,
wherein the encoding unit outputs, as information indicating a range of input signal levels of the third interval, data including control information that includes the optical black value, a first width that is a range from a minimum value of the third interval to the optical black value, and a second width that is a width from the optical black value to a maximum value of the third interval.

14. A decoder, comprising:
an acquisition unit configured to acquire encoded RAW image data resulting from encoding gradation correction RAW image data that has undergone gradation correction on the basis of a gamma coefficient and an optical black value;
a decoding unit configured to decode the encoded RAW image data acquired by the acquisition unit into the gradation correction RAW image data; and
an inverse gradation correction unit configured to execute inverse gradation correction on the gradation correction RAW image data decoded by the decoding unit on the basis of the gamma coefficient and the optical black value, and output the RAW image data prior to gradation correction,
wherein the inverse correction unit is configured to execute first inverse gradation correction for a first interval in which the input signal level of the gradation correction RAW image data is less than a prescribed value, and execute second inverse gradation correction for a second interval in which the input signal level of the RAW image data is in at least a portion of a range from the prescribed value to a maximum value.

15. The decoder according to claim 14,
wherein the acquisition unit is configured to acquire control information including at least one of the gamma coefficient, the optical black value, or an identifier identifying a type of inverse gradation correction to be executed by the inverse correction unit, and
wherein the inverse correction unit is configured to execute inverse gradation correction on the gradation correction RAW image data on the basis of the control information.

16. The decoder according to claim 14,
wherein the inverse correction unit is configured to execute, as the first inverse gradation correction, negative inverse gradation correction on the gradation correction RAW image data in the first interval on the basis of the gamma coefficient and the optical black value, and execute, as the second inverse gradation correction, positive inverse gradation correction on the gradation correction RAW image data in the second interval.

17. The decoder according to claim 14,
wherein the inverse correction unit is configured to execute, as the first inverse gradation correction, inverse gradation correction on the gradation correction RAW image data in the first interval on the basis of gain characteristics in which a gain of an output signal level in relation to the input signal level is constant, and execute, as the second inverse gradation correction, positive inverse gradation correction on the gradation correction RAW image data in the second interval on the basis of the gamma coefficient and the optical black value.

18. The decoder according to claim 14,
wherein the inverse correction unit is configured to execute third inverse gradation correction in a third interval that is between the first interval and the second interval, and that includes a prescribed input signal level.

19. The decoder according to claim 18,
wherein the inverse correction unit is configured to execute, as the third inverse gradation correction, inverse gradation correction on the gradation correction RAW image data in the third interval on the basis of gain characteristics in which a gain of an output signal level in relation to the input signal level is constant.

20. The decoder according to claim 19,
wherein the acquisition unit is configured to acquire control information that includes information of the gain, and
wherein the inverse correction unit is configured to execute inverse gradation correction on the gradation correction RAW image data in the third interval on the basis of the information of the gain.

21. The decoder according to claim 18,
wherein the acquisition unit is configured to acquire data including control information that includes information indicating a range of the third interval, and
wherein the inverse correction unit is configured to execute inverse gradation correction on the gradation correction RAW image data in the third interval on the basis of the control information.

22. The decoder according to claim 21,
wherein the acquisition unit is configured to acquire, as information indicating a range of input signal levels of the third interval, data including control information that includes the optical black value, a first width that is a range from a minimum value of the third interval to the optical black value, and a second width that is a width from the optical black value to a maximum value of the third interval, and wherein the inverse correction unit is configured to execute inverse gradation correction on the gradation correction RAW image data in the third interval on the basis of the control information.

23. An encoding method, comprising:

a correction process of executing gradation correction on RAW image data from an image capture element having optical black on the basis of a gamma coefficient and an optical black value of the optical black; and an encoding process of encoding gradation correction RAW image data that has undergone gradation correction by the correction process, wherein the correction process executes first gradation correction for a first interval in which the input signal level of the RAW image data is less than the optical black value, and executes second gradation correction for a second interval in which the input signal level of the RAW image data is in at least a portion of a range from the optical black value to a maximum value.

24. A decoding method, comprising:

an acquisition process of acquiring encoded RAW image data resulting from encoding gradation correction RAW image data that has undergone gradation correction on the basis of a gamma coefficient and an optical black value;

a decoding process of decoding the encoded RAW image data acquired by the acquisition process into the gradation correction RAW image data; and an inverse gradation correction process of executing inverse gradation correction on the gradation correction RAW image data decoded by the decoding process on the basis of the gamma coefficient and the optical black value, and outputting the RAW image data prior to gradation correction;

wherein the inverse correction process executes first inverse gradation correction for a first interval in which the input signal level of the gradation correction RAW image data is less than a prescribed value, and executes second inverse gradation correction for a second interval in which the input signal level of the RAW image data is in at least a portion of a range from the prescribed value to a maximum value.

25. A non-transitory recording medium having recorded therein an encoding program that causes a processor to execute the encoding method according to claim 23.

26. A non-transitory recording medium having recorded therein a decoding program that causes a processor to execute the decoding method according to claim 24.

* * * * *